(12) United States Patent
Rausch et al.

(10) Patent No.: US 10,380,214 B1
(45) Date of Patent: Aug. 13, 2019

(54) IDENTIFICATION AND VISUALIZATION OF DATA SET RELATIONSHIPS IN ONLINE LIBRARY SYSTEMS

(71) Applicant: SAS Institute Inc., Cary, NC (US)

(72) Inventors: Nancy Anne Rausch, Apex, NC (US); Christopher L. Replogle, III, Cary, NC (US); Elizabeth Jane McIntosh, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/236,374

(22) Filed: Dec. 29, 2018

Related U.S. Application Data

(60) Provisional application No. 62/627,426, filed on Feb. 7, 2018.

(51) Int. Cl.
| | | |
|---|---|---|
| *G06F 16/20* | (2019.01) | |
| *G06F 16/9538* | (2019.01) | |
| *G06F 16/28* | (2019.01) | |
| *G06F 16/2457* | (2019.01) | |
| *G06F 16/2452* | (2019.01) | |
| *G06F 16/26* | (2019.01) | |
| *G06F 21/62* | (2013.01) | |
| *G06F 16/22* | (2019.01) | |
| *G06F 16/21* | (2019.01) | |
| *H04L 29/08* | (2006.01) | |

(52) U.S. Cl.
CPC ........ *G06F 16/9538* (2019.01); *G06F 16/212* (2019.01); *G06F 16/2264* (2019.01); *G06F 16/2452* (2019.01); *G06F 16/24573* (2019.01); *G06F 16/26* (2019.01); *G06F 16/285* (2019.01); *G06F 16/288* (2019.01); *G06F 21/6227* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,154,213 | A * | 11/2000 | Rennison | G06F 16/34 715/854 |
| 6,604,114 | B1 * | 8/2003 | Toong | G06F 16/338 |
| 8,429,179 | B1 * | 4/2013 | Mirhaji | G06F 17/274 707/756 |
| 9,239,854 | B2 | 1/2016 | Rausch et al. | |

(Continued)

*Primary Examiner* — Jau Shya Meng

(57) ABSTRACT

An apparatus includes a processor to: receive multiple normalized metadata portions based on metadata portions originating from vendor devices storing data sets of a distributed online library system; compare the multiple pieces of information between pairs of normalized metadata portions to identify at least one pair of identical portions of data; analyze the pieces of information of normalized metadata portions corresponding to an identified pair of identical portions of data to determine if there is a dependency relationship between each portion of data of the pair and another identical portion of data stored within another device; and in response to there being such a pair of dependency relationships, generate a visualization that includes a combination of graphical elements depicting the pair of dependency relationships, and transmit the visualization to the client device to enable a visual presentation of the visualization.

30 Claims, 31 Drawing Sheets

(56) References Cited

U.S. PATENT DOCUMENTS

| | | | |
|---|---|---|---|
| 9,239,861 B2 * | 1/2016 | Arnott | G06Q 10/06 |
| 9,811,575 B2 | 11/2017 | Christian et al. | |
| 9,817,882 B2 | 11/2017 | Christian et al. | |
| 2009/0083208 A1 * | 3/2009 | Raghavan | G06F 19/324 |
| | | | 706/47 |
| 2016/0072676 A1 * | 3/2016 | Gomadam | H04L 41/12 |
| | | | 709/221 |

* cited by examiner

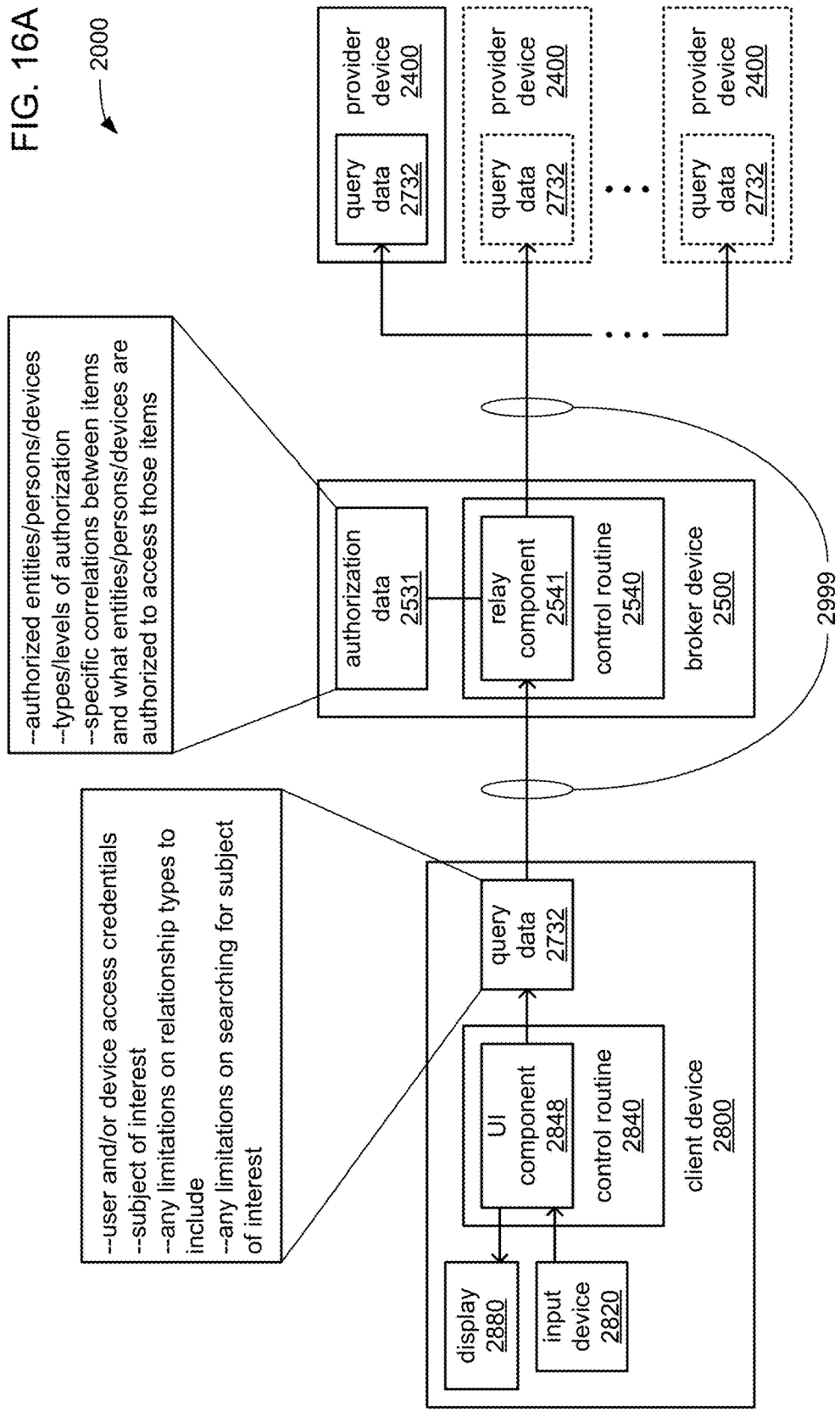

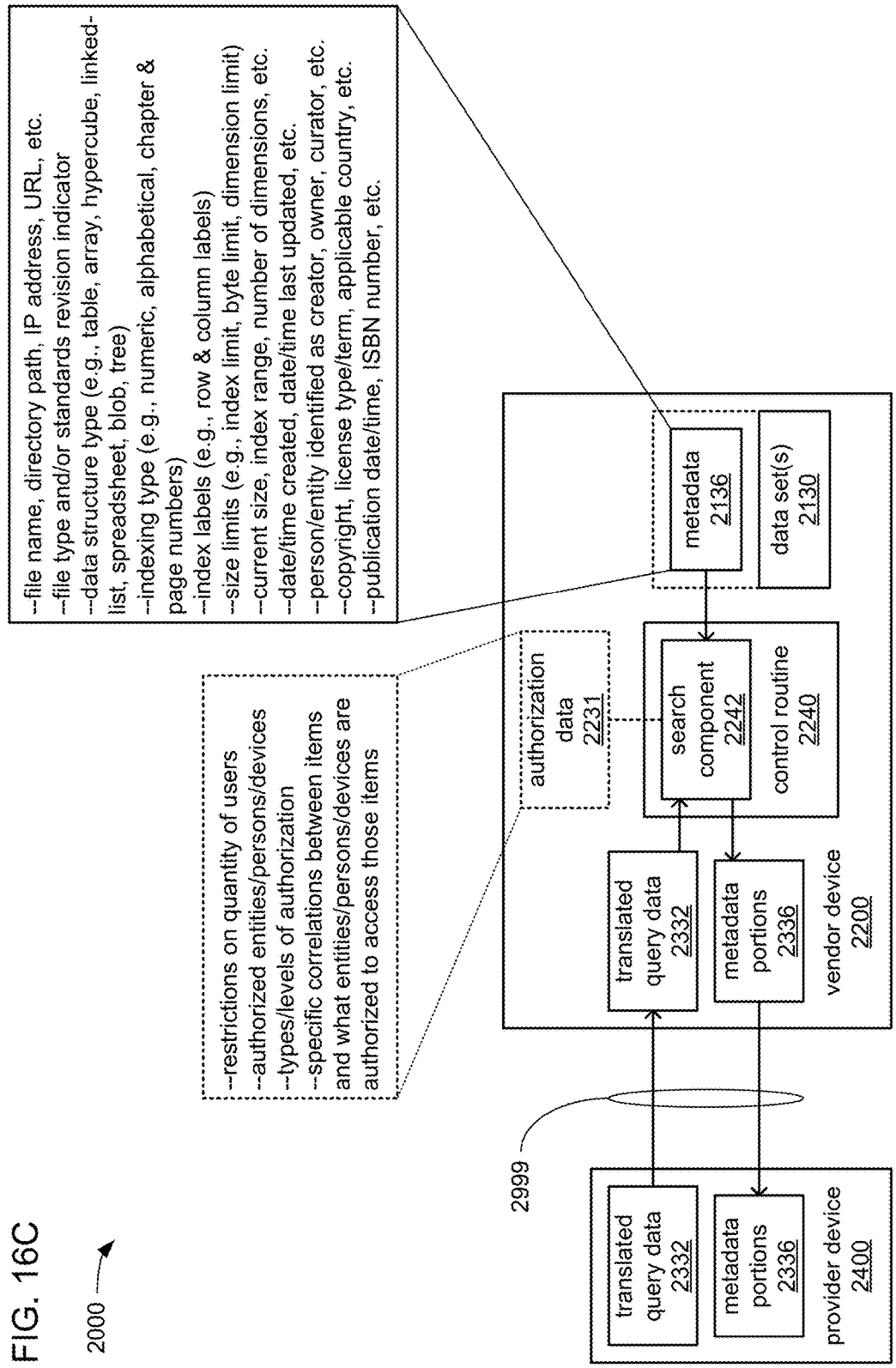

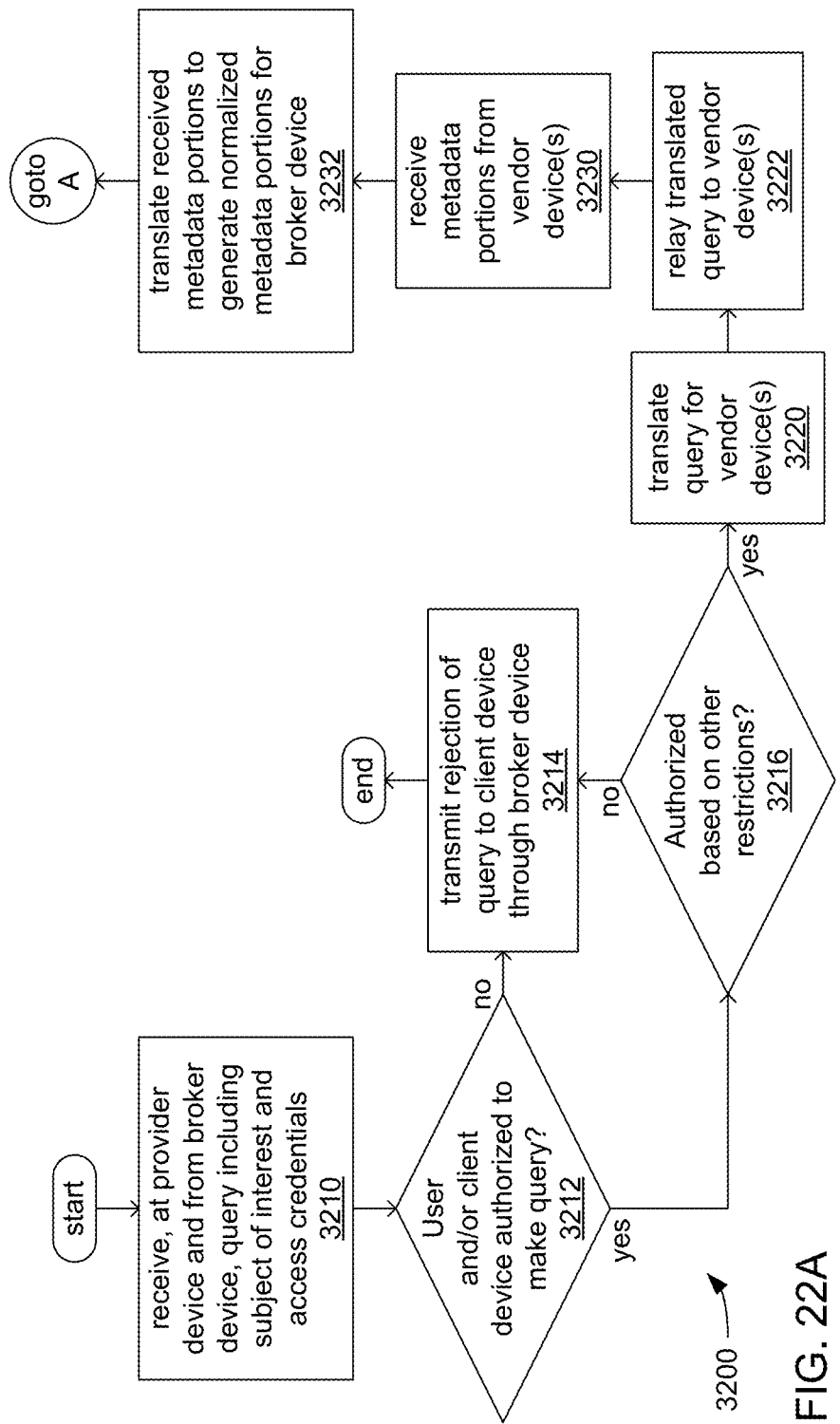

IDENTIFICATION AND VISUALIZATION OF DATA SET RELATIONSHIPS IN ONLINE LIBRARY SYSTEMS

CROSS-REFERENCE TO RELATED APPLICATIONS

This application claims the benefit of priority under 35 U.S.C. § 119(e) to U.S. Provisional Application Ser. No. 62/627,426 filed Feb. 7, 2018, the entirety of each of which is incorporated herein by reference.

BACKGROUND

Curators of online library systems created for such entities as universities, businesses and/or government agencies, typically seek to provide their users (e.g., personnel associated with such entities) with access to a wide variety of pieces of data from a wide variety of sources to enable their users to obtain a very complete view of whatever subject they may research, including information from different sources to enable at least some degree of fact checking, and/or including opposing opinions to provide wider perspectives. In so doing, such curators often enter into licensing agreements with multiple providers of data in an effort to broaden the sources of data that become part of their online library system. However, curators may subsequently find themselves caught by surprise by the introduction of various functional problems into their library systems by such efforts. More specifically, instances in which seemingly broadly distributed data sets turn out to be duplicative or derivative versions of data that all stem from a single source of data may be unknowingly introduced, thereby creating functional bottlenecks that may impair the operation of the overall system.

It has been repeatedly said that the growing prevalence of the Internet has helped to "democratize" information. More specifically, any person with access to the Internet is able to put information out onto the Internet, and that information will become as easily accessible to anyone around the world as information also put out there by historians, scientists, government officials, news professionals, etc. Unfortunately, this same growing prevalence of the Internet has also given greater opportunities for those committing plagiarism to more easily obtain information from numerous sources, and to put out that same information under their own name, while giving no credit to those sources. Also, the vast number of scholastic, corporate, religious and/or governmental entities, as well as the vast number of individual persons, that now regularly put out information onto the Internet has created a situation in which those seeking information on almost any subject are often overwhelmed by the number of different apparent sources of information on that subject.

Still further, many individuals who put out pieces of information on the Internet are frequently not trained in, and/or are uninterested in, best practices in generating what they put out, including making use of original and/or contemporary pieces of information to the degree possible, and/or taking care to carefully delineate their presentations of fact from their opinions. As a result, the Internet has become a vast "free for all" environment in which there are many pieces of information that may not be properly attributed to sources, may present opinions as fact, and/or may be of highly questionable accuracy.

In entering into licensing agreements with various providers, curators of online library systems are often relying on those providers to employ some degree of curation, themselves, to separate out reliable information from questionable information, and to make original and/or contemporary pieces of information more readily available. In essence, curators of online library systems are seeking to make use of additional curation services performed by those providers such that the overall aggregate of the information that makes up such online library systems can be relied upon as meeting at least some minimum level of quality of accuracy and completeness. Many of such providers may, themselves, be publishers of new original pieces of information and/or new compilations of information assembled from other particular sources, and may have acquired a reputation for the accuracy and/or reliability of what they publish. Such reputations may be among the factors relied upon by curators of online library systems in selecting their providers. Again, to provide a breadth of sources, curators of online library systems may enter into licensing agreements with multiple competing providers of information. At the very least, they may seek to ensure that their users have access to an array of source that are not limited by the choices of sources made by a single provider.

Unfortunately for such curators, there is often no way to test or evaluate the quality and/or variety of information that they have arranged to be provided to their users from the providers through such licensing. Thus, such curators often have little ability to verify whether they are succeeding in their efforts to provide a sufficient variety of source of information to their users. As a result, such curators may be caused to remain oblivious to instances in which multiple providers that they have entered into licenses with are actually providing the very same information on at least a subset of subjects from the very same source. Where such a situation exists, aside from concerns that this may result in users having access to an all too limited selection of information concerning a particular subject, there is also the concern that such a single source of information may become the source of an information access bottleneck. More specifically, where each of multiple providers of information direct users to the same source of a particular piece of information, the storage, processing and/or network bandwidth capabilities of that one source may be insufficient to support accesses and queries made by so many users to that particular piece of information, thereby leading to instances where that particular piece of information may not be reliably accessible, and/or may become accessible only after a considerable period of delay, thereby impairing the overall functionality of the online library system.

In some situations, such of a situation of there being a single piece of information on a subject that becomes so widely sought after may be entirely unavoidable where the number of original sources of information on that particular subject is highly limited. By way of example, on such topics as the monitoring of geological activity along earthquake faults and/or in the vicinity of volcanoes, it may be that the US Geological Survey (USGS) of the US Government is the only source of various instrument measurements in the field. Thus, a report put out by the USGS on the subject of particular activity associated with a particular fault line or volcano may be the only source of that information, and therefore, may become the one piece of information that is included by each of multiple providers that a curator may license information from. Having knowledge of the fact there being such unavoidable bottlenecks may enable curators of online library systems to take action to improve reliability of access and/or reduce occurrences of delay in access. However, such curators are unable to take such action if they are not made aware of the existence of such situations.

Curators may also be caused to remain oblivious to instances in which one provider has made available a data set concerning a particular subject that was created as an aggregation of other data sets concerning different aspects of the subject that are individually available through one or more other providers. There may also be situations in which information on a particular subject from two different sources (and which may be available through two different providers) cover numerous different aspects of the particular subject, but may both have one particular aspect of the subject in which there is a high degree of overlap therebetween.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes a processor and a storage to store instructions that, when executed by the processor, cause the processor to perform operations including receive, at a broker device and via a network, multiple normalized metadata portions based on a set of metadata portions originating from a set of vendor devices of a distributed online library system, wherein: the set of vendor devices stores a set of data sets of the distributed online library system; each normalized metadata portion of the multiple normalized metadata portions comprises multiple pieces of information descriptive of contents of a corresponding portion of data of a set of portions of data retrieved from the set of data sets; each portion of data in the set of portions of data is identified by a vendor device of the set of vendor devices as relevant to a subject of interest that is specified in a query originating from a client device of the distributed online library system; and the query comprises a request for a visualization of relationships among the portions of data in the set of portions of data. The processor is also caused to, for each pair of normalized metadata portions of the multiple metadata portions, compare the multiple pieces of information therebetween to identify at least one pair of identical portions of data within the set of portions of data; and in response to the identification of a pair of identical portions of data within the set of portions of data, analyze the pieces of information of the corresponding pair of normalized metadata portions to determine if there is a dependency relationship between each portion of data of the pair of identical portions of data and another identical portion of data stored within another device that is not among the set of vendor devices. The processor is further caused to, in response to a determination that there is a dependency relationship between each portion of data of the pair of identical portions of data and another identical portion of data stored within another device that is not among the set of vendor devices, perform operations including generate a visualization including: a first graphical element that represents a first portion of data of the pair of identical portions of data; a second graphical element that represents a second portion of data of the pair of identical portions of data; a third graphical element that represents the other identical portion of data stored within the other device; and a pair of graphical elements that each represent the dependency relationship between the other identical portion of data and each of the first portion of data and the second portion of data. The processor is still further caused to transmit the visualization to the client device to enable a visual presentation of the visualization.

The multiple pieces of information of each normalized metadata portion comprises a data portion identifier of the corresponding portion of data that comprises at least one of: a file name of the corresponding portion of data stored as a file within a vendor device of the set of vendor devices; a title of the corresponding portion of data; an author of the corresponding portion of data; a publisher of the corresponding portion of data; an Internet Protocol (IP) address of the vendor device of the set of vendor devices within which the corresponding portion of data is stored; or a Universal Resource Locator (URL) of the vendor device of the set of vendor devices within which the corresponding portion of data is stored. To identify at least one pair of identical portions of data within the set of portions of data, the processor may be caused to compare the data portion identifiers of each pair of normalized metadata portions of the multiple normalized metadata portions.

At least a subset of the set of portions of data may include a multi-dimensional array data structure; and the multiple pieces of information of each normalized metadata portion that corresponds to a portion of data of the subset of portions of data may include multiple metrics that are each descriptive of contents of the corresponding portion of data. Each metric of the multiple metrics may include at least one of: a quantity of dimensions; a size of each dimension; a data type of stored data values; a bit width of stored data values; a specified data value employed as a null value; or a measure of sparseness of data values other than the null value. To identify at least one pair of identical portions of data within the set of portions of data, the processor may be caused to: identify a subset of the multiple normalized metadata portions that corresponds to the subset of data portions; and compare the multiple metrics of each pair of normalized metadata portions of the subset of normalized metadata portions.

In response to a determination that a pair of portions of data of the set of portions of data are not identical, the processor may be caused to perform operations including: compare indications of size of each portion of data of the pair of portions of data in the corresponding pair of normalized metadata portions to determine which portion of data is smaller; analyze the multiple pieces of information of the normalized metadata portion that corresponds to the smaller portion of data of the pair of portions of data to identify a type of data structure present within the smaller portion of data; analyze the multiple pieces of information of the normalized metadata portion that corresponds to the larger portion of data of the pair of portions of data to determine if a data structure of the same type is present within the larger portion of data of the pair of portions of data; in response to a determination that a data structure of the same type is present within the larger portion, compare pieces of information of the multiple pieces of information of each normalized metadata portion that specify multiple metrics of the data structures of the smaller portion of data and of the larger portion of data to determine whether the data structures of the smaller portion of data and the larger portion of data have identical metrics; and in response to a determination that the data structures of the smaller portion of data and the larger portion of data have identical metrics, compare at least a subset of data values of the data structure of the smaller portion of data to corresponding data values of the data structure of the larger portion of data to determine if the data structures of the smaller portion of data and the larger portion of data are identical and that there is an inclusion relationship in which the smaller portion of data is included in the larger portion of data. The processor may also be caused to, in response to a determination that there is an inclusion relationship between the smaller portion of data and the larger portion of data, perform operations including generate a visualization including: a first graphical element that represents the smaller portion of data; a second graphical element that represents the larger portion of data; and a third graphical element that represents the inclusion relationship in which the smaller portion of data is included in the larger portion of data. The processor may be further caused to transmit the visualization to the client device to enable a visual presentation of the visualization.

Each portion of data in at least a subset of the set of portions of data may include a document; and the multiple pieces of information of each normalized metadata portion that corresponds to a portion of data of the subset of portions of data may include at least one document identifier of a document, and at least one citation to another document that is present within the document. Each document identifier of the at least one document identifier may include at least one of: a title; an author; an identifier of a publisher; or a date of publication. To identify a citation relationship between at least one pair of portions of data within the subset of portions of data in which a document of one portion of data includes a citation to a document of another portion of data, the processor may be caused to: identify a subset of the multiple normalized metadata portions that corresponds to the subset of data portions; and compare document identifiers to citations between each pair of normalized metadata portions of the subset of the multiple normalized metadata portions. In response to an identification of a citation relationship between a pair of portions of data within the subset of portions of data, the processor may be caused to perform operations including generate a visualization including: a first graphical element that represents a first portion of data of the pair of portions of data in which a document includes the citation; a second graphical element that represents a second portion of data of the pair of portions of data that includes the document that is cited by the citation; and a third graphical element that represents the citation relationship. The processor may also be caused to transmit the visualization to the client device to enable a visual presentation of the visualization.

The processor may be caused to perform operations including: receive the query from the client device via the network; translate the query from a first communications protocol in which information in the query is expressed in a first manner, and to a second communications protocol in which the information in the query is expressed in a second manner in a translated query; and relay the translated query to the set of vendor devices via the network to enable the set of vendor devices to perform a search of metadata corresponding to multiple data sets to identify the set of portions of data as relevant to the subject of interest specified in the query and in the translated query.

Prior to translating the query, the processor may be caused to perform operations including: analyze access credentials included with the query to determine whether the client device or a user of the client device is authorized to enter the query into the distributed online library system; and in response to a determination that the entry of the query is not authorized, transmit an indication of lack of authorization to the client device and refrain from translating the query and relaying the translated query.

The processor may be caused to perform operations including: receive the set of metadata portions from the set of vendor devices via the network; and translate each metadata portion of the set of metadata portions from a first communications protocol in which the multiple pieces of information about the corresponding portion of data is expressed in a first manner, and to a second communications protocol in which the multiple pieces of information about the corresponding portion of data is expressed in a second manner in a corresponding normalized metadata portion of the multiple normalized metadata portions.

As part of the translation of each metadata portion to the corresponding normalized metadata portion, the processor may be caused to perform operations including analyze the multiple pieces of information of each metadata portion to determine whether there is a piece of information of a predetermined set of pieces of information to be included in the corresponding normalized metadata portion that is not present among the multiple pieces of information of the metadata portion, and in response to a determination that there is a piece of information of the predetermined set of pieces of information that is not present among the multiple pieces of information of a metadata portion, perform operations comprising: generate a further query to obtain the piece of information that is not present among the multiple pieces of information of the metadata portion from the corresponding portion of data; transmit the further query to the vendor device of the set of vendor devices from which the metadata portion was received; receive further data from the vendor device that comprises the piece of information that is not present among the multiple pieces of information of the metadata portion; and augment the corresponding normalized metadata portion with the piece of information.

The processor may be caused to perform operations including analyze the query to determine whether the query comprises a request for the provision of the set of portions of data that correspond to the multiple normalized metadata portions to be provide along with a visualization of relationships among the set of portions of data, and in response to a determination that the query does comprise a request for the provision of the set of portions of data, perform operations including: receive the set of portions of data from the set of vendor devices; and relay the set of portions of data to the client device along with the transmission of the visualization to the client device.

A computer-program product tangibly embodied in a non-transitory machine-readable storage medium includes instructions operable to cause a processor to perform operations including receive, at a broker device and via a network, multiple normalized metadata portions based on a set of metadata portions originating from a set of vendor devices of a distributed online library system, wherein: the set of vendor devices stores a set of data sets of the distributed online library system; each normalized metadata portion of the multiple normalized metadata portions comprises multiple pieces of information descriptive of contents of a corresponding portion of data of a set of portions of data retrieved from the set of data sets; each portion of data in the set of portions of data is identified by a vendor device of the set of vendor devices as relevant to a subject of interest that is specified in a query originating from a client device of the distributed online library system; and the query comprises a request for a visualization of relationships among the portions of data in the set of portions of data. The processor is also caused to, for each pair of normalized metadata portions of the multiple metadata portions, compare the multiple pieces of information therebetween to identify at least one pair of identical portions of data within the set of portions of data; and in response to the identification of a pair of identical portions of data within the set of portions of data, analyze the pieces of information of the corresponding pair of normalized metadata portions to determine if there is a dependency relationship between each portion of data of the pair of identical portions of data and another identical portion of data stored within another device that is not among the set of vendor devices. The processor is further caused to, in response to a determination that there is a dependency relationship between each portion of data of the pair of identical portions of data and another identical portion of data stored within another device that is not among the set of vendor devices, perform operations including generate a visualization including: a first graphical element that represents a first portion of data of the pair of identical portions of data; a second graphical element that represents a second portion of data of the pair of identical portions of data; a third graphical element that represents the other identical portion of data stored within the other device; and a pair of graphical elements that each represent the dependency relationship between the other identical portion of data and each of the first portion of data and the second portion of data. The processor is still further caused to transmit the visualization to the client device to enable a visual presentation of the visualization.

The multiple pieces of information of each normalized metadata portion may include a data portion identifier of the corresponding portion of data that includes at least one of: a file name of the corresponding portion of data stored as a file within a vendor device of the set of vendor devices; a title of the corresponding portion of data; an author of the corresponding portion of data; a publisher of the corresponding portion of data; an Internet Protocol (IP) address of the vendor device of the set of vendor devices within which the corresponding portion of data is stored; or a Universal Resource Locator (URL) of the vendor device of the set of vendor devices within which the corresponding portion of data is stored. To identify at least one pair of identical portions of data within the set of portions of data, the processor may be caused to compare the data portion identifiers of each pair of normalized metadata portions of the multiple normalized metadata portions.

At least a subset of the set of portions of data may include a multi-dimensional array data structure; and the multiple pieces of information of each normalized metadata portion that corresponds to a portion of data of the subset of portions of data may include multiple metrics that are each descriptive of contents of the corresponding portion of data. Each metric of the multiple metrics may include at least one of: a quantity of dimensions; a size of each dimension; a data type of stored data values; a bit width of stored data values; a specified data value employed as a null value; or a measure of sparseness of data values other than the null value. To identify at least one pair of identical portions of data within the set of portions of data, the processor is caused to: identify a subset of the multiple normalized metadata portions that corresponds to the subset of data portions; and compare the multiple metrics of each pair of normalized metadata portions of the subset of normalized metadata portions.

In response to a determination that a pair of portions of data of the set of portions of data are not identical, the processor may be caused to perform operations including: compare indications of size of each portion of data of the pair of portions of data in the corresponding pair of normalized metadata portions to determine which portion of data is smaller; analyze the multiple pieces of information of the normalized metadata portion that corresponds to the smaller portion of data of the pair of portions of data to identify a type of data structure present within the smaller portion of data; analyze the multiple pieces of information of the normalized metadata portion that corresponds to the larger portion of data of the pair of portions of data to determine if a data structure of the same type is present within the larger portion of data of the pair of portions of data; in response to a determination that a data structure of the same type is present within the larger portion, compare pieces of information of the multiple pieces of information of each normalized metadata portion that specify multiple metrics of the data structures of the smaller portion of data and of the larger portion of data to determine whether the data structures of the smaller portion of data and the larger portion of data have identical metrics; and in response to a determination that the data structures of the smaller portion of data and the larger portion of data have identical metrics, compare at least a subset of data values of the data structure of the smaller portion of data to corresponding data values of the data structure of the larger portion of data to determine if the data structures of the smaller portion of data and the larger portion of data are identical and that there is an inclusion relationship in which the smaller portion of data is included in the larger portion of data. The processor may also be caused to, in response to a determination that there is an inclusion relationship between the smaller portion of data and the larger portion of data, perform operations including generate a visualization including: a first graphical element that represents the smaller portion of data; a second graphical element that represents the larger portion of data; and a third graphical element that represents the inclusion relationship in which the smaller portion of data is included in the larger portion of data. The processor may be further caused to transmit the visualization to the client device to enable a visual presentation of the visualization.

Each portion of data in at least a subset of the set of portions of data may include a document; and the multiple pieces of information of each normalized metadata portion that corresponds to a portion of data of the subset of portions of data may include at least one document identifier of a document, and at least one citation to another document that is present within the document. Each document identifier of the at least one document identifier may include at least one of: a title; an author; an identifier of a publisher; or a date of publication. To identify a citation relationship between at least one pair of portions of data within the subset of portions of data in which a document of one portion of data includes a citation to a document of another portion of data, the processor may be caused to: identify a subset of the multiple normalized metadata portions that corresponds to the subset of data portions; and compare document identifiers to citations between each pair of normalized metadata portions of the subset of the multiple normalized metadata portions. In response to an identification of a citation relationship between a pair of portions of data within the subset of portions of data, the processor may be caused to perform operations including generate a visualization including: a first graphical element that represents a first portion of data of the pair of portions of data in which a document includes the citation; a second graphical element that represents a second portion of data of the pair of portions of data that includes the document that is cited by the citation; and a third graphical element that represents the citation relationship. The processor may also be caused to transmit the visualization to the client device to enable a visual presentation of the visualization.

The processor may be caused to perform operations including: receive the query from the client device via the network; translate the query from a first communications protocol in which information in the query is expressed in a first manner, and to a second communications protocol in which the information in the query is expressed in a second manner in a translated query; and relay the translated query to the set of vendor devices via the network to enable the set of vendor devices to perform a search of metadata corresponding to multiple data sets to identify the set of portions of data as relevant to the subject of interest specified in the query and in the translated query.

Prior to translating the query, the processor may be caused to perform operations including: analyze access credentials included with the query to determine whether the client device or a user of the client device is authorized to enter the query into the distributed online library system; and in response to a determination that the entry of the query is not authorized, transmit an indication of lack of authorization to the client device and refrain from translating the query and relaying the translated query.

The processor may be caused to perform operations including: receive the set of metadata portions from the set of vendor devices via the network; and translate each metadata portion of the set of metadata portions from a first communications protocol in which the multiple pieces of information about the corresponding portion of data is expressed in a first manner, and to a second communications protocol in which the multiple pieces of information about the corresponding portion of data is expressed in a second manner in a corresponding normalized metadata portion of the multiple normalized metadata portions.

As part of the translation of each metadata portion to the corresponding normalized metadata portion, the processor may be caused to perform operations including analyze the multiple pieces of information of each metadata portion to determine whether there is a piece of information of a predetermined set of pieces of information to be included in the corresponding normalized metadata portion that is not present among the multiple pieces of information of the metadata portion, and in response to a determination that there is a piece of information of the predetermined set of pieces of information that is not present among the multiple pieces of information of a metadata portion, perform operations including: generate a further query to obtain the piece of information that is not present among the multiple pieces of information of the metadata portion from the corresponding portion of data; transmit the further query to the vendor device of the set of vendor devices from which the metadata portion was received; receive further data from the vendor device that comprises the piece of information that is not present among the multiple pieces of information of the metadata portion; and augment the corresponding normalized metadata portion with the piece of information.

The processor may be caused to perform operations including analyze the query to determine whether the query comprises a request for the provision of the set of portions of data that correspond to the multiple normalized metadata portions to be provide along with a visualization of relationships among the set of portions of data, and in response to a determination that the query does comprise a request for the provision of the set of portions of data, perform operations including: receive the set of portions of data from the set of vendor devices; and relay the set of portions of data to the client device along with the transmission of the visualization to the client device.

A computer-implemented method includes receiving, by a processor at a broker device, and via a network, multiple normalized metadata portions based on a set of metadata portions originating from a set of vendor devices of a distributed online library system, wherein: the set of vendor devices stores a set of data sets of the distributed online library system; each normalized metadata portion of the multiple normalized metadata portions comprises multiple pieces of information descriptive of contents of a corresponding portion of data of a set of portions of data retrieved from the set of data sets; each portion of data in the set of portions of data is identified by a vendor device of the set of vendor devices as relevant to a subject of interest that is specified in a query originating from a client device of the distributed online library system; and the query comprises a request for a visualization of relationships among the portions of data in the set of portions of data. The method also includes: for each pair of normalized metadata portions of the multiple metadata portions, comparing, by the processor, the multiple pieces of information therebetween to identify at least one pair of identical portions of data within the set of portions of data; and in response to the identification of a pair of identical portions of data within the set of portions of data, analyzing, by the processor, the pieces of information of the corresponding pair of normalized metadata portions to determine if there is a dependency relationship between each portion of data of the pair of identical portions of data and another identical portion of data stored within another device that is not among the set of vendor devices. The method further includes, in response to a determination that there is a dependency relationship between each portion of data of the pair of identical portions of data and another identical portion of data stored within another device that is not among the set of vendor devices, performing, by the processor, operations including generating a visualization including: a first graphical element that represents a first portion of data of the pair of identical portions of data; a second graphical element that represents a second portion of data of the pair of identical portions of data; a third graphical element that represents the other identical portion of data stored within the other device; and a pair of graphical elements that each represent the dependency relationship between the other identical portion of data and each of the first portion of data and the second portion of data. The method still further includes transmitting, by the processor and via the network, the visualization to the client device to enable a visual presentation of the visualization.

The multiple pieces of information of each normalized metadata portion may include a data portion identifier of the corresponding portion of data that comprises at least one of: a file name of the corresponding portion of data stored as a file within a vendor device of the set of vendor devices; a title of the corresponding portion of data; an author of the corresponding portion of data; a publisher of the corresponding portion of data; an Internet Protocol (IP) address of the vendor device of the set of vendor devices within which the corresponding portion of data is stored; or a Universal Resource Locator (URL) of the vendor device of the set of vendor devices within which the corresponding portion of data is stored. To identify at least one pair of identical portions of data within the set of portions of data, the method may include comparing, by the processor, the data portion identifiers of each pair of normalized metadata portions of the multiple normalized metadata portions.

At least a subset of the set of portions of data may include a multi-dimensional array data structure; and the multiple pieces of information of each normalized metadata portion that corresponds to a portion of data of the subset of portions of data may include multiple metrics that are each descriptive of contents of the corresponding portion of data. Each metric of the multiple metrics may include at least one of: a quantity of dimensions; a size of each dimension; a data type of stored data values; a bit width of stored data values; a specified data value employed as a null value; or a measure of sparseness of data values other than the null value. To identify at least one pair of identical portions of data within the set of portions of data, the method may include: identifying, by the processor, a subset of the multiple normalized metadata portions that corresponds to the subset of data portions; and comparing, by the processor, the multiple metrics of each pair of normalized metadata portions of the subset of normalized metadata portions.

The computer-implemented method may include, in response to a determination that a pair of portions of data of the set of portions of data are not identical, performing operations including: comparing, by the processor, indications of size of each portion of data of the pair of portions of data in the corresponding pair of normalized metadata portions to determine which portion of data is smaller; analyzing, by the processor, the multiple pieces of information of the normalized metadata portion that corresponds to the smaller portion of data of the pair of portions of data to identify a type of data structure present within the smaller portion of data; analyzing, by the processor, the multiple pieces of information of the normalized metadata portion that corresponds to the larger portion of data of the pair of portions of data to determine if a data structure of the same type is present within the larger portion of data of the pair of portions of data; in response to a determination that a data structure of the same type is present within the larger portion, comparing, by the processor, pieces of information of the multiple pieces of information of each normalized metadata portion that specify multiple metrics of the data structures of the smaller portion of data and of the larger portion of data to determine whether the data structures of the smaller portion of data and the larger portion of data have identical metrics; and in response to a determination that the data structures of the smaller portion of data and the larger portion of data have identical metrics, comparing, by the processor, at least a subset of data values of the data structure of the smaller portion of data to corresponding data values of the data structure of the larger portion of data to determine if the data structures of the smaller portion of data and the larger portion of data are identical and that there is an inclusion relationship in which the smaller portion of data is included in the larger portion of data. The method may also include, in response to a determination that there is an inclusion relationship between the smaller portion of data and the larger portion of data, performing operations including generating, by the processor, a visualization including: a first graphical element that represents the smaller portion of data; a second graphical element that represents the larger portion of data; and a third graphical element that represents the inclusion relationship in which the smaller portion of data is included in the larger portion of data. The method may further include transmitting, by the processor and via the network, the visualization to the client device to enable a visual presentation of the visualization.

Each portion of data in at least a subset of the set of portions of data may include a document; and the multiple pieces of information of each normalized metadata portion that corresponds to a portion of data of the subset of portions of data may include at least one document identifier of a document, and at least one citation to another document that is present within the document. Each document identifier of the at least one document identifier may include at least one of: a title; an author; an identifier of a publisher; or a date of publication. To identify a citation relationship between at least one pair of portions of data within the subset of portions of data in which a document of one portion of data includes a citation to a document of another portion of data, the method may include: identifying a subset of the multiple normalized metadata portions that corresponds to the subset of data portions; and comparing document identifiers to citations between each pair of normalized metadata portions of the subset of the multiple normalized metadata portions. In response to an identification of a citation relationship between a pair of portions of data within the subset of portions of data, the method may include performing operations including generating, by the processor, a visualization including: a first graphical element that represents a first portion of data of the pair of portions of data in which a document includes the citation; a second graphical element that represents a second portion of data of the pair of portions of data that includes the document that is cited by the citation; and a third graphical element that represents the citation relationship. The method may also include transmitting, by the processor and via the network, the visualization to the client device to enable a visual presentation of the visualization.

The computer-implemented method may include: receiving, by the processor, the query from the client device via the network; translating, by the processor, the query from a first communications protocol in which information in the query is expressed in a first manner, and to a second communications protocol in which the information in the query is expressed in a second manner in a translated query; and relaying, by the processor, the translated query to the set of vendor devices via the network to enable the set of vendor devices to perform a search of metadata corresponding to multiple data sets to identify the set of portions of data as relevant to the subject of interest specified in the query and in the translated query.

The computer-implemented method may include, prior to translating the query, performing operations including: analyzing, by the processor, access credentials included with the query to determine whether the client device or a user of the client device is authorized to enter the query into the distributed online library system; and in response to a determination that the entry of the query is not authorized, transmitting, by the processor, an indication of lack of authorization to the client device and refrain from translating the query and relaying the translated query.

The computer-implemented method may include: receiving, by the processor, the set of metadata portions from the set of vendor devices via the network; and translating, by the processor, each metadata portion of the set of metadata portions from a first communications protocol in which the multiple pieces of information about the corresponding portion of data is expressed in a first manner, and to a second communications protocol in which the multiple pieces of information about the corresponding portion of data is expressed in a second manner in a corresponding normalized metadata portion of the multiple normalized metadata portions.

As part of the translation of each metadata portion to the corresponding normalized metadata portion, the method may include performing operations including analyzing, by the processor, the multiple pieces of information of each metadata portion to determine whether there is a piece of information of a predetermined set of pieces of information to be included in the corresponding normalized metadata portion that is not present among the multiple pieces of information of the metadata portion. The method may also include, in response to a determination that there is a piece of information of the predetermined set of pieces of information that is not present among the multiple pieces of information of a metadata portion, performing operations including: generating, by the processor, a further query to obtain the piece of information that is not present among the multiple pieces of information of the metadata portion from the corresponding portion of data; transmitting, by the processor, the further query to the vendor device of the set of vendor devices from which the metadata portion was received; receiving, by the processor, further data from the vendor device that comprises the piece of information that is not present among the multiple pieces of information of the metadata portion; and augmenting, by the processor, the corresponding normalized metadata portion with the piece of information.

The computer-implemented method may include analyzing, by the processor, the query to determine whether the query comprises a request for the provision of the set of portions of data that correspond to the multiple normalized metadata portions to be provide along with a visualization of relationships among the set of portions of data. The method may also include, in response to a determination that the query does comprise a request for the provision of the set of portions of data, performing operations including: receiving, by the processor, the set of portions of data from the set of vendor devices; and relaying, by the processor, the set of portions of data to the client device along with the transmission of the visualization to the client device.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 16A, 16B, 16C, 16D, 16E, 16F and 16G, together, illustrate a more detailed example embodiment of discovery and visualization of relationships.

FIGS. 22A and 22B, together, illustrate an example embodiment of a logic flow of a provider device retrieving and relaying pieces of metadata in response to a query.

DETAILED DESCRIPTION

Figure 1:
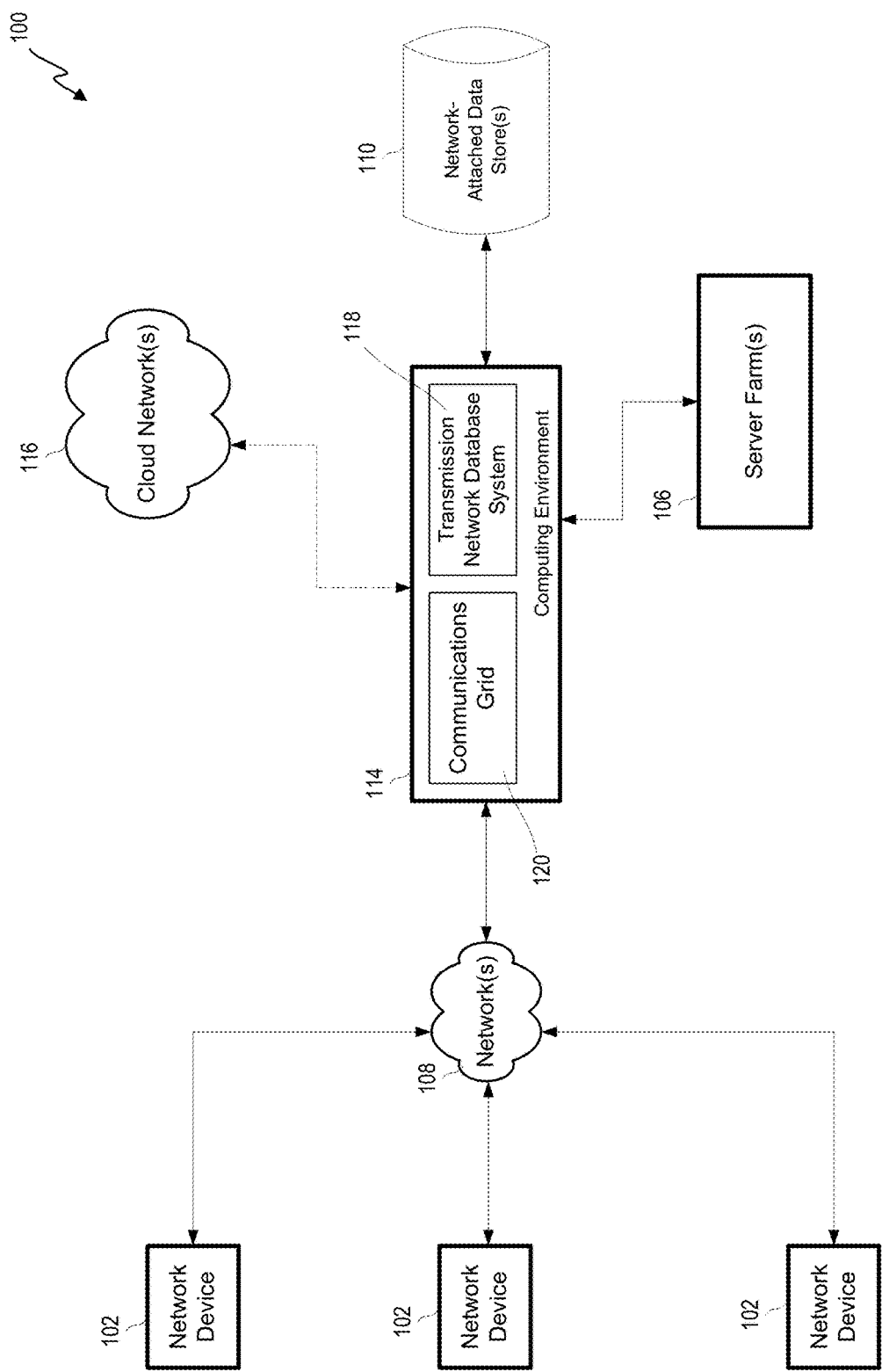
FIG. 1 illustrates a block diagram that provides an illustration of the hardware components of a computing system, according to some embodiments of the present technology.

Various embodiments described herein are generally directed to the discovery and visualization of relationships among multiple portions of data (e.g., multiple data sets and/or portions thereof) concerning a selected subject that are made available within a distributed online library system. More precisely, in a distributed online library system, a broker device may serve as a gateway under the control of a curator of an online library to numerous sources of data that may be made accessible through one or more providers devices thereof under terms of agreement(s) with the curator. Each provider device may, in turn, serve as a gateway to numerous vendor devices, where each vendor device may directly store one or more data sets that each contain one or more portions of data on various subjects, and/or may store pointers and/or employ other mechanisms of redirection to one or more associated source devices that may store one or more of such data sets. A curator or other personnel may operate a client device to transmit a query, to the broker device, to provide the client device with indications of the storage locations of, and relationships among, the various portions of data available through the broker device that are in some way associated with a specified subject. The broker device may relay the query to each of the one or more provider devices in a broadcast thereto, and each provider device may, in turn, similarly relay the query to each of the one or more vendor devices to which each of the provider devices serves as a gateway. Each vendor device may respond by transmitting, to its associated provider device, one or more portions of metadata indicative of various details of the storage of portions of data by that vendor device and/or by one or more associated storage devices. In turn, each of the one or more provider devices may relay the received metadata portions to the broker device. The broker device may analyze the received metadata portions to identify relationships among the various data sets and/or portions thereof that correspond to the received metadata portions, and may generate a visualization of the identified relationships, which the broker device may then transmit to the requesting client device to be visually presented.

The data of each data set stored within a distributed online library system may be any of a variety of types of data (e.g., societal statistics data, business operations data, raw data from sensors of large scale experiments, financial data, medical treatment analysis data, data from geological or meteorogical instruments, streams of data collected from Internet-attached appliances, etc.). As the entities that may maintain a distributed online library system may be any of a variety of scholastic, industrial and/or governmental entities, any of a wide variety of uses may be made of such data sets by the personnel of such entities.

As will be familiar to those skilled in the art, it is a commonplace practice for a large data set to be stored within a storage system alongside metadata that provides a description of numerous aspects of the manner in which data is organized within the data set and/or characteristic of the data, itself, within the data set. By way of example, the metadata associated with a data set may describe the type of data structure employed to organize the data of the data set, including and not limited to, an array structure of a specified number of dimensions, or an indexed set of spreadsheets and/or documents, along with indications of a format employed by each. Also by way of example, the metadata associated with a data set may describe aspects of indexing system(s) used to access data values therein, including and not limited to, ranges of numerical values of the index for each dimension of a multi-dimensional array structure, or lists of text labels used to identify rows, columns, chapters, sections, figures, pictures. Further by way of example, the metadata associated with a data set may describe various characteristics of the data values, themselves, including and not limited to, indications of data types for data values in various portions of the data set (e.g., byte, word, double-word, quad-word, text characters, signed or unsigned integer values, floating point values, etc.), indications of one or more data values used as "null" data values, an indication of a degree of sparseness of non-null data values, or the size of each dimension in a multi-dimensional array. Still further by way of example, the metadata associated with a data set may describe various storage locations, including and not limited to, storage location(s) of the data set, of portions of data that are included in the data set, of data set(s) and/or other portions of data that were used in generating the data set, and/or of data set(s) and/or other portions of data that are cited and/or otherwise referred to.

As will also be familiar to those skilled in the art, there are numerous widely accepted and used standards for the storage of data that specify numerous parameters of the manner in which a data set may be stored, may be formatted for storage, may be indexed to make data values accessible from within storage, may be compressed for storage, may be distributed across multiple storage devices within storage, etc. In some embodiments, one or more of such parameters for the storage of a data set may be dictated, or at least influenced, by the selection of operating system and/or the file system used in storing a data set. Also, in some embodiments, one or more of such parameters for the storage of data may be dictated, or at least influenced by, the selection of database searching tools and/or data browsing applications used to retrieve and/or view information from a data set. Further, in some embodiments, the data type(s) of the data, itself, in a data set may dictate, or at least influence, one or more of such parameters for the storage of the data set. Still further, the fact of the need for the data in the data set to be encrypted and/or access thereto to be restricted may dictate and/or influence one or more of such parameters.

A curator of distributed online library system may select a subject to employ in evaluating the quality and/or breadth of the data currently available within the system, by operating a client device to generate a query to the system about what portions of data are present therein regarding the selected subject and the relationships among those portions of data. Such a query may or may not include a request to actually retrieve and provide those portions of data. In some embodiments, the distributed online library system may enforce some degree of limitation of access, such as a limitation of access to only individuals associated with the scholastic, industrial and/or governmental entity that maintains the system. Thus, the entry of any such query into the system may be required to be preceded with the entry of the credentials of the person who enters the query, although it may be that the particular client device they operate to enter the query may, itself, be provided with the necessary credentials to enable such access.

Upon entry of the query, the client device may transmit that query to a broker device of the distributed online library system. The broker device may serve as the collection point for all queries, and in so doing, may serve as the gateway to all of the devices of the system that are in some way responsible for storing the data of the system. As previously discussed, such a distributed online library system may rely on the provision of access to large quantities of data by one or more providers that may be caused to do so under licensing contracts and/or any of a variety of other arrangements. Indeed, in some embodiments, it may be that at least a subset of the data to which access is provided may be the property of the entity that maintains the system, such that the entity, itself, may serve as one of the providers.

Regardless of the identities of each of the one or more providers, each of the one or more providers may, at an earlier time, register a provider device with the broker device to establish an ongoing network connection therebetween. In so doing, a variety of parameters for that network connection may be configured to cause that provider device to employ a particular selected communications protocol for exchanging queries and responses to queries therebetween through a network connection. More specifically, the selection of such a communications protocol may entail the selection and use of a particular syntax and/or other particular parameters for the exchange, therebetween, of queries for, as well as portions of, metadata about portions of data within data sets. In some embodiments, it may be that the broker device employs a single selected communications protocol in exchanging such queries and information with any provider device such that all provider devices that are to communicate with the broker device must be configured to conform to the same set of communications requirements, including the particular selected communications protocol.

Alternatively or additionally, in some embodiments, one or more of the provider devices may be virtual machines (VMs) and/or may be embodied in the form of executable routines that are each to be executed within a VM. In such embodiments, such VMs may be instantiated and maintained within the broker device. It may be that the registration of a provider device is then carried out by the provision and/or installation of a routine that embodies the provider device by the provider to a curator of the distributed online library system for installation as or within one of the VMs of the broker device.

As previously alluded to, any of a variety of operating systems, file systems, database tools, etc. may be employed in performing the work of storing and providing access to data sets. As a result, each of the vendor devices may employ any of a wide variety of communications protocols for the exchange of queries and portions of metadata in response to queries. In some embodiments, each provider device may translate queries and portions of metadata between a communications protocol used in such exchanges with the broker device and a different communications protocol used in such exchanges with one or more vendor devices. It is envisioned that a provider will likely use the same communications protocol with all of its vendor devices such that their provider device will only need to translate between the communications protocol of the broker device and a single communications protocol for all of the provider's vendor devices.

However, embodiments are possible in which there may be more than one communications protocol employed by the vendor devices associated with a single provider. By way of example, it may be that the provider, itself, engages in licensing of data from one or more vendors, among which may be differences in the communications protocols used by their vendor devices. Thus, in some embodiments, the provider device associated with a particular provider may translate between the communications protocol of the broker device and multiple other communications protocols used by different ones of the vendor devices made available through that particular provider. Alternatively, a single provider may choose to support multiple different communications protocols among multiple vendor devices through the use of a different provider device for each such communications protocol.

Regardless of the exact manner in which each provider device may be implemented, regardless of the quantity of provider devices that may be employed by each provider, and regardless of the number of communications protocols that each provider device may translate between, upon receiving the query from the client device, the broker device may relay the query to each provider device of the one or more provider devices that have been registered with the broker device. In a manner that is analogous to the registration of provider devices with the broker device, it may be that each vendor device must similarly be registered with the particular provider device by which it is added to a distributed online library system. Thus, just as the broker device may serve as the gateway to all of the provider devices within a distributed online library system, each provider device may serve as a gateway that controls access to the multiple vendor devices that are registered with it.

In embodiments in which at least a subset of provider devices are operated by entities other than the entity that maintains the distributed online library system, it may be that one or more of the provider devices enforces restrictions in accesses to information that may be more stringent than the restrictions to distributed online library system that may be enforced by the broker device. By way of example, while the broker device may restrict access to the information of the distributed online library system to persons and/or devices that are associated with the entity that maintains the distributed online library system, a particular provider device may further restrict access to information to no more than a preselected maximum quantity of persons and/or devices at any one time. Alternatively or additionally, it may be that access to particular data sets and/or portions of data contained within particular data sets of a particular vendor device is time limited to be available for a predetermined period of time that may have been specifically agreed to in a licensing provision. As yet another alternative, it may be that, among the personnel of the entity that maintains the distributed online library system, only a particular group of persons are permitted to have access to one or more particular data sets that may be associated with a particular vendor device. Therefore, while the broker device may relay the query to all of the provider devices, one or more of the provider devices may refrain from relaying the query to one or more of the vendor devices that are registered with it. In each case where a provider device does relay the query, as previously discussed, the provider device may translate the query between the communications protocol by which it was received from the broker device and into the different communications protocol by which it is to be transmitted to one or more vendor devices.

Each of the vendor devices that does receive a translated form of the query may search the metadata associated with one or more data sets to identify any portions of data that may be relevant to the subject of the query. Each vendor device that successfully identifies such a portion of data may transmit a portion of metadata that corresponds to each such a portion of data back to the provider device. Each provider device that receives such portions of metadata may translate those portions of metadata from the communications protocol by which they were transmitted from one or more of the vendor devices, and into the communications protocol by which they are to be transmitted to the broker device.

Upon receipt, through one or more provider devices, of the portions of metadata provided by multiple vendor devices concerning multiple different portions of data, the broker device may perform various analyses and various comparisons among the different portions of metadata to identify relationships among their corresponding portions of data that are relevant to the subject of the query. Such analyses and/or comparisons may involve the text of various labels of data sets, portions of data sets, chapters and/or sections of documents, rows and/or columns of tables, etc. Alternatively or additionally, such analyses and/or comparisons may involve the size, organization, sparseness, data types and/or other characteristics of the portions of data that correspond to each of the portions of metadata.

As will be familiar to those skilled in the art, the choice of the operating system, the file system, the database searching tools and/or the browsing applications used in the storage and/or retrieval of data sets within each of the vendor devices may necessarily be correlated to the types of information that is included within associated metadata. Thus, the metadata maintained by different vendor devices that employ different selections of such components may contain different types of information. As will be apparent to those skilled in the art, such differences in metadata among different vendor devices may hamper the performance of comparisons made by the broker device among the portions of metadata it receives from different vendor devices. In some embodiments, the broker device may address such differences by transmitting further inquiries directed at one or more particular vendor devices (through appropriate one provider device(s)) for additional pieces of information that were not included in the portions of metadata provided therefrom, but which may be have been provided in portions of metadata from other vendor devices for other corresponding portions of data. Alternatively, in other embodiments, such further queries may originate from the one or more provider devices. The responses to such further queries may then be incorporated into the translated versions of the portions of metadata transmitted by such provider device(s) to the broker device.

Regardless of whether such further inquiries to round out the information provided in the portions of metadata are made, the broker device may generate one or more visualizations that include indications of the portions of data that have been identified by the vendor devices as relevant to the subject of the query, together with indications of relationships that have been identified thereamong. As will be explained in greater detail, various colors, patterns, symbols and/or other visual cues may be used to indicate differing types of relationships. The broker device may then transmit such visualization(s) to the requesting client device from which the original query was received by the broker device. Among the relationships that may be depicted in such visualizations may be relatively weak relationships in which multiple portions of data With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
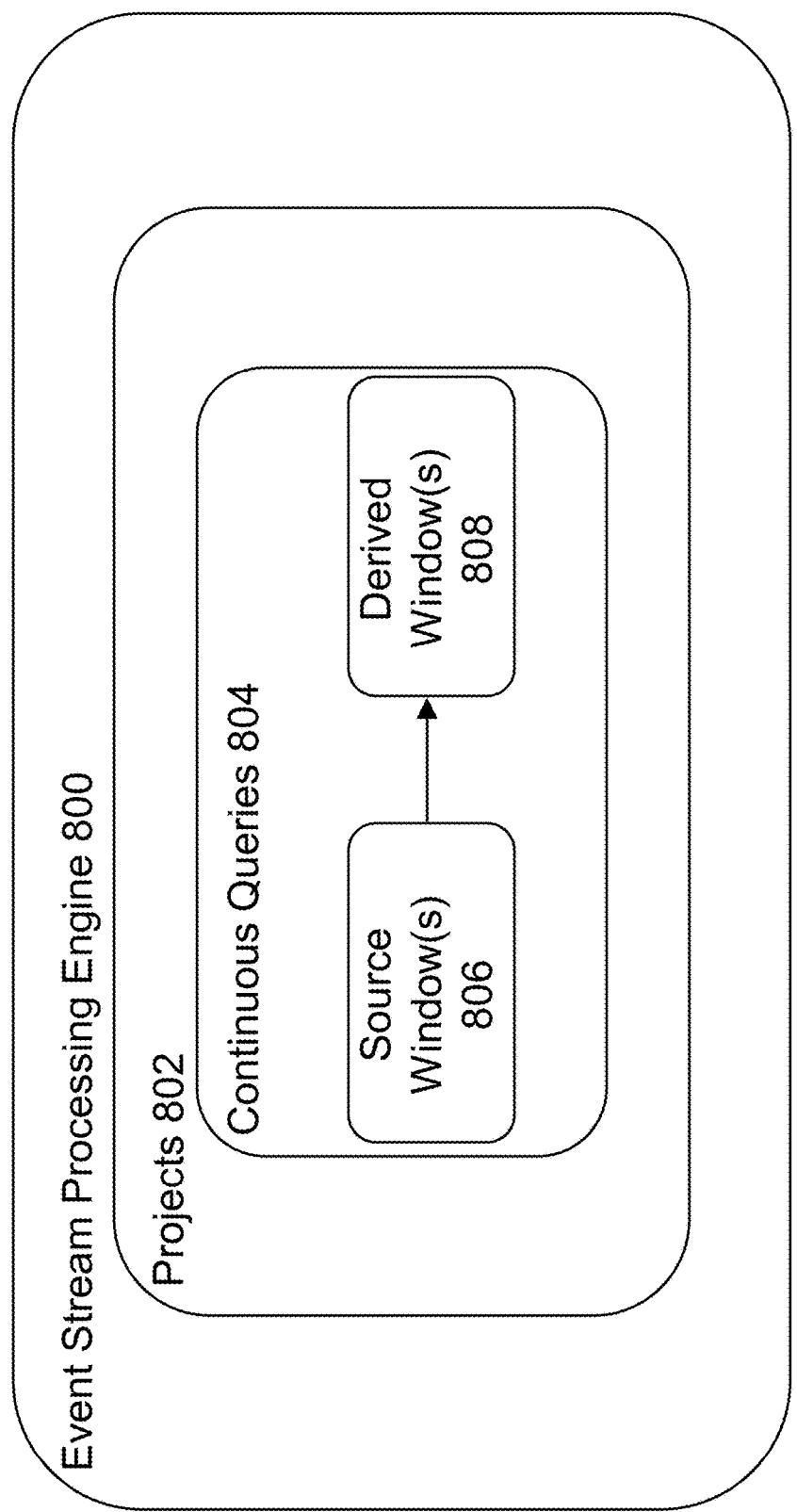
FIG. 8 illustrates a block diagram including components of an Event Stream Processing Engine (ESPE), according to embodiments of the present technology.
Figure 9:
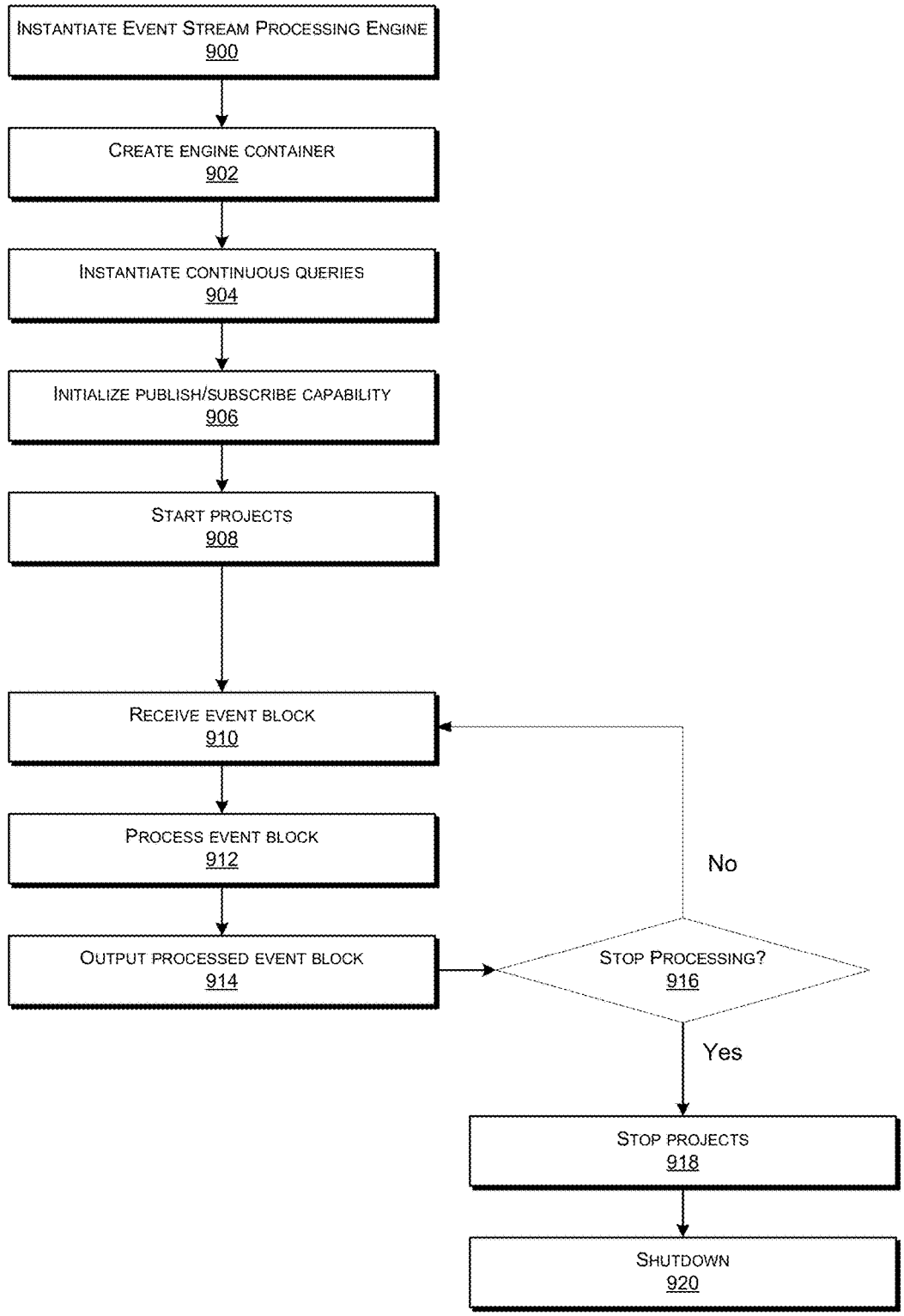
FIG. 9 illustrates a flow chart showing an example process including operations performed by an event stream processing engine, according to some embodiments of the present technology.
Figure 10:
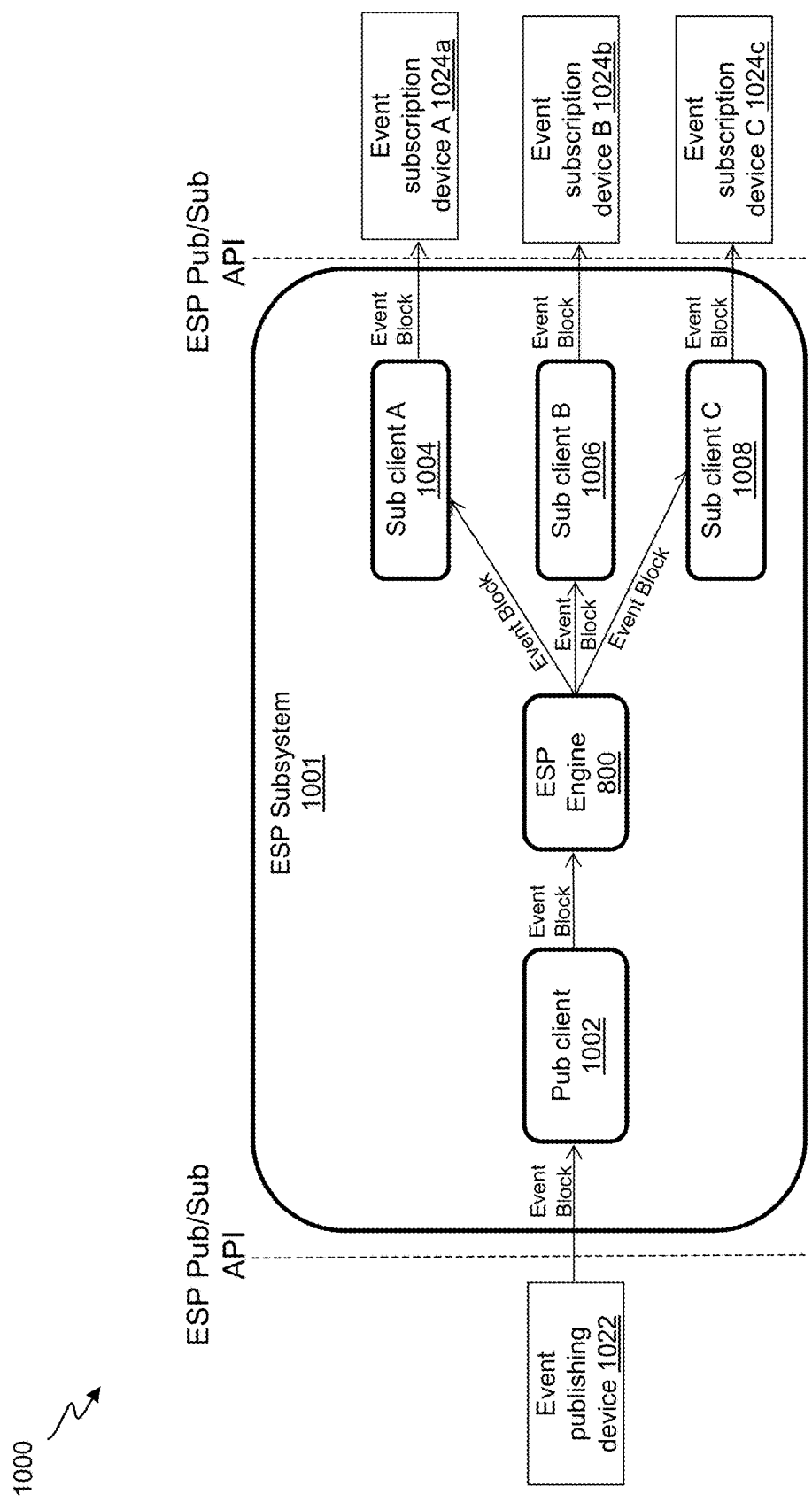
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
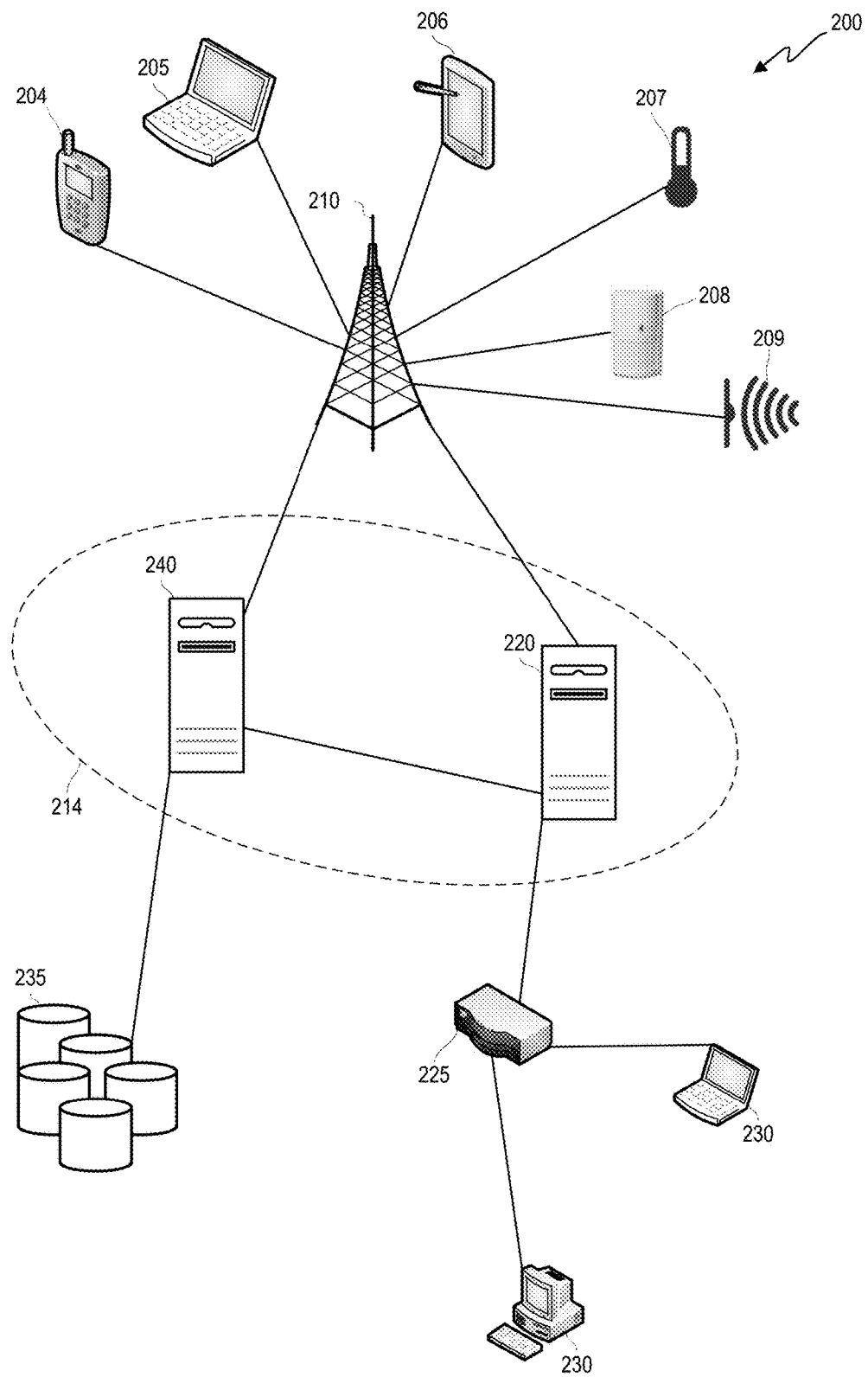
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
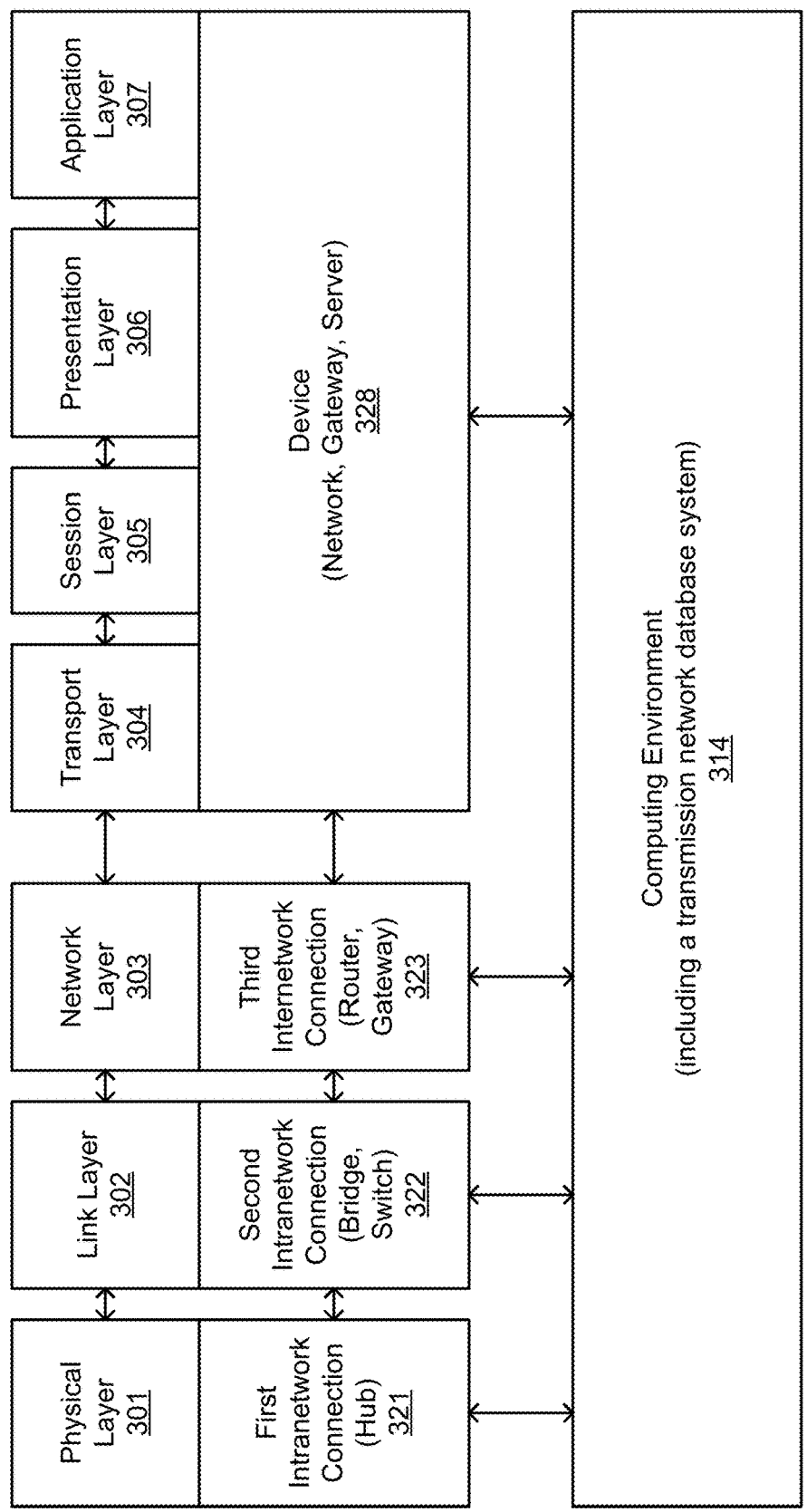
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
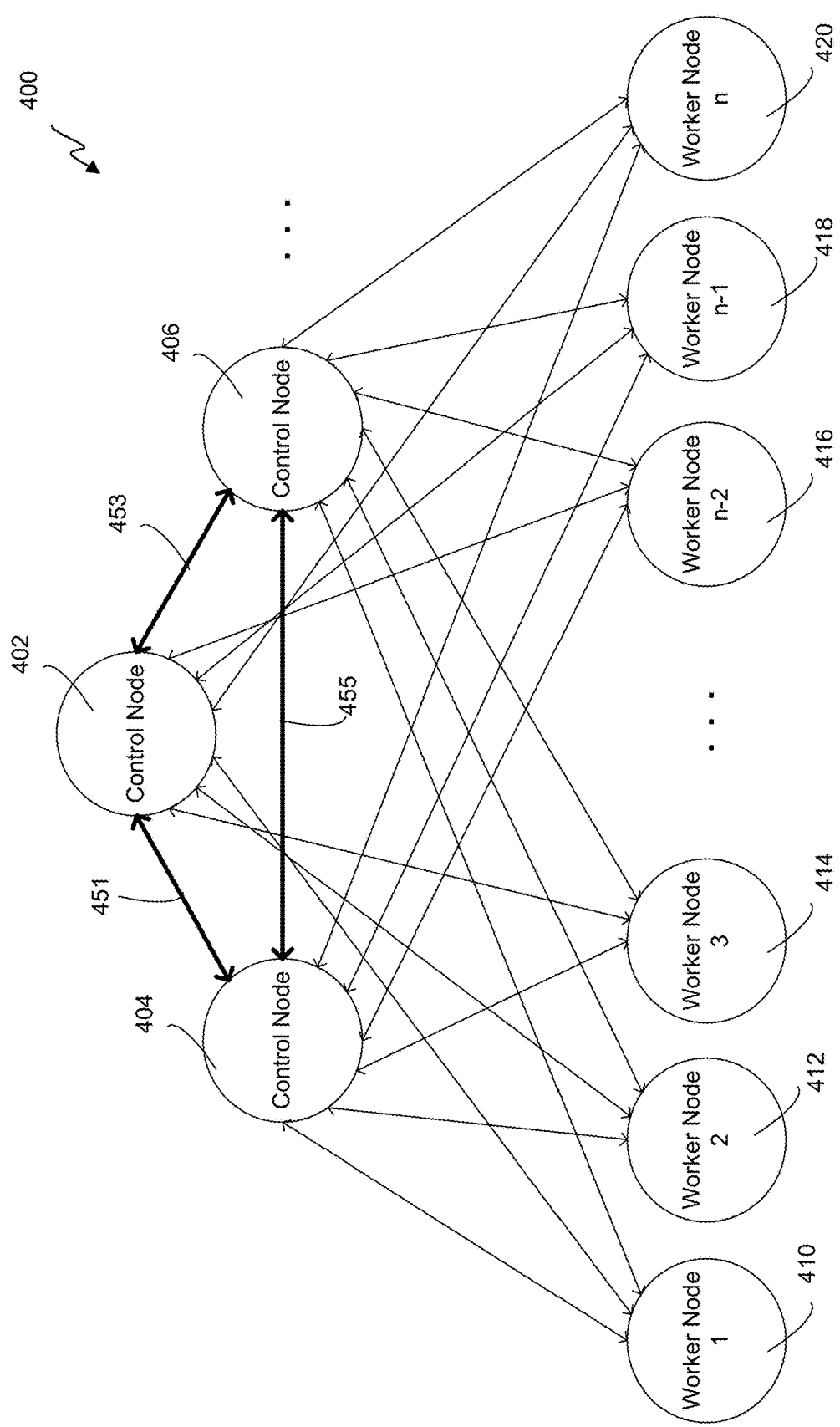
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology.

Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
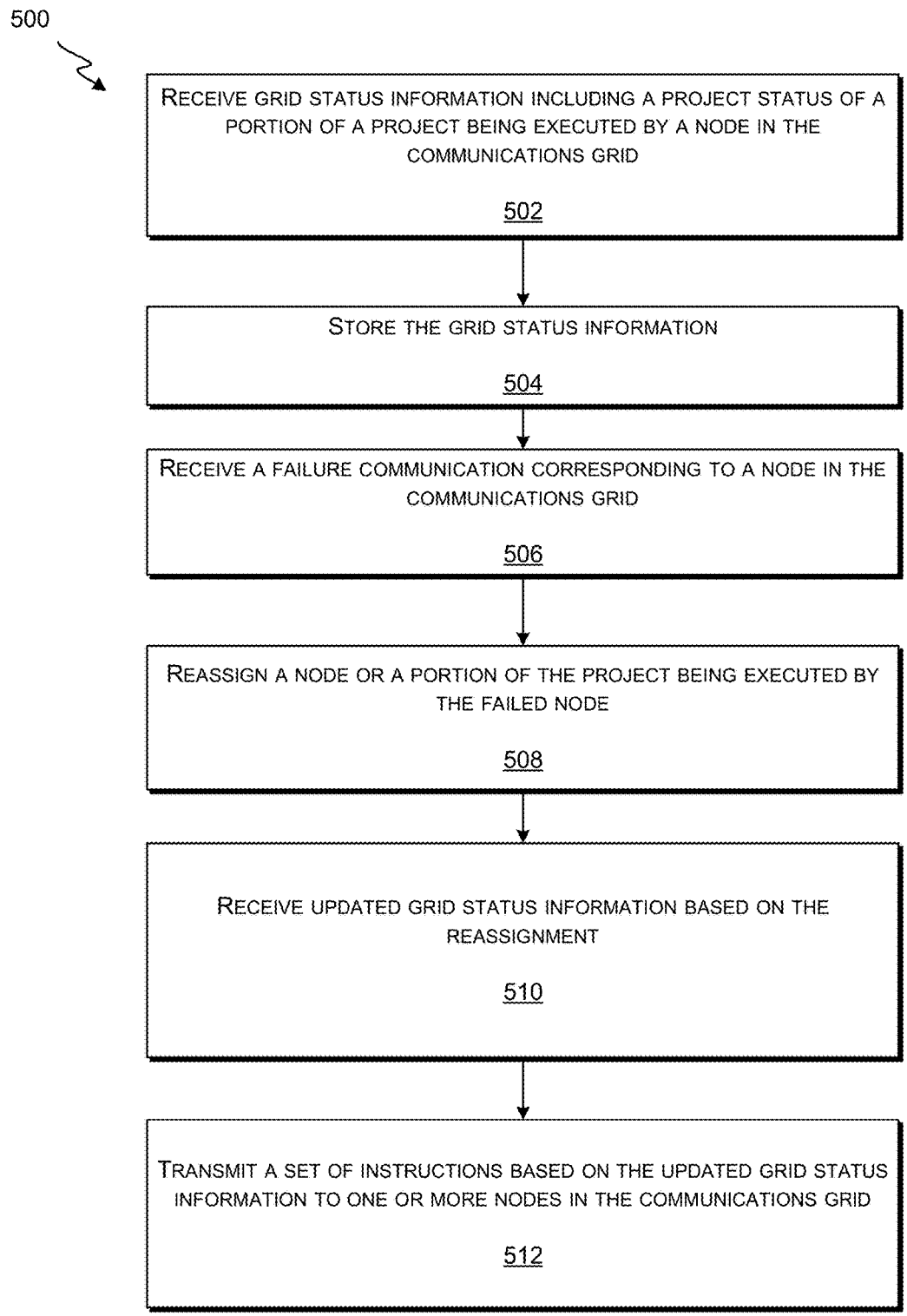
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
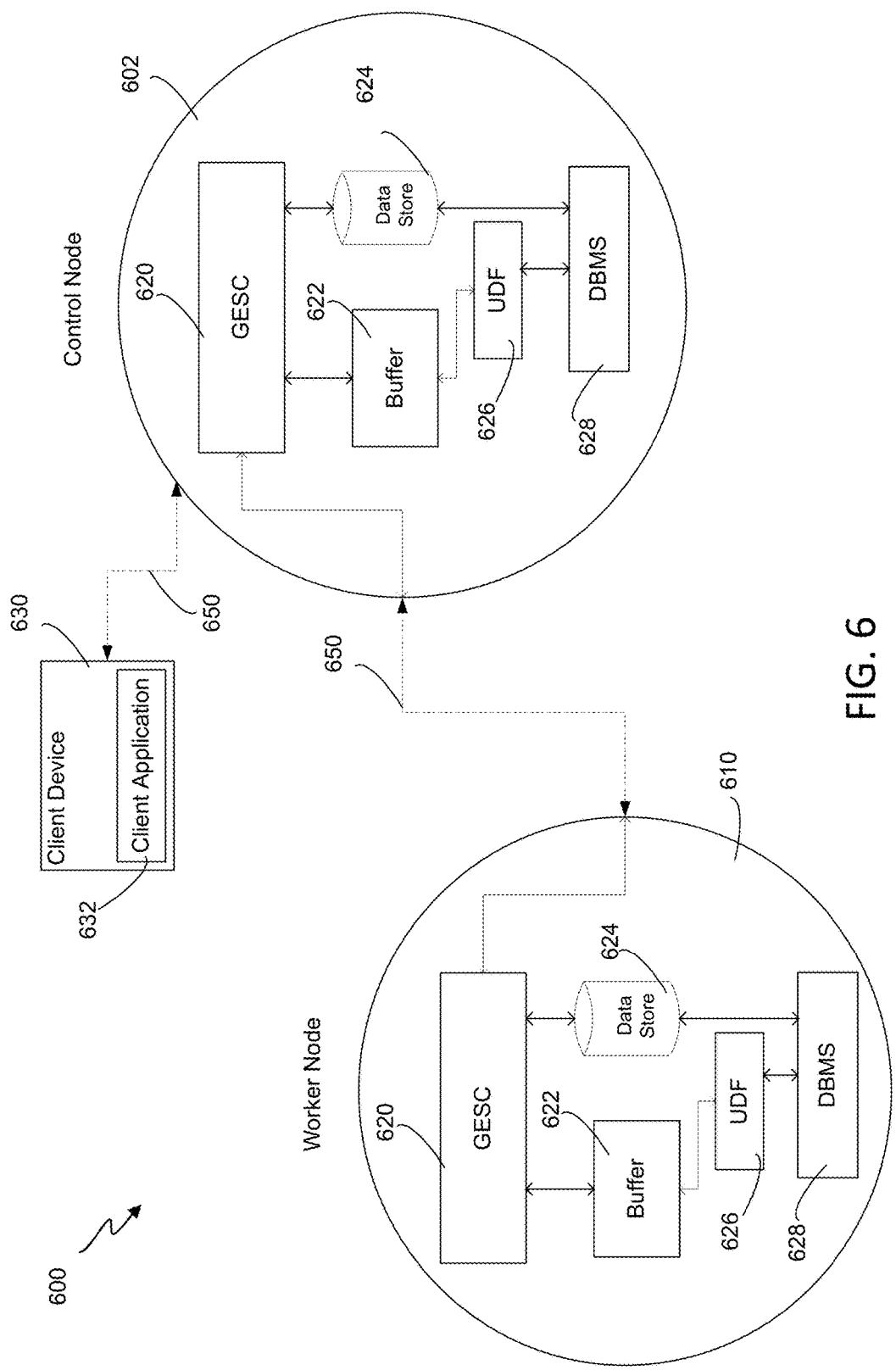
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
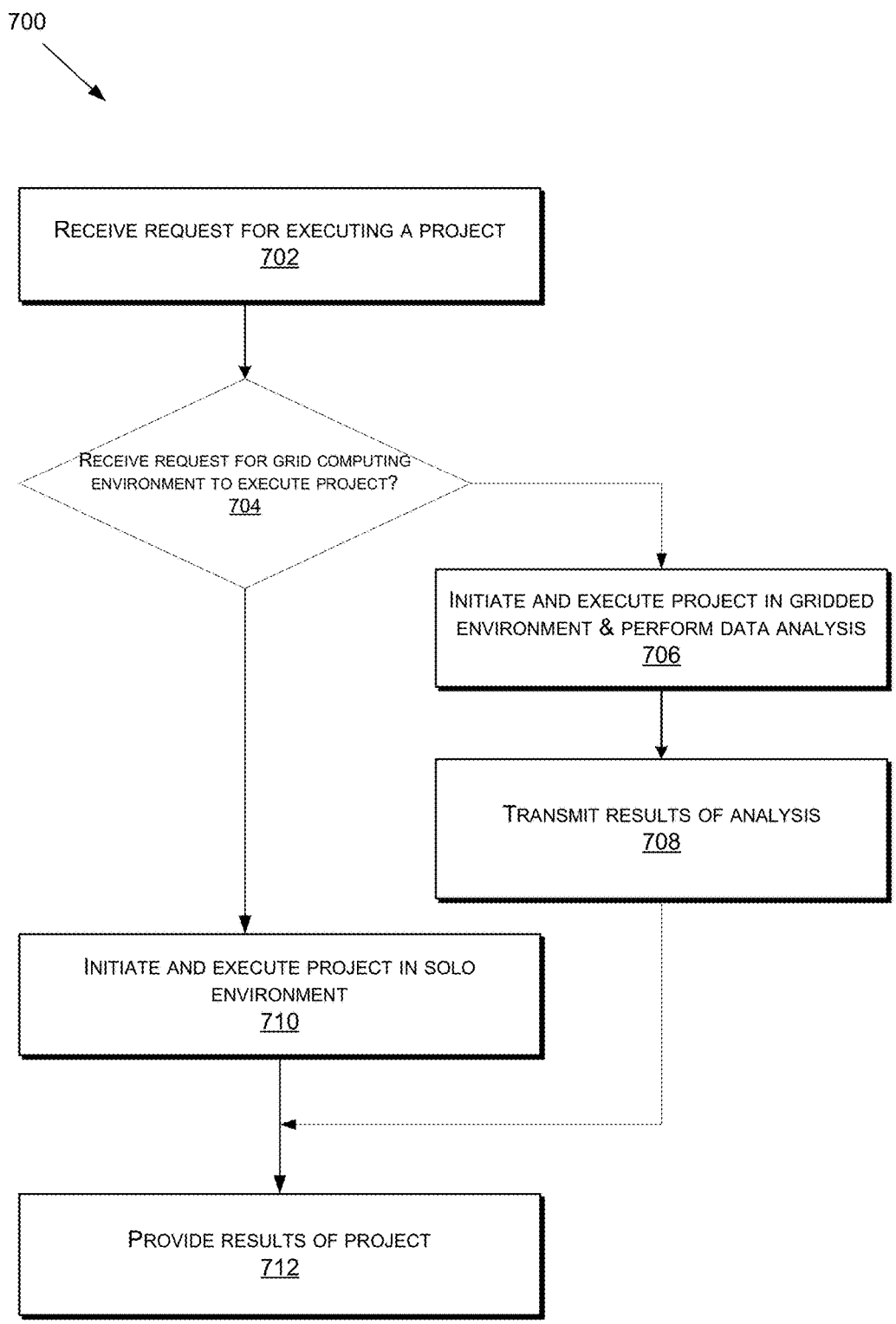
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
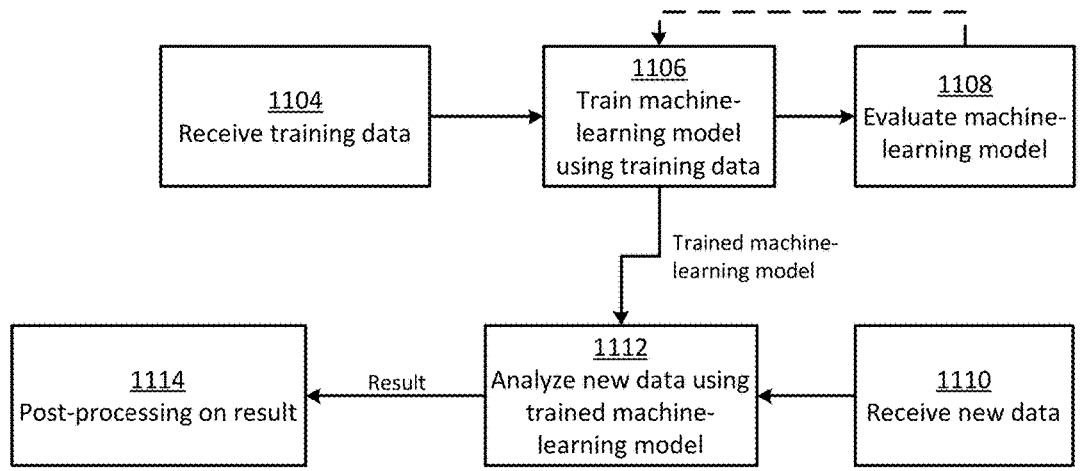
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
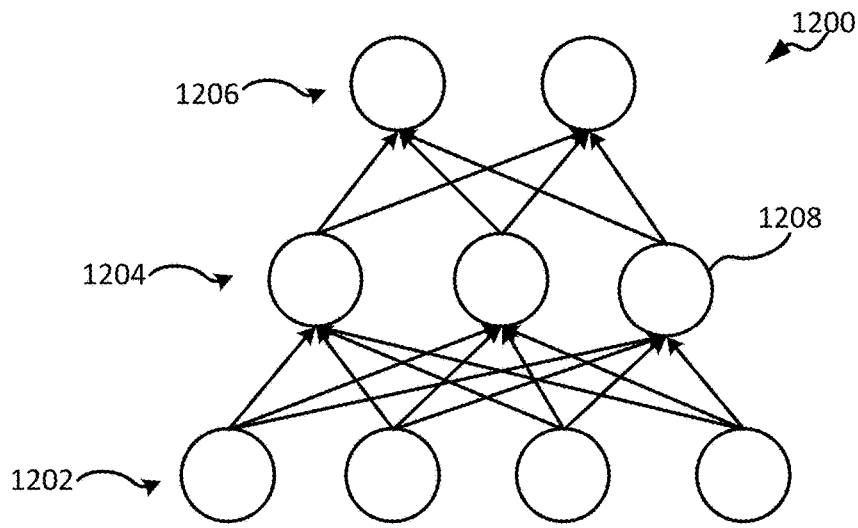
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13A:
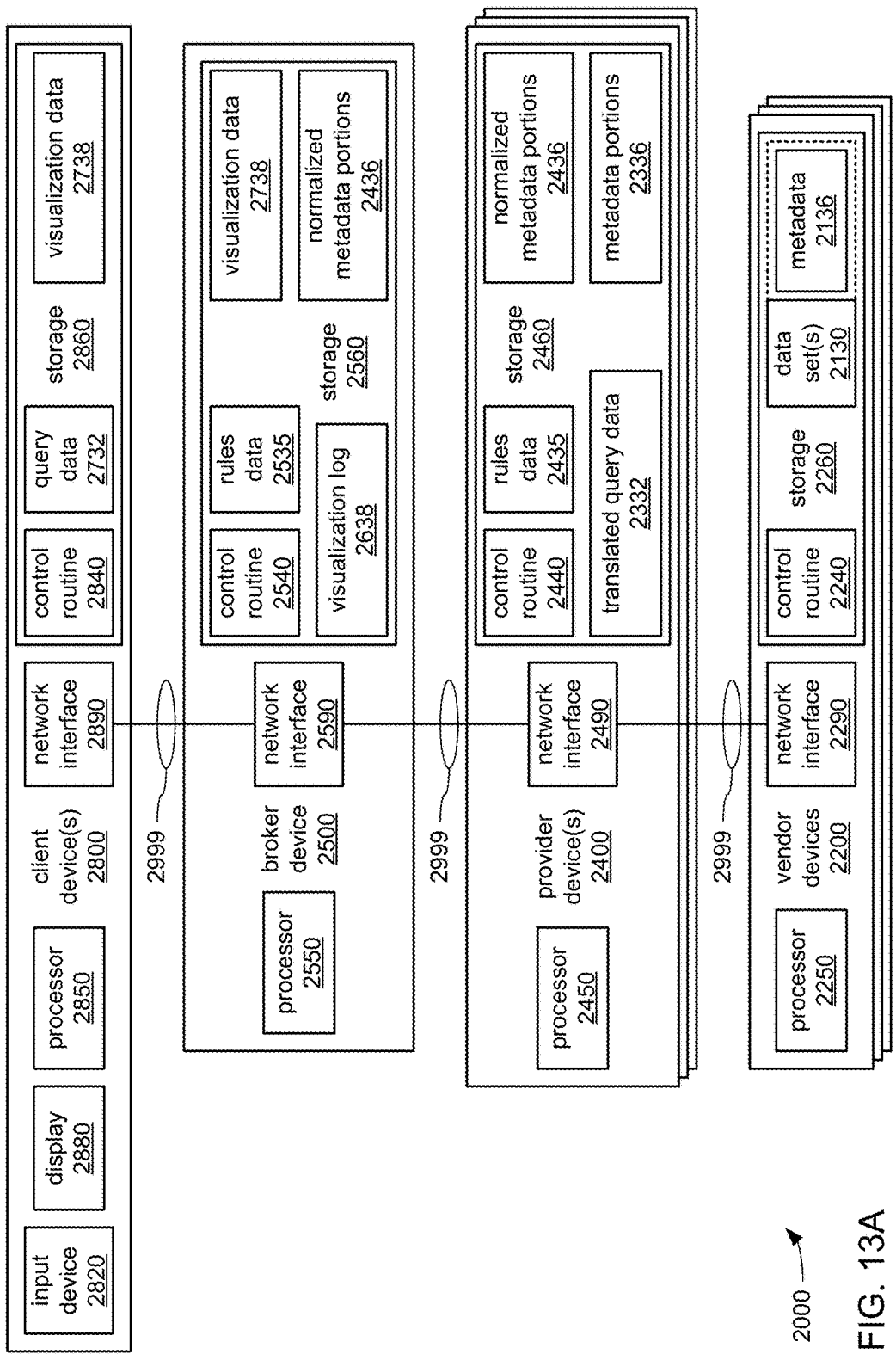
FIGS. 13A and 13B, together, illustrate an example embodiment of a distributed online library system.
Figure 13B:
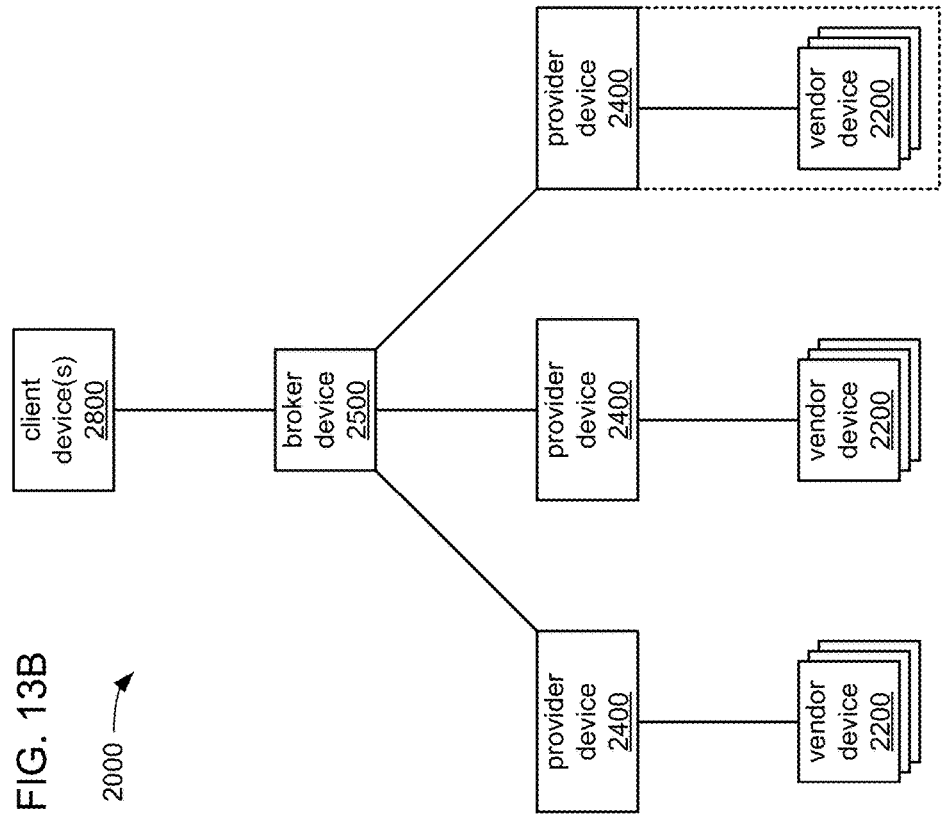
Figure 14A:
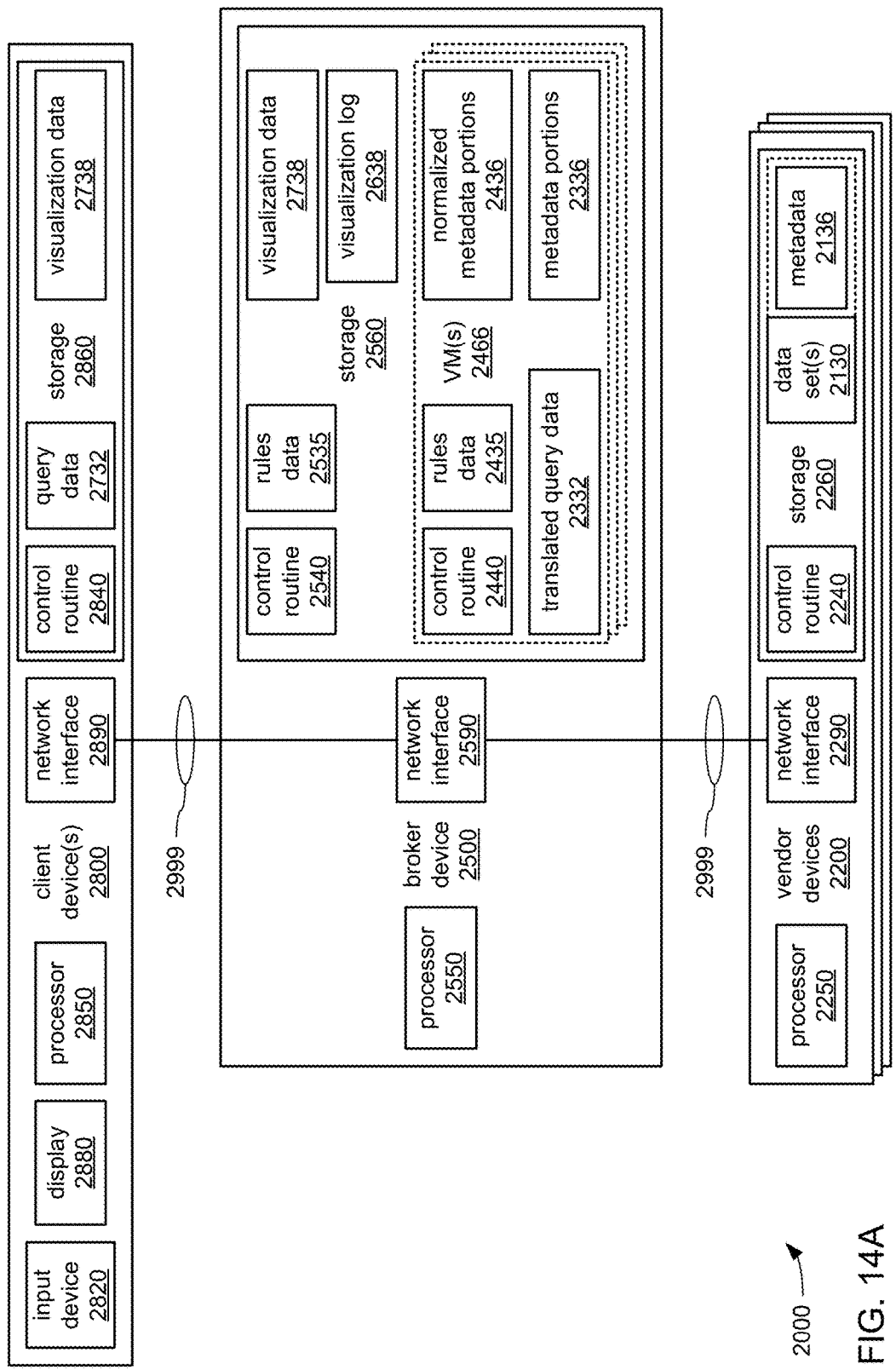
FIGS. 14A and 14B, together, illustrate another example embodiment of a distributed online library system.
Figure 14B:
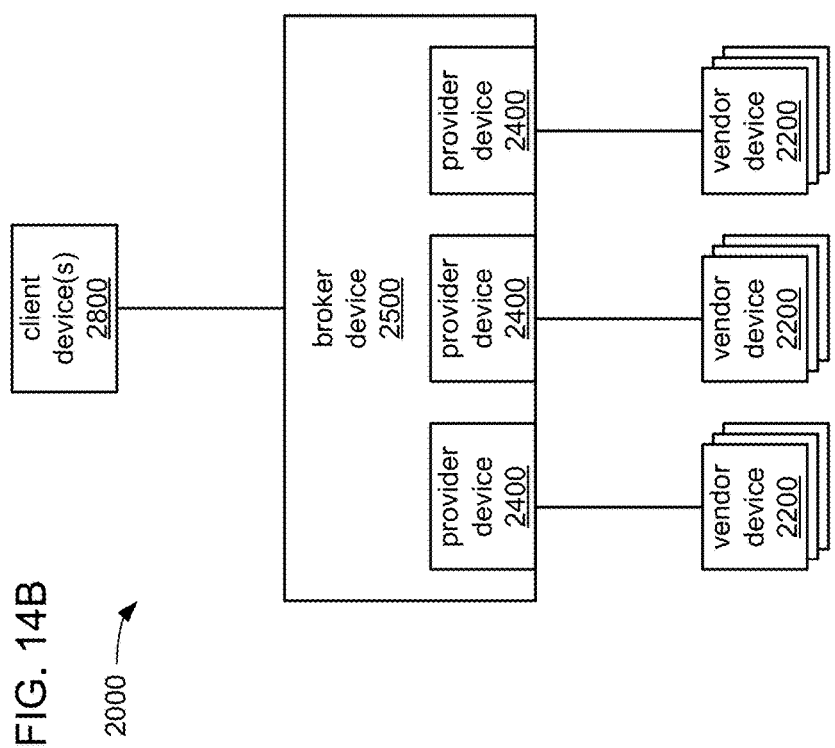

FIGS. 13A and 13B illustrates a block diagram of an example embodiment of a distributed online library system 2000 incorporating multiple vendor devices 2200, one or more provider devices 2400, a broker device 2500 and/or one or more client devices 2800 coupled by a network 2999. FIGS. 14A and 14B illustrates a block diagram of an alternate example embodiment of the distributed online library system 2000 in which the broker device 2500 may perform the functions of the one or more provider devices 2400. In both of the embodiments of FIGS. 13A-B and 14A-B, the distributed online library system 2000 provides personnel who operate the one or more client devices 2800 with access to data from data sets 2130 that may be stored by the multiple vendor devices 2200. Additionally, in both of these embodiments, the distributed online library system 2000 also provides at least selected persons who operate the one or more client devices 2800 with visualizations of relationships that may exist among portions of data of the stored data sets 2130.

Figure 15:
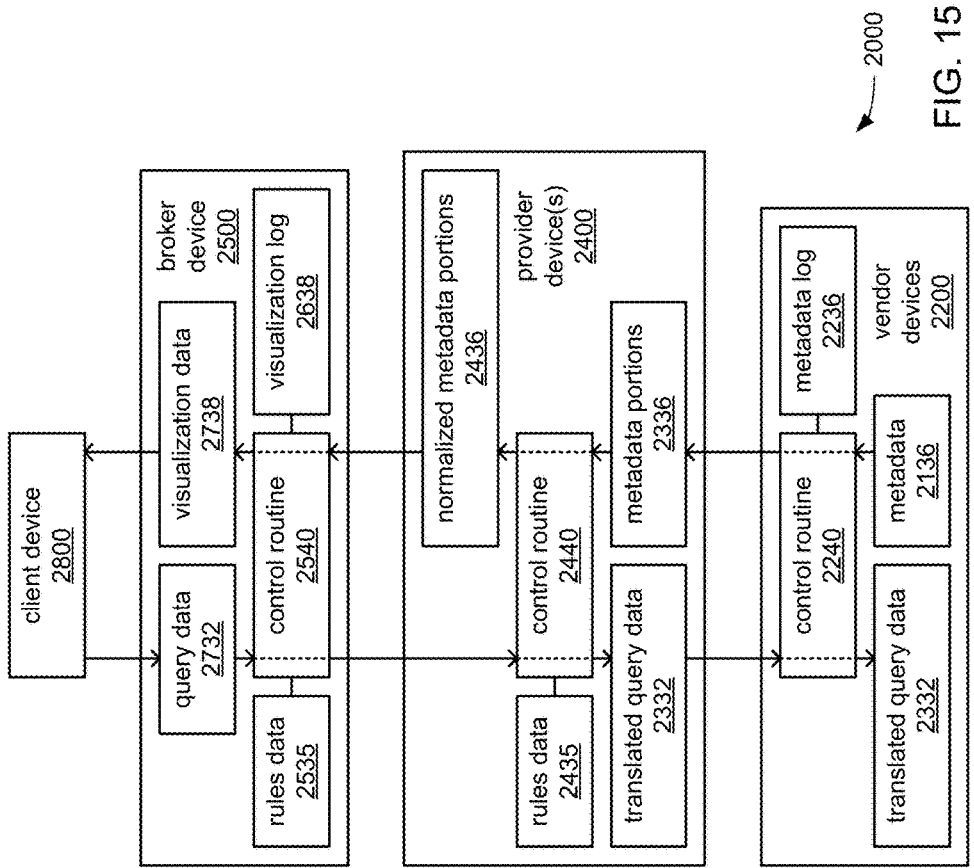
FIG. 15 illustrates an example embodiment of discovery and visualization of relationships among pieces of information in a distributed online library system.

In support of such operations, the devices 2200, 2400, 2500 and/or 2800 may exchange one or more queries (e.g., the depicted query data 2732 and/or translated query data 2332), one or more portions of metadata (e.g., the depicted metadata portions 2336 and/or normalized metadata portions 2436), and/or data representing one or more visualizations (e.g., the depicted visualization data 2738). In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission. FIG. 15 illustrates a simplified block diagram of such operations and exchanges through the network 2999 to generate of such visualizations in response to queries originating at client device(s) 2800 that request such visualizations.

Turning to FIGS. 13A-B, as well as to FIG. 15, in various embodiments, each of the vendor devices 2200 may incorporate one or more of a processor 2250, a storage 2260, and a network interface 2290 to couple each of the vendor devices 2200 to the network 2999. Within each of the vendor devices 2200, the storage 2260 may store a control routine 2240, and/or one or more data sets 2130. Additionally, separate metadata 2136 may also be stored within the storage 2260 for each data set 2130 that is stored therein. Further, as depicted, in some embodiments, each data set 2130 stored therein may incorporate its corresponding metadata 2136 as a component of the data set 2130. The control routine 2240 may incorporate a sequence of instructions operative on the processor 2250 of each of the vendor devices 2200 to implement logic to perform various functions, at least partially in parallel with the processors 2250 of others of the vendor devices 2200.

Within each of the vendor devices 2200, in executing the control routine 2240, the processor 2250 may operate the network interface 2290 to await the receipt, from a provider device 2400, of a query for information from a data set 2130 and/or from corresponding metadata 2136. In response to the query, and based on the information that is requested therein, the processor 2250 may search one or more data sets 2130 and/or corresponding metadata 2136 to identify portions of data set(s) 2130 and/or portions of corresponding metadata 2136 that answer the query, and may then be caused to operate the network interface 2290 to transmit the identified portions of data set(s) 2130 and/or the identified portions of corresponding metadata 2136 back to the provider device 2400 from which the query was received.

It should be noted that, although the vendor devices 2200 are depicted as directly storing data set(s) 2130 and/or associated metadata 2136 within the storage 2260, as will be explained in greater detail, there may be other embodiments in which one or more data sets 2130 and/or associated metadata 2136 may be stored within one or more separate storage devices with which one or more vendor devices 2200 may be in communication via the network 2999. In such other embodiments, such vendor device(s) 2200 may store pointers and/or other information required for communications with such storage devices 2100 within the storage 2260.

In various embodiments, each of the provider devices 2400 may incorporate one or more of a processor 2450, a storage 2460, and a network interface 2490 to couple each of the provider devices 2400 to the network 2999. Within each of the one or more provider devices 2400, the storage 2460 may store a control routine 2440, rules data 2435, the translated query data 2332, the metadata portions 2336 and/or the normalized metadata portions 2436. The control routine 2440 may incorporate a sequence of instructions operative on the processor 2450 of each of the provider devices 2400 to implement logic to perform various functions, at least partially in parallel with the processors 2450 of other provider devices 2400 in embodiments of the distributed online library system 2000 that include more than one of the provider devices 2400.

In executing the control routine 2440, the processor 2450 of each provider device 2400 may operate the network interface 2490 to await the receipt, from the broker device 2500, of a query for information from data sets 2130 and/or corresponding metadata 2136 that are stored by and/or under the control of the multiple vendor devices 2200. The processor 2450 may be caused to translate such a query from one communications protocol by which the query was received to another (which may be at least temporarily stored as the translated query data 2332), and may then be caused to operate the network interface 2490 to relay the translated query onward to multiple vendor devices 2200. The processor 2450 may then be caused to operate the network interface 2490 to await the receipt of portions of data sets 2130 and/or portions of corresponding metadata 2136 from a subset of the multiple vendor devices 2200 to which the processor 2450 relayed the translated query. Where portions of metadata are received, the processor 2450 may be caused to translate the received metadata portions 2336 from one communications protocol by which they were received to another (which may be at least temporarily stored as the normalized metadata portions 2436), and may then be caused to relay the normalized metadata portions 2436 to the broker device 2500.

In some embodiments, execution of the control routine 2440 by the processor 2450 may cause the processor 2450 to analyze access credentials of a client device 2800 and/or an operator of a client device 2800 from which the query originates to determine whether the query is authorized. As previously discussed, such an authorization check may be in addition to an authorization check that may be performed at the broker device 2500, and may be based on different criteria, such as a limitation on the number of users that may be supported at a time, rather than on the identities of those users.

Also, as previously discussed, differences in what information is included in the metadata of one vendor device 2200 versus the metadata of another vendor device 2200 may result in the metadata portions 2336 that are provided by one vendor device 2200 lacking in one or more pieces of information concerning its corresponding data set 2130 that may be present in the metadata portions 2336 that are provided by another vendor device 2200, and which may be deemed useful in identifying relationships between corresponding portions of data. Thus, in a subset of the provider devices 2400 in some embodiments, execution of the control routine 2440 by the processor 2450 may cause the processor 2450 to, in response to the receipt of the metadata portions 2336, generate further queries for further information from the portions of data that correspond to each of the metadata portions 2336, and to transmit such further queries back to the vendor device(s) 2200 from which the metadata portions 2336 are received. Upon subsequently receiving responses from those vendor devices to the further queries, the processor 2450 may be caused to augment the normalized metadata portions 2436 with further information based on those received responses to the further queries before transmitting the normalized metadata portions 2436 to the broker device 2500.

This is one of the ways in which at least a subset of the metadata portions 2336 may be "normalized" to generate the corresponding normalized metadata portions 2436. Stated differently, through such use of further queries, each of the normalized metadata portions 2436 of the set of normalized metadata portions 2436 that are ultimately provided to the broker device 2500 are caused to contain similar pieces of information. As will be explained in greater detail, the fact of each normalized metadata portion 2436 having similar pieces of information to the others enables various comparative analyses to be performed therebetween as part of identifying relationships among corresponding portions of data. As will also be explained, further normalization operations that may be performed in generating the normalized metadata portions 2436 from the metadata portions 2336 may include normalization of languages to a selected language or selected set of languages, vocabulary to selected vocabulary, formatting to a selected set of formats, data types to a selected set of data types, data widths to a selected set of data widths, etc. used for each of the pieces of information that are to be included within each normalized metadata portion 2436 to better enable those pieces of information to be used in such comparative analyses.

In various embodiments, the broker device 2500 may incorporate one or more of a processor 2550, a storage 2560, and a network interface 2590 to couple each of the broker device 2500 to the network 2999. The storage 2560 may store a control routine 2540, rules data 2535, the normalized metadata portions 2436, a visualization log 2638, and/or the visualization data 2738. The control routine 2540 may incorporate a sequence of instructions operative on the processor 2550 to implement logic to perform various functions.

In executing the control routine 2540, the processor 2550 may operate the network interface 2590 to await the receipt, from one of the client devices 2800, of a query for information from data sets 2130 and/or corresponding metadata 2136 that are stored by and/or under the control of the multiple vendor devices 2200. The processor 2550 may be caused operate the network interface 2590 to relay the query onward to the one or more provider devices 2400. The processor 2550 may then be caused to operate the network interface 2590 to await the receipt of portions of data sets 2130 and/or normalized data set portions 2436 from one or more provider devices 2400. As will be explained in greater detail, the processor 2550 may be caused to perform various analyses with each of the normalized metadata portions 2436 to derive further characteristics of each portion of data of a data set 2130 that corresponds to one of the normalized metadata portions 2436. The processor 2550 may be further caused to perform comparisons of various data characteristics of indicated by the normalized metadata 2436 and/or the derived further characteristics thereof to identify relationships that may be present among the corresponding portions of data. As will also be explained in greater detail, the processor 2550 may be caused to generate one or more visualizations of the identified relationships (which may be stored as the visualization data 2738). Following the generation of such visualizations, the processor 2550 may operate the network interface 2590 to transmit those visualizations (e.g., transmit the visualization data 2738) to the client device 2800 from which the query corresponding query was originally received.

In some embodiments, execution of the control routine 2540 by the processor 2550 may cause the processor 2550 to analyze access credentials of the client device 2800 from which the corresponding query was originally received to determine whether the query is authorized. As previously discussed, such an authorization may entail a check of whether the client device 2800 and/or a person operating the client device 2800 is associated with the entity that may maintain the distributed online library system 2000.

Turning to FIGS. 14A-B, as well as to FIG. 15, an alternate embodiment is presented the processor 2550 of the broker device 2500 is caused by its execution of both the control routines 2440 and 2540 to perform substantially the same operations just described as being separately performed by the processors 2450 and 2550 of the embodiment of FIGS. 13A-B. More specifically, each provider device 2400 that was implemented as a separate and distinct physical device in the embodiment of FIGS. 13A-B, is instead, implemented with a VM 2466 instantiated within the broker device 2500 in the embodiment of FIGS. 14A-B.

Thus, while each of such virtual versions of a provider device 2400 within a VM 2466 may still perform the same authorization checking operations, translation operations, and/or further query generation operations, the exchanges of the query data 2732 and normalized metadata portions 2436 with the broker device 2500 do not actually occur through the network 2999. Instead, such network transmissions may be virtual in nature as such data is provided to and/or received from each of the VMs 2466.

Figure 16B:
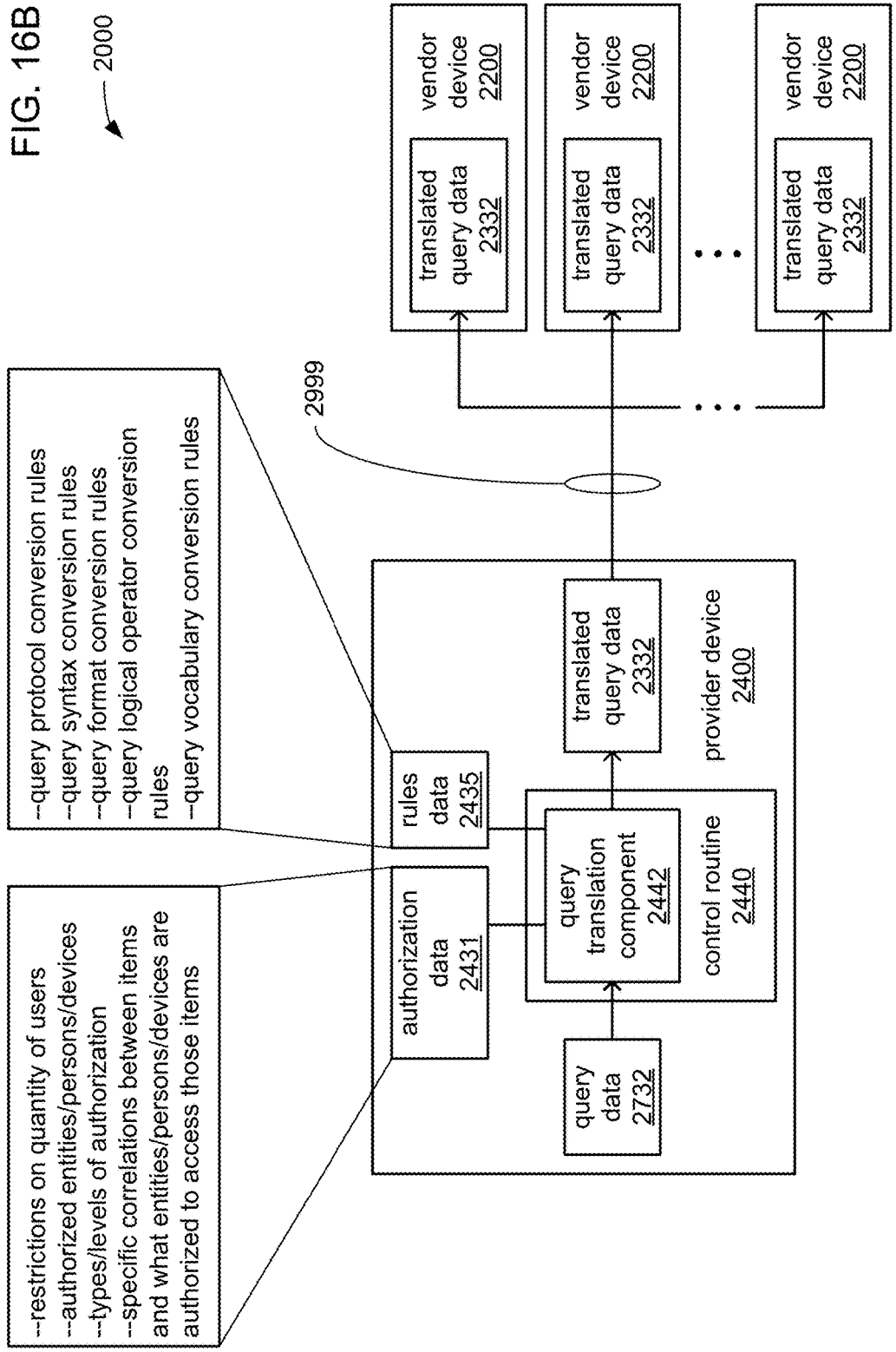
Figure 16D:
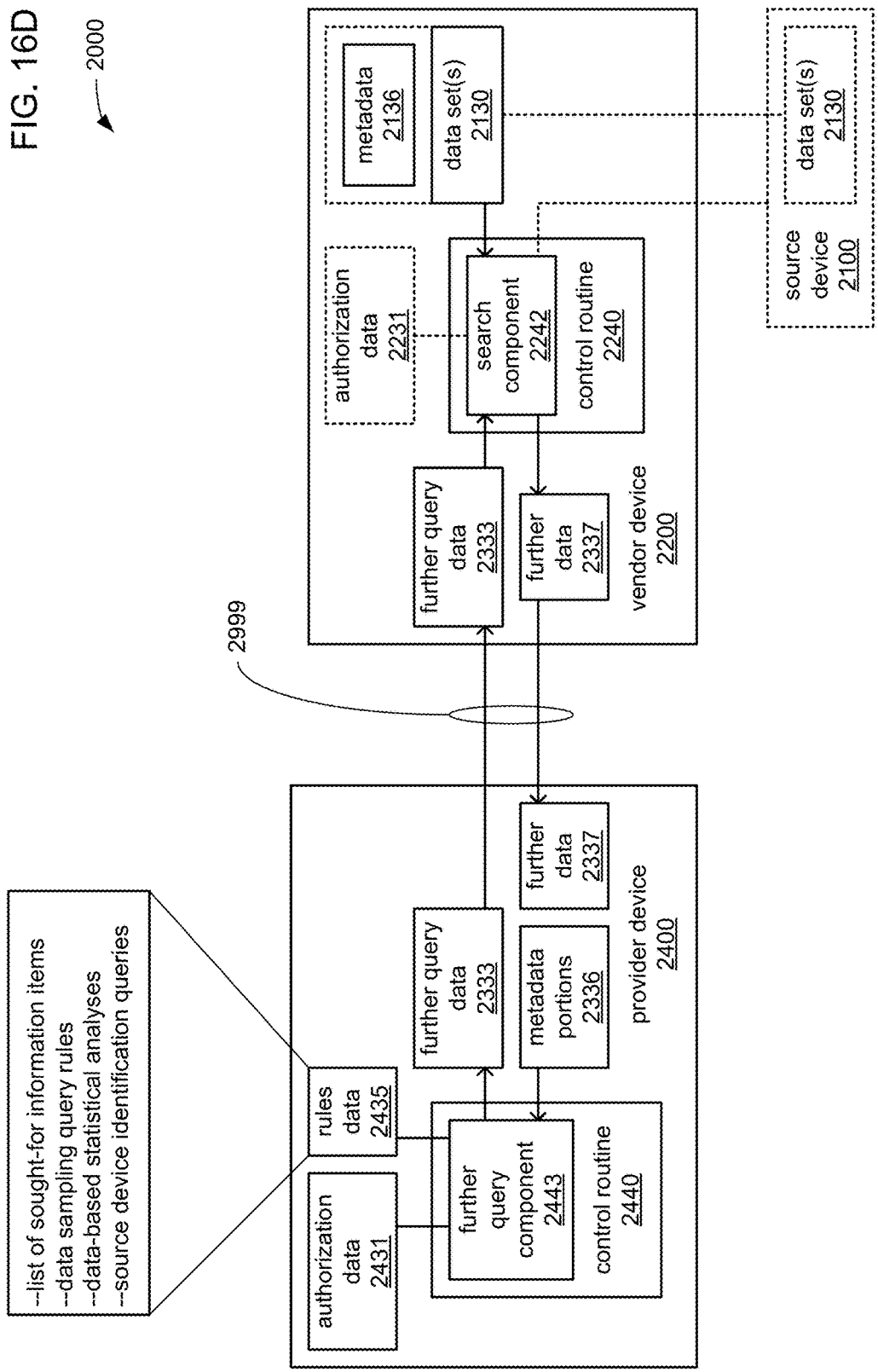
Figure 16E:
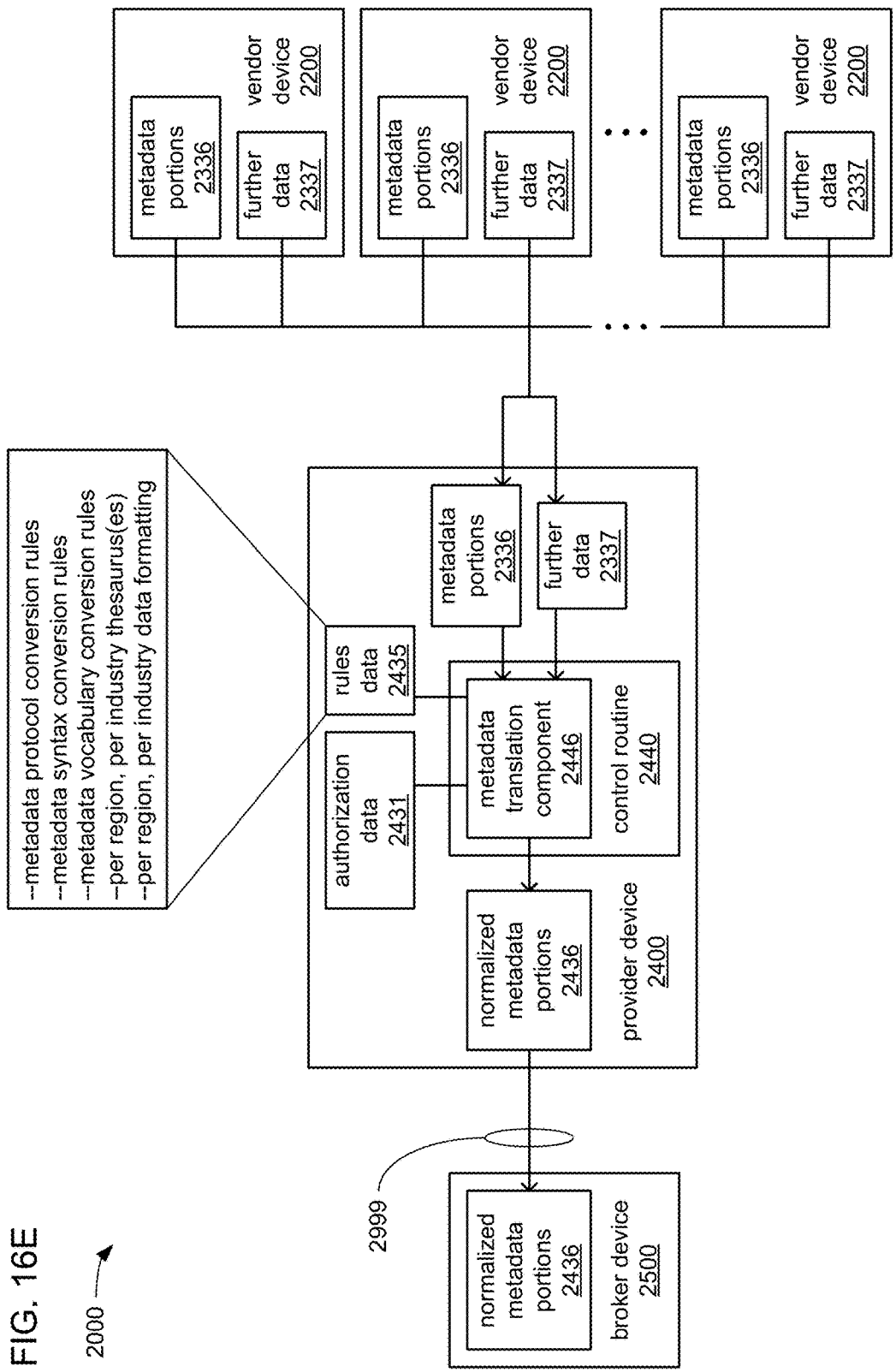
Figure 16F:
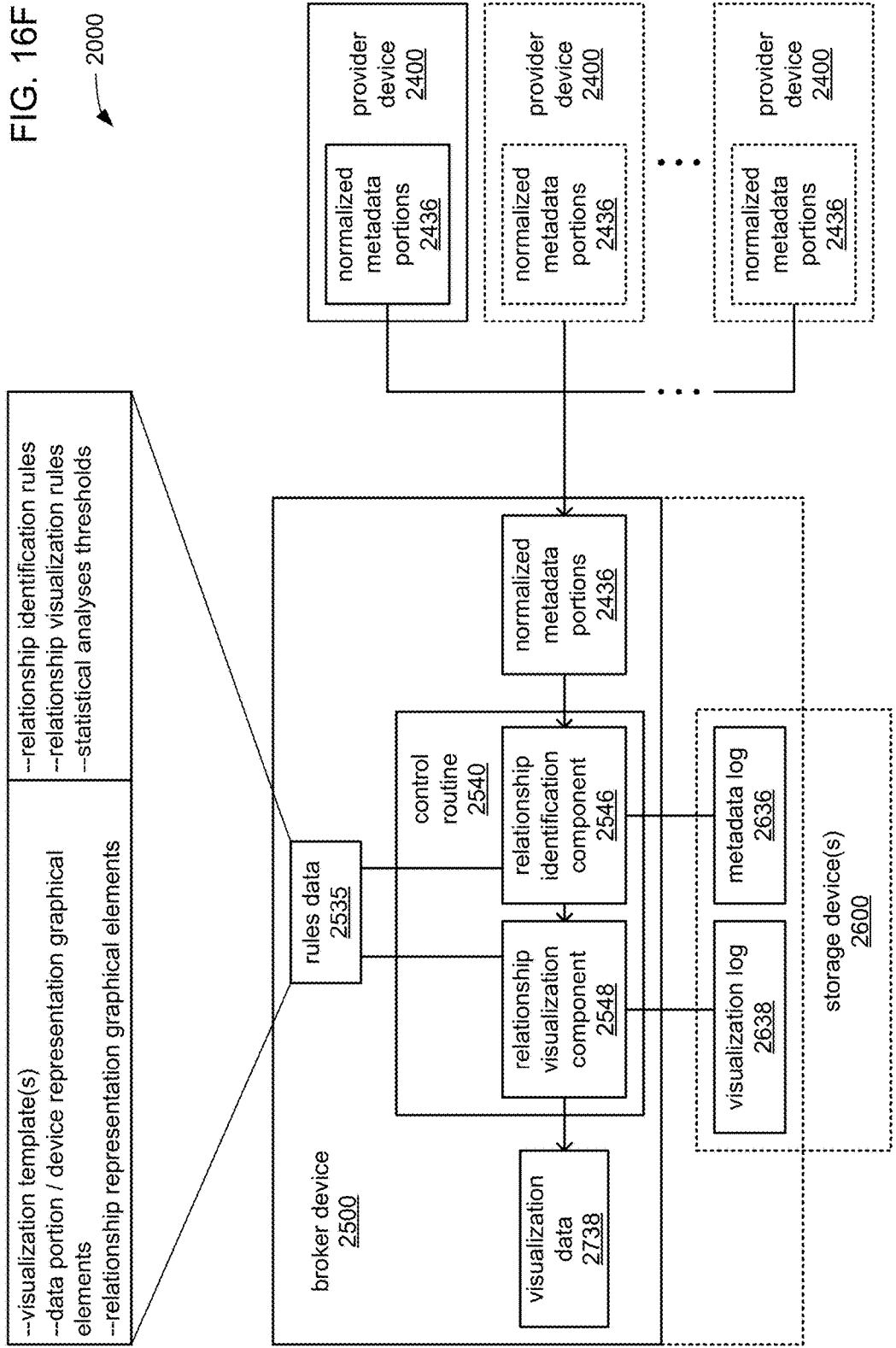
Figure 16G:
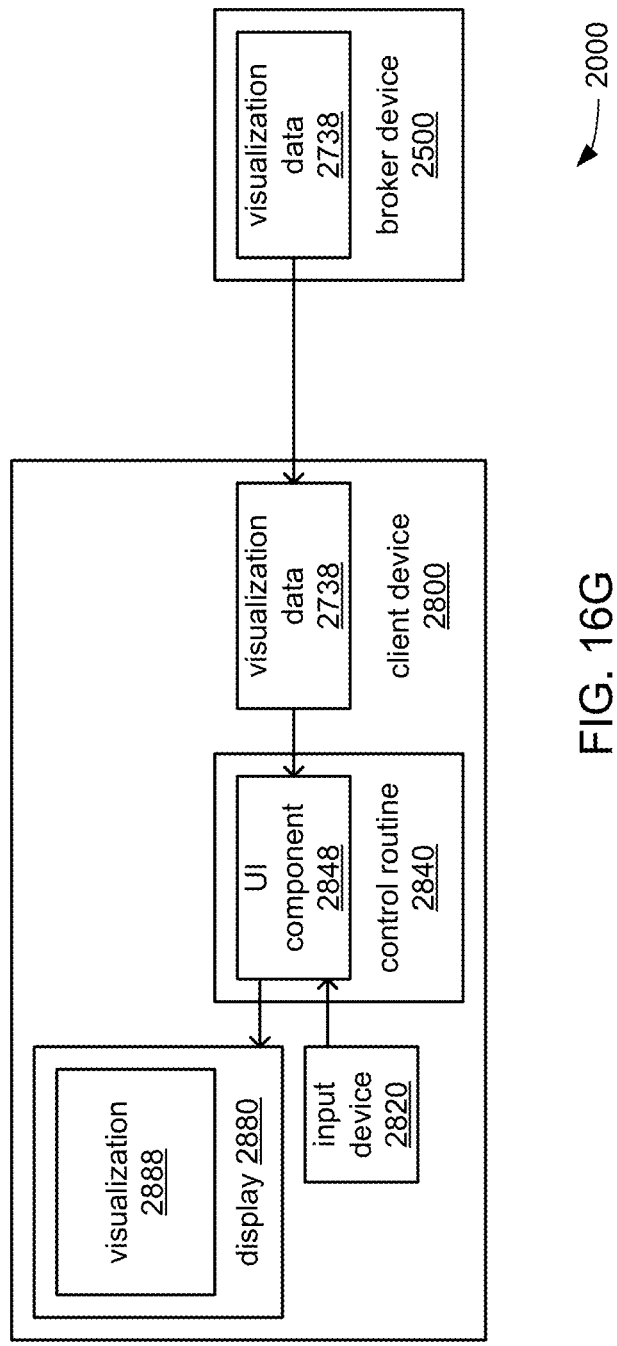

FIGS. 16A, 16B, 16C, 16D, 16E, 16F and 16G, together and in greater detail, illustrate an example of an embodiment of identifying relationships among portions of data through analyses and comparisons of corresponding portions of metadata, and generating visualizations of the identified relationships. FIGS. 16A and 16B, together, illustrate aspects of the reception, authorization checking, translation and broadcasting of a query that includes a request for a visualization of relationships among portions of data relevant to a specified subject. FIG. 16C illustrates aspects of searching at least the metadata 2136 associated with various data sets 2130 to identify portions of data therein that are relevant to the subject of the query, and retrieving associated portions of metadata for analysis. FIG. 16D illustrates aspects of generating further queries to obtain further pieces of information about at least some of the identified portions of data that are not already provided in the retrieved metadata portions 2336. FIGS. 16E, 16F and 16G, together, illustrate aspects of the collection, translation and relaying of portions of metadata for analysis and comparison to identify relationships that are then depicted in a visualization 2888 for display.

Referring to FIGS. 16A-G, as recognizable to those skilled in the art, the control routines 2240, 2440, 2540 and 2740, including the components of which each is composed, are selected to be operative on whatever type of processing component(s) that are selected to implement applicable ones of the processors 2250, 2450, 2550 and/or 2750. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2250, 2450, 2550 and/or 2750. Where one or more device drivers are included, those device drivers may provide support for any of a variety of other components, whether hardware or software components, of the vendor devices 2200, the provider devices 2400, the broker device 2500 and/or the client devices 2800 (or of VMs to implement any of these devices in virtual form).

Turning more specifically to FIG. 16A, as depicted, the control routine 2840 of an example embodiment of one of the client devices 2800 may include a user interface (UI) component 2848 that may be operable on the processor 2850 thereof to provide a UI for the entry of queries for processing by the distributed online library system 2000. More specifically, the UI component 2848 may operate a display 2880 and/or an input device 2820 of the depicted client device 2800 to provide a text-based or graphical UI by which an operator thereof may manually enter aspects of a query. As has been discussed, the queries that may be entered may include queries to retrieve one or more portions of data from one or more of the data sets 2130 about a subject specified in the query, such as, for example, a query for data concerning the production of oranges within a particular specified region of the world throughout a particular specified period of time. As has been discussed, the distributed online library system 2000 may be maintained by a scholastic entity (e.g., a college or university), a commercial entity (e.g., any of a wide variety of business entities), and/or a governmental entity (e.g., a government department) for the purpose of enabling personnel associated with that entity to enter such queries to cause searches to be made of the data sets 2130 to obtain answers to such subject-related questions.

However, as has also been discussed, the queries that may be entered may include queries to ascertain aspects of the quality of the information provided by the distributed online library system 2000 in relation to a specified subject, such as, for example, a query for a visualization 2888 depicting the number of distinct portions of data that are available among the data sets 2130 concerning orange production and the nature of any relationships that may exist among those portions of data, including duplications of such portions of data, multiple dependencies on a single portion one of such portions of data, inclusions of one of such portions within another, and/or instances of overlap in information provided by such portions of data. More specifically, curator personnel of the entity that maintains the system 2000 may enter such queries as part of an effort to determine whether the distributed online library system 2000 has a sufficient breadth of information on the specified subject as to enable such best practices as cross-checking of data based on multiple sources, and/or consideration of a variety of opinions where there may be ongoing debate concerning some aspect of the specified subject. Again, among the situations that such curator personnel seek to detect by such analyses may also be situations in which bottlenecks may have become built into the distributed online library system 2000 in which what appears to be multiple sources of data are, in truth, multiple pathways to a single source of data such that there is a risk of saturation in accessing a single source of data, thereby leading to loss of reliability in accessing data, at all, and/or leading to lengthy delays in accessing data.

Focusing on such queries for visualizations 2888 of such relationships, the UI component 2848 may operate the display 2880 (or another output device, such as a speaker) to prompt an operator of the client device 2800 through manually entering the various pieces of information that may be needed to fully describe the parameters of such a query via the input device 2820. By way of example, such a query may include indications of the subject of interest and/or any limitations on the types of relationships to be included in the visualization(s) 2888 to be generated. Alternatively or additionally, the parameters of such a query that may be so entered may include specifications limiting aspects of the search that is to be performed to identify portions of data that are relevant to the subject of interest (e.g., limiting the search to portions of data in which the subject of interest is found in row or column labels, or is found in documents of a particular format, etc.). Such information as may be so provided by the operator may be at least temporarily stored by the UI component 2848 as the query data 2732. As depicted, in some embodiments, the UI component 2848 may additionally include an indication of the access credentials of the client device 2800 and/or the operator thereof within the query data 2732. Where such access credentials are in some way associated with the specific operator, the UI component may prompt the operator to manually enter such credentials via the input device 2820 for inclusion in the query data 2732. With the parameters of the query so gathered and stored, the UI component 2848 may transmit the query data 2732 to the broker device 2500 via the network 2999.

As also depicted in FIG. 16A, the control routine 2540 of an example embodiment of the broker device 2500 may include a relay component 2541 that may be operable on the processor 2550 thereof to selectively relay the query (e.g., selectively relay the query data 2732) to the provider device(s) 2400 based on whether or not the query is authorized. More specifically, the relay component 2541 may analyze the access credentials of the client device 2800 and/or the operator thereof to determine whether or not the query should be relayed to the provider devices 2400 as part of conveying the query to the vendor devices 2200 to be acted upon. In so doing, the relay component 2541 may compare the access credentials to indications stored in the depicted authorization data 2531 of what devices and/or persons are authorized to enter queries requesting details of relationships between portions of data. As has been discussed, the entry of queries may generally be limited to personnel and/or devices that are associated with the entity that maintains the distributed online library system 2000. Alternatively or additionally, the entry of queries concerning relationships between portions of data may be limited to a selected subset of such personnel (e.g., those designated as curators of the system 2000) and/or particular devices that may be under the control of such a subset of personnel.

If the relay component 2541 determines that the query is not authorized, then the relay component 2541 may transmit an indication of such lack of authorization back to the client device 2800 via the network 2999, where the UI component 2848 may operate the display 2880 to provide a visual indication of the lack of authorization. However, presuming that the query (as received in the form of the query data 2732) is authorized, the relay component 2541 may then relay the query via the network 2999 to each of the provider devices 2400 that may be present within the distributed online library system 2000.

As has been previously discussed, in some embodiments, each of the provider devices 2400 to which the broker device 2500 may so relay the query may be required to have been registered with the broker device 2500 beforehand. Similarly, each vendor device 2200 to which a provider device may relay the query may also be required to have been registered with that provider device 2400 beforehand. Such a registration process may entail the provision and/or exchange of at least sufficient communications information as to enable at least one of the devices that engage each other in a registration procedure to successfully contact the other and exchange information with the other through the network 2999 (e.g., IP address, URL, login credentials, network encryption keys, communications protocol details, etc.).

Turning more specifically to FIG. 16B, as depicted, the control routine 2440 of an example embodiment of a provider device 2400 may include a query translation component 2442 that may be operable on the processor 2450 thereof to selectively translate and relay the query (e.g., selectively relay the query data 2732) to the multiple vendor devices 2200 that have been registered with the provider device 2400 based on whether or not the query is authorized. More specifically, the query translation component 2442 may analyze the access credentials of the client device 2800 and/or the operator thereof to determine whether or not the query should be translated and relayed to the multiple vendor devices 2200 to be acted upon. In so doing, the relay component 2541 may compare the access credentials to indications stored in the depicted authorization data 2431 of what devices and/or persons are authorized to enter queries requesting details of relationships between portions of data. Alternatively or additionally, and as has been discussed, the query translation component 2442 may apply other criteria in determining whether the query is authorized, including and not limited to, whether a predetermined limit on a quantity of users and/or devices currently making queries of the distributed online library system 2000 has already been reached.

If the query translation component 2442 determines that the query is not authorized, then the query translation component 2442 may transmit an indication of such lack of authorization back to the broker device 2500 via the network 2999, which may relay that indication back to the client device 2800 from which the query originated, where the UI component 2848 thereof may operate the display 2880 thereof to provide a visual indication of the lack of authorization. However, presuming that the query (as received in the form of the query data 2732) is authorized, the query translation component 2442 may then translate the query between two different communications protocols.

More specifically, and as previously discussed, the communications protocol by which the query is communicated to the provider device 2400 by the broker device 2500 via the network 2999 may differ from the communications protocol by which the provider device 2400 may relay the query to the multiple vendor devices 2200 via the network 2999. By way of example, the different communications protocols may employ different network protocols (e.g., different network ports, different packetizing, etc.). Also by way of example, the manner in which the parameters of the query are expressed within the query data 2732 may conform to the communications protocol used between the broker device 2500 and the provider device 2400, but not between the provider device 2400 and the vendor devices 2200 that are registered with the provider device 2400 (e.g., different syntax, different formats, different query description languages, differences in sets of available logical operators, etc.).

Therefore, presuming that the query translation component 2442 determines that the query is authorized, the query translation component 2442 may generate the translated query data 2332, in which the query is expressed in a different manner that may conform to the communications protocol used between the provider device 2400 and the vendor devices 2200 that are registered with the provider device 2400. In so doing, the query translation component 2442 may retrieve indications of various rules for performing such a conversion of the query from the rules data 2435, which may include rules specifying such aspects of conversion as protocol, syntax, formatting, equivalent logical operators and/or equivalent vocabulary. The query translation component 2442 may then relay the query (as the translated query data 2332) via the network 2999 to each of the vendor devices 2200 that are registered with the provider device 2400.

As previously discussed, the entity that maintains and operates the distributed online library system 2000 may engage one or more other entities (e.g., one or more "providers") to provide at least some of the data that becomes part of the overall set of data that is included in the system 2000. Thus, while the entity that maintains and operates the distributed online library system 2000 may directly exercise control over many of the devices 2200, 2400, 2500 and/or 2800 that make up the system 2000, at least a subset of the provider devices 2400 may be under the control of one or more of such providers who agree under terms of a license or other form agreement to grant access, through a provider device 2400, to data stored on one or more vendor devices 2200 for the benefit of operators of the client devices 2800. It is from this difference in ownership and/or control over various ones of these devices that the need may arise for translations between communications protocols. More specifically, with so many different communications protocols having been developed over decades for the communication of data, as well as for the communication of metadata about data, considerable opportunity exists (indeed, a likelihood exists) that the communications protocol employed by a provider in the operation of their provider device 2400 in communications with vendor devices 2200 will be different from the communications protocol employed by the entity that maintains the system 2000 in the operation of their broker device 2800 in communications with the provider devices 2400.

As also previously discussed, an entity that maintains and operates one of the provider devices 2400 may also operate at least a subset of the provider devices 2200 with which their provider device 2400 is in communication. However, as has also been previously discussed, it may be that an entity that maintains and operates one of the provider devices 2400 may, themselves, engage in licensing and/or other agreements with still other entities that maintain and operate at one or more of the vendor devices 2200 that are to store the data and/or pointers to data (e.g., one or more "vendors"). It may be that a provider configures a particular provider device 2400 to provide data for a particular distributed online library system 2000, at least in part, by selecting particular vendor devices 2200 (and accordingly, selects one or more vendors) to be put coupled to that particular provider device 2400 based on what types data each of those vendor devices 2200 store (or at least store pointers to). Thus, it may be that neither the entity that operates the distributed online library system 2000, nor the one or more entities that may operate the one or more provider devices 2400 thereof, are aware that a situation may have been built into the system 2000 in which what appeared to be unrelated pieces of data stored on separate vendor devices 2000 about a similar topic are all actually the very same piece of data stored on a single vendor device 2000 or a single other device, thereby creating the illusion of redundancy and/or variety in the storage of data where there is in truth a bottleneck.

Turning more specifically to FIG. 16C, as depicted, the control routine 2240 of an example embodiment of a vendor device 2400 may include a search component 2242 that may be operable on the processor 2250 thereof to perform a search of at least the metadata 2136 associated with each of one or more data sets 2130 that are stored by the vendor device 2200 to identify portions of data within the one or more data sets 2130 that meet the criteria specified in the translated query data 2332, including being relevant to the subject of interest described therein. Additionally, in some embodiments, the search component 2242 may condition its performance on such a search on a determination of whether the query is authorized based on criteria similar to what has been previously discussed in regard to the relay component 2541 of the broker device 2500 and the query translation component 2442 of the provider device 2400.

The data sets 2130 may vary greatly in size and complexity such that one data set 2130 may be a single relatively simple data structure such as a text document, while another data set 2130 may be include numerous data structures of widely varying types. However, it is envisioned that the vendor devices 2200 may each store one or more data sets 2130 that may each be of considerable size such that each data set 2130 may include numerous different data structures and/or data structures of considerable size and complexity. Thus, at least some data sets 2130 may be divisible into numerous portions that may each include a separate data structure of some size and/or of some complexity, including and not limited to, separate documents, separate spreadsheets, separate n-dimensional arrays, separate audio and/or visual recording, separate still images, etc.

As previously discussed, each data set 2130 may be accompanied by, and may even directly incorporate, a corresponding metadata 2136 that describes numerous aspects of its corresponding data set 2130, along with numerous aspects of each of the data structures that may be present within its corresponding data set 2130, and along with numerous aspects of the data that may be present within each of those data structures. More specifically, metadata 2136 associated with a particular data set 2130 may describe aspects of the data set 2130, such as and not limited to, its file name, its location within a file system directory hierarchy, its location on a network (e.g., IP address, URL, etc.), its file type and/or the revision of the standard for that file type, the date/time on which it as created and/or was last modified, its current overall size, the identity of its creator and/or the last person/entity to modify it, any applicable copyright and/or applicable country's law, the date/time on which it was published, and/or a publication identifier that may assigned to it (e.g., an ISBN number). Alternatively or additionally, such metadata 2136 may describe aspects of data structure(s) that may be present within its corresponding data set 2130, such as and not limited to, data structure type (e.g., n-dimensional array, text document, spreadsheet conforming to a particular standard, etc.), type of indexing scheme (e.g., rows and columns in a table, combination of chapters, sections and/or pages of a document, etc.), type of labels used in the indexing scheme (e.g., textual labels, a numeric index, etc.), type of ordering of the index labels (e.g., alphabetical, numeric, etc.), ordered listing of index labels used, current size of data structures and/or size limitations thereof, current number of dimensions of an n-dimensional data structure and/or limitations thereof, etc. Also alternatively or additionally, such metadata 2136 may describe aspects of the data within each data structure within its corresponding data set 2130, such as and not limited to, data types (e.g., text characters, numerical values, logical bit-wise values, undefined n-byte sized fields, etc.), data widths (e.g., bit, byte, word, double-word, quad-word, n-bit floating point, signed or unsigned n-bit integer, etc.).

However, as has also been previously discussed, due to the wide variety of operating systems, file systems, database storage and retrieval tools, data set structure standards, data types predefined by each of numerous programming languages, etc., different metadata 2136 may include widely differing combinations of details concerning its corresponding data set 2130. By way of example, the metadata 2136 of one data set 2130 may include a considerable number of details about data structures and/or data types within its data set 2130, but may include minimal information concerning the file type of its data set 2130 or its location within a file system directory hierarchy. In contrast, the metadata 2136 of a different data set 2130 may include fuller details concerning the file type and/or other details of how and/or where its data set 2130 is stored, but may include minimal details about the indexing scheme used to organize data values within a multi-dimensional array within its data set 2130.

Upon receiving the translated query data 2332, the search component 2242 may perform searches of the metadata 2136 associated with each of multiple data sets 2130 to identify one or more portions of data within each such data set 2130 that are deemed relevant to the subject of interest specified in the translated query data 2332 and/or that meet other criteria that may also be specified therein. Upon identifying one or more of such portions of one or more data set 2130, the search component 2242 may transmit portions of metadata 2136 (each in the form of one of the depicted data set portions 2336) that correspond to such portions of data back to the provider device from which the translated query data 2332 was received via the network 2999.

As those skilled in the art will readily recognize, depending on what the translated query data 2332 describes as the subject of interest and/or any limitations placed thereon, and depending on what information is included in the available metadata 2136, it may or may not be possible for the search component 2242 to limit its search to the contents of the available metadata 2136. By way of example, if the translated query data 2332 specifies that the search is to be limited to portions of data sets 2130 that include labels that include the subject of interest (e.g., production of oranges, social security numbers, street addresses, etc.), and if the available metadata 2136 includes all of the labels used throughout all of the corresponding data sets 2130, then the search to identify such portions of data may be limited to the searching through the labels specified in the available metadata such that no search may be needed of any of the corresponding data sets 2130. However, if by way of another example, the translated query data 2332 specifies that the search is to include any portion of a data set 2130 in which there is text of any kind that includes a mention of the subject of interest, then the search to identify such portions of data necessarily entails a search through at least all text that may be present within each data set 2130 for such a mention of the subject of interest. However, even in such an example where a search through the contents of data sets 2130 is still necessary, a search through the available metadata 2136 may still be performed as an initial step to at least rule out any data set 2130 that does not contain any text, at all.

Regardless of the extent and/or strategies employed in performing the searches, due to the above-described wide variation in the information that may be included in each metadata 2136, the data set portions 2336 that are so transmitted to the depicted provider device 2400 may similarly vary widely in the information that each contains about its corresponding portion of a data set 2130. As a result, one or more follow-up searches may be required to obtain more information about portions of data that have been identified as relevant to the subject of interest, as well as meeting any other criteria that may be specified in the translated query data 2332.

It should be noted that, considerable efficiencies are realized by the performances of the searches within both metadata 2136 and corresponding data sets 2130 within the vendor devices 2200, including the use of parallelism thereamong in the performances of these searches. Also, it may be that at least some of the data sets 2130 are updated on a frequent basis, thereby making the maintenance of copies of at least the metadata 2136 of each data set 2130 within the broker device 2500 impractical, as there would be considerable consumption of processing resources across multiple devices and considerable consumption of network communications bandwidth to recurringly update those copies.

Turning more specifically to FIG. 16D, as depicted, the control routine 2440 of the example embodiment of provider device 2400 introduced in FIG. 16B may also include a further query component 2443 that may be operable on the processor 2450 thereof to analyze each metadata portion 2336 to determine what pieces of information are not included therein such that a further query may be needed. More specifically, the further query component 2443 may retrieve indications, from the rules data 2435, of what pieces of information are to be retrieved and included in portions of metadata that are to be relayed back to the broker device 2500 to better enable the identification of relationships. Thus, where one or more received metadata portions 2336 do not include one or more of such specified pieces of information for one or more corresponding identified portions of data, the further query component 2443 may generate the depicted further query data 2333 that specifies the parameters of a further search to be performed within the one or more identified portions of data to obtain those missing pieces of information.

By way of example, where the rules data specifies that the size of each dimension of a multi-dimensional array in an identified portion of data is among the pieces of information to be retrieved and included in metadata transmitted to the broker device 2500, and yet, the available metadata does not include such information, then further query component 2443 may generate the further query data 2333 to specify the performance of a search of the contents of each such array that may be present in any of the identified portions of data to determine the size of each dimension thereof. The further query component 2443 may then transmit the further query data 2333 to applicable ones of the vendor devices 2200 (including the depicted example vendor device 2200), and may await receipt of response(s) thereto.

FIG. 16D also depicts aspects of an alternate embodiment of the depicted vendor device 2200 in which at least a subset of the data sets 2130 may be stored within one or more separate and distinct source devices 2100, instead of within the depicted vendor device 2200. As also depicted, the metadata 2136 that corresponds to such separately stored data sets 2130 may alternatively or additionally be stored within the vendor device 2200 to improve the speed with which it is able to be accessed, and in recognition of the metadata 2136 usually being a fraction of the size of its corresponding data set 2130. In such embodiments, such metadata 2136 that is stored so separately from the data set(s) 2130 that it corresponds to may be maintained in a distinct metadata log 2236 (see FIG. 15), which may, in some embodiments, function effectively as a "cache" of such metadata 2136. Alternatively or additionally, the vendor device 2200 may store one or more pointers and/or other information required to enable access by the vendor device 2200 to such separate storage device(s) 2100. Such indirect storage of data set(s) 2130 within separate and distinct storage device(s) 2100 may be done as a way to expand the storage capacity of the vendor device 2200. Alternatively or additionally, the entity that maintains one or more of the vendor devices 2200 (which may or may not be the same entity that maintains at least one of the provider devices 2400) may engage in their own licensing of data from still other entities that may maintain such storage devices 2100.

Turning more specifically to FIG. 16E, as depicted, the control routine 2440 of the example embodiment of provider device 2400 introduced in FIG. 16B, may further include a metadata translation component 2446 that may be operable on the processor 2450 thereof to translate and relay at least the received metadata portions 2336 to the broker device 2500. More specifically, and in a manner similar to the earlier described translation of the query by the query translation component 2442, the metadata translation component 2446 may translate each of the received metadata portions 2336 between two different communications protocols.

As previously discussed, the communications protocol by which portions of metadata are communicated to the provider device 2400 by each of the vendor devices 2200 via the network 2999 may differ from the communications protocol by which the provider device 2400 may relay portions of metadata to the broker device 2500 via the network 2999. Again, and as previously discussed by way of example, the different communications protocols may employ different network protocols (e.g., different network ports, different packetizing, etc.). Also by way of example, the manner in which the pieces of information about a corresponding portion of data are expressed within each of the metadata portions 2336 may conform to the communications protocol used between the provider device 2400 and the vendor devices 2200, but not between the provider device 2400 and the broker device 2500 (e.g., different syntax, different formats, different query description languages, differences in sets of available logical operators, etc.).

Therefore, for each metadata portion 2336, the metadata translation component 2446 may generate a corresponding normalized metadata portion 2436 in which the pieces of information concerning the corresponding identified portion of data are expressed in a different manner that may conform to the communications protocol used between the provider device 2400 and the broker device 2500. In so doing, the metadata translation component 2446 may retrieve indications of various rules for performing such a conversion of metadata information from the rules data 2435, which may include rules specifying such aspects of conversion as protocol, syntax, formatting, and/or equivalent vocabulary. Additionally, where a metadata portion 2336 was determined by the further query component 2443 to be lacking in one or more pieces of information such that a further query was generated resulting in the receipt of corresponding further data 2337, the metadata translation component 2446 may augment the corresponding normalized metadata portion 2436 to include the otherwise missing pieces of information that are supplied by that corresponding further data 2337. The metadata translation component 2446 may then relay each normalized metadata portion 2436 to the broker device 2500 via the network 2999.

Additionally, as part of generating each normalized metadata portion 2436 from its corresponding metadata portion 2336 and/or accompanying further data 2337, the metadata translation component 2446 may also perform various forms of normalization of the manner in which pieces of information are expressed within each normalized metadata portion 2436. By way of example, the formatting and/or other aspects of such pieces of information as times, dates, numerical values that include fractional amounts, addresses, spelling across variations and/or dialects of language (e.g., U.S. vs. British variants of English), etc. may be adjusted to conform to a single preselected set of normative formatting and/or other aspects.

Turning more specifically to FIG. 16F, as has been discussed above, for each portion of data of a data set 2130 that has been identified as relevant to the subject of the query, and that fits within one or more search restrictions that may have been specified by the query, corresponding metadata portions 2336 were retrieved and then converted into corresponding normalized metadata portions 2436 that have been provided to the broker device 2500. Further, in response to situations in which different metadata portions 2336 include very different pieces of information concerning their respective portions of data, further queries to elicit further pieces of information for at least a subset of those portions of data may have been generated and used to enable some of the corresponding normalized metadata portions 2436 to be augmented with those pieces of information to reduce such variation in content among the normalized metadata portions 2436. In this way, what pieces of information are include within each of the received normalized metadata portions 2436 is normalized to better enable those pieces of information to be compared as part of identifying relationships.

As depicted, the control routine 2540 of the example embodiment of broker device 2500 introduced in FIG. 16A may also include a relationship identification component 2546 to identify relationships between portions of data of data sets 2130 based on corresponding ones of the normalized metadata portions 2436. As also depicted, the control routine 2540 may further include a relationship visualization component 2548 to generate visualizations that depict such identified relationships.

In some embodiments, the relationship identification component 2546 may stage various comparisons of the pieces of information within the normalized metadata portions 2436 and/or pieces of information derived therefrom to start with relatively simple comparisons, before proceeding further to ever more complex ones. By way of example, as part of attempting to identify portions of data that are duplicates of each other and/or are copies of information from a source outside of the distributed online library system 2000), the relationship identification component 2546 may begin with comparisons of identifying information associated with each portion of data, including and not limited to, file names, IP addresses, URLs, times/dates of publication, identities of publishers, identities of authors/creators, etc. As will be explained in greater detail through use of examples, it may be that the very same portion of data (e.g., the very same document, the very same spreadsheet, the very same hypercube, etc.) may have been made available through two or more different vendor devices 2200 (e.g., by each pointing to the same source device 2100) such that this same very same portion of data is being caused to appear as if it were two or more different portions of data. Where such comparisons reveal highly similar, but not identical pieces of identifying information, various heuristic algorithms may be employed to determine whether the particular combination of differences and similarities is consistent with two or more portions of data being different versions of what is otherwise the same portion of data (e.g., different revisions of the same document).

A similar comparison of identifying information may be used to identify instances in which one portion of data contains a citation or other form of reference to one or more other portions of data. By way of example, a comparison may be made between the title, authorship, publishing information, etc., within each footnote or endnote indicated in the normalized metadata portion 2436 and respective ones of the titling and/or file names, author identifiers, publishing information, etc. indicated in each of the other normalized metadata portions 2436 to attempt to identify any citation matches.

It may be that attempts to identify duplicative portions of data may continue with comparisons between one or more metrics of each of the data portions. By way of example, portions of data that are identical to each other should have aspects of organization of their contents and/or indexing that are identical. Thus, for example, in comparisons among multi-dimensional arrays, comparisons of the number of dimensions, the size of each dimension, the degree of sparseness, the choice of a null data value, and/or any of a variety of others of such metrics may reveal that two or more of those multi-dimensional arrays have multiple identical ones of such metrics such that there is at least a high likelihood that they are duplicates of each other. In such situations in which there is such a basis to infer that two or more portions of data are identical, it may be deemed desirable for the relationship identification component 2546 to generate a further query to be transmitted to the corresponding vendor device(s) 2200 that requests that at least subparts of each of the suspected duplicative portions of data be provided to the broker device 2500 for direct comparison. In some of such situations, a form of random sampling of data values within each of the suspected duplicative portions may be used to select a subset of the data values to be retrieved and/or compared so as to avoid comparing all of the data values within each of the suspected duplicative portions. Thus, two portions of data may be deemed to be "identical" as a result of having identical content (at least to the degree that compared samples of content have been found to be identical) and having an identical organization of that content (e.g., organized into multi-dimensional arrays of identical number of dimensions and size of each dimension, or organized into documents of identical size and/or order of sentences, paragraphs, sections, pages, etc.).

A combination of various heuristic algorithms and/or metrics may be used to identify a situation in which a portion of data may be an aggregation, a compendium or other form of combination of multiple other portions of data. By way of example, a relatively large portion of data that is accessible from one vendor device 2200 may be a multi-chapter document that assembles a collection of tables, images, textual portions, etc., and one or more of each of those may be available elsewhere within the distributed online library system as separate and distinct portions of data. A heuristic analysis of the structure of the relatively large portion of data may reveal an organization of its contents that gives clues that at least some of its subparts may have been self contained portions of data that were imported into it. Such identification of such subparts may be employed as a trigger to compare aspects of each of those subparts to aspects of other portions of data to determine if there are any matches based on identifying information and/or various metrics thereof. Again, where a match is suspected, it may be deemed desirable to generate a further query to cause a direct comparison of at least a subset of the data values therebetween in an attempt to confirm the existence of a relationship in which one data portion is included within another.

In selecting the type of comparisons and/or other tests for relationships that are to be performed, and/or in determining what order in which to perform those comparisons and/or other tests, the relationship identification component 2546 may retrieve indications of a selection of comparisons and/or other tests to be performed and/or a specification of an order thereamong from the rules data 2535. Additionally, the rules data 2535 may also specify one or more thresholds of similarity for various metric and/or statistics that may trigger the generation of further queries in which data values are accessed and compared to confirm that two or more portions of data are identical, etc.

Following the completion of comparisons and/or other tests to identify relationships among portions of data, the relationship visualization component may generate one or more visualizations 2888 to depict the identified relationships. Again, the query, as originally entered via the client device 2800 from which the query was received may specify that visualizations of only one or more specific types of relationships are requested. In addition to such limitations causing the relationship identification component 2546 to limit the comparisons and/or other tests that it may perform to those needed to identify only the specified types of relationships, such limitations may also cause the relationship visualization component to limit the visualization(s) 2888 to depicting only those same specified types of relationships.

Regardless of whether such limitations on what is to be included in the visualization(s) 2888 are specified in the original query, or not, the relationship visualization component 2548 may store a rendering of the resulting visualization(s) 2888 and/or a descriptive script thereof as the visualization data 2738. The relationship visualization component may then transmit the visualization data 2738 to the client device from which the original query was received as an answer to that query. Additionally, copies of past visualizations may be stored for up to a predetermined period of retention time within a visualization log 2638 (see FIG. 15), which may, in some embodiments, function effectively as a "cache" of recent visualizations 2888 that may be re-transmitted to a client device 2800 in response to a situation in which an identical query is received within a predetermined period of time that is deemed short enough for what is stored within the visualization log 2638 to not be deemed too "stale" to be valid. Alternatively or additionally, the visualization log 2638 may be employed to store previously generated visualizations 2888 for up to a predetermined period of retention time to enable a newer visualization 2888 generated in response to a query to be contrasted with an earlier visualization 2888 generated in response to an identical query to thereby provide a further visualization of the manner in which relationships among portions of data may have changed (e.g., perhaps as a result of a change having been made to what provider devices 2400 and/or vendor devices 2200 are included in the distributed online library system 2000). Thus, for example, where a bottleneck may have been discovered through a visualization 2888 generated at an earlier time in which there were multiple pathways through different provider devices 2400 and/or different vendor devices 2200 to the very same device where a portion of data was stored, and later generated visualization 2888 may be contrasted with that earlier generated visualization 2888 as part of confirming that corrective action has been taken to remove that bottleneck.

Turning more specifically to FIG. 16G, as depicted, with the visualization data 2738 having been received at that client device 2800, the UI component 2848 may then operate the display 2880 to visually present the visualization(s) 2888.

Figure 17:
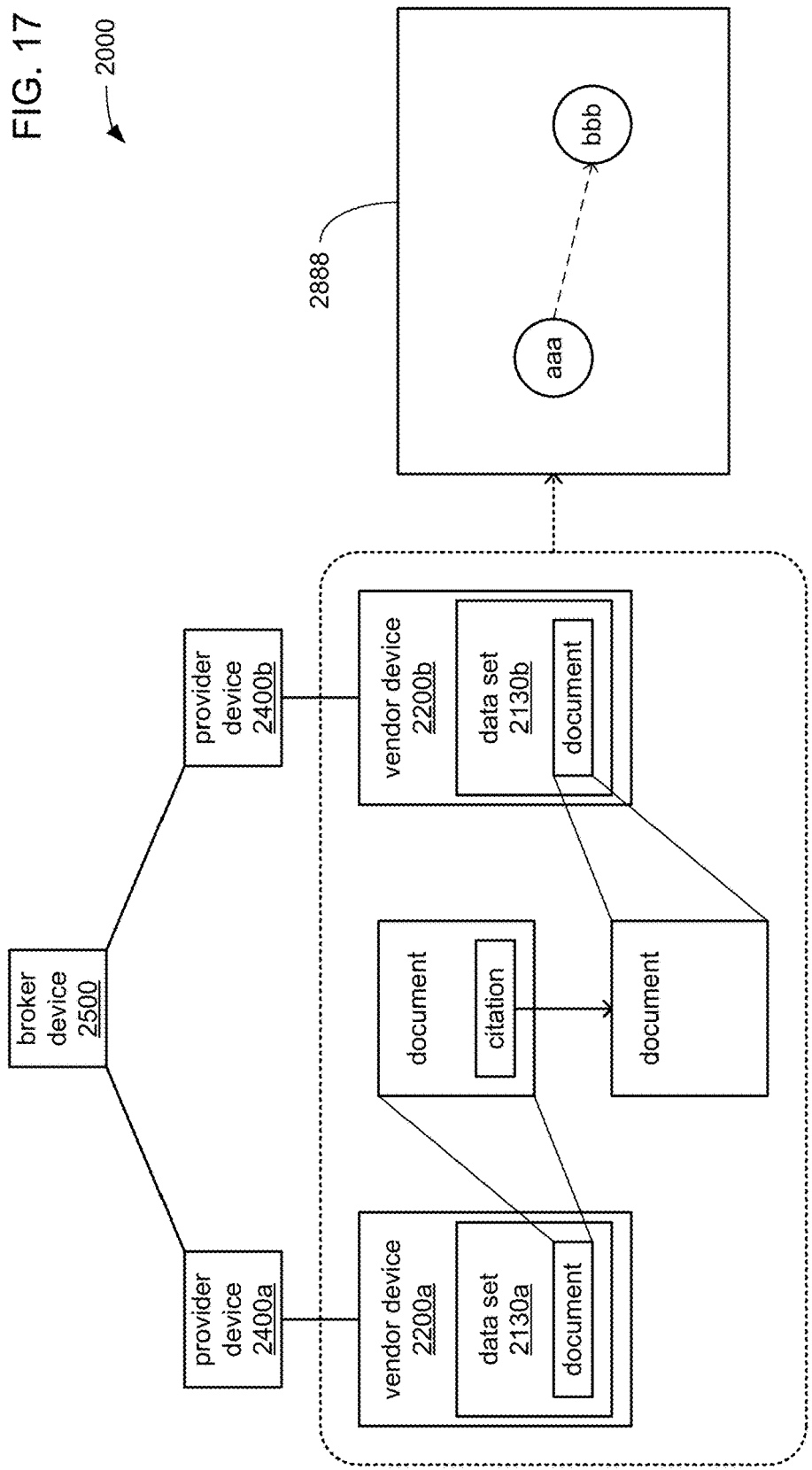
FIG. 17 illustrates an example embodiment of a citation relationship among portions of data and a visualization thereof.

FIG. 17 illustrates an example embodiment of a citation relationship between two portions of data of two different data sets 2130*a* and 2130*b*, and a corresponding example embodiment of a visualization 2888 depicting this example citation relationship. More specifically, the depicted vendor device 2200*a* stores a data set 2130*a* of which a portion of the data thereof is a document that includes a citation to another document that forms a portion of the data of another data set 2130*b* that is stored within another depicted vendor device 2200*b*.

It may be that both documents were found to contain at least one mention or reference to a subject of interest specified in a query that, when acted upon with searches performed within each of the depicted vendor devices 2200*a* and 2200*b*, resulted in the identification of these two documents as portions of data deemed relevant to the subject of interest and meeting the criteria specified in the query for the search. With the corresponding portions of the metadata for each of these two documents having been provided to the depicted broker device 2500, analyses performed at the broker device 2500, including comparisons of the contents of the two corresponding portions of metadata, revealed indications in the metadata of one of the documents that it includes a citation to the other.

With this citation relationship having been identified, the depicted visualization 2888 is generated by the broker device to show this citation relationship. In the depicted visualization 2888, each of the two documents, as stored as part of a separate data set 2130 within a separate vendor device 2200, is depicted with a separate node. More specifically, the document that includes the citation is depicted with the designation "aaa" that denotes it being a portion of the data set 2130*a* that is stored within the vendor device 2200*a* that is registered with the depicted provider device 2400*a*. Correspondingly, the document that is cited with that citation is depicted with the designation "bbb" that denotes it being a portion of the data set 2130*b* that is stored within the vendor device 2200*b* that is registered with the depicted provider device 2400*b*.

As depicted, a dashed line that includes an arrow head at one end may be employed to visually indicate this citation relationship by pointing from the portion of data that includes the citation and toward the portion of data that is cited. It may be that different types of lines that differ in color, thickness, and/or selection of dotted and/or dashed pattern may be used, along with a selection of arrow head types and/or other graphical elements employed as line endings, are used to visually indicate any of a variety of relationships between stored portions of data that may be depicted as nodes.

It should be noted that this is a deliberately highly simplified example of an identified relationship between two portions of data, and a corresponding highly simplified example of a visualization 2888 of that relationship that is presented herein for purposes of illustration. It is envisioned that far more relationships of a far more interwoven nature would typically be found among what would typically be far more portions of data such that the resulting visualization 2888 would be far more complex than what is presented in this particular example. Accordingly, it is also envisioned that the designations given to each of the nodes that are meant to correspond with one of the depicted portions of data would be similarly more complex, and may include indications of physical locations and/or network locations of the various devices associated therewith.

Figure 18:
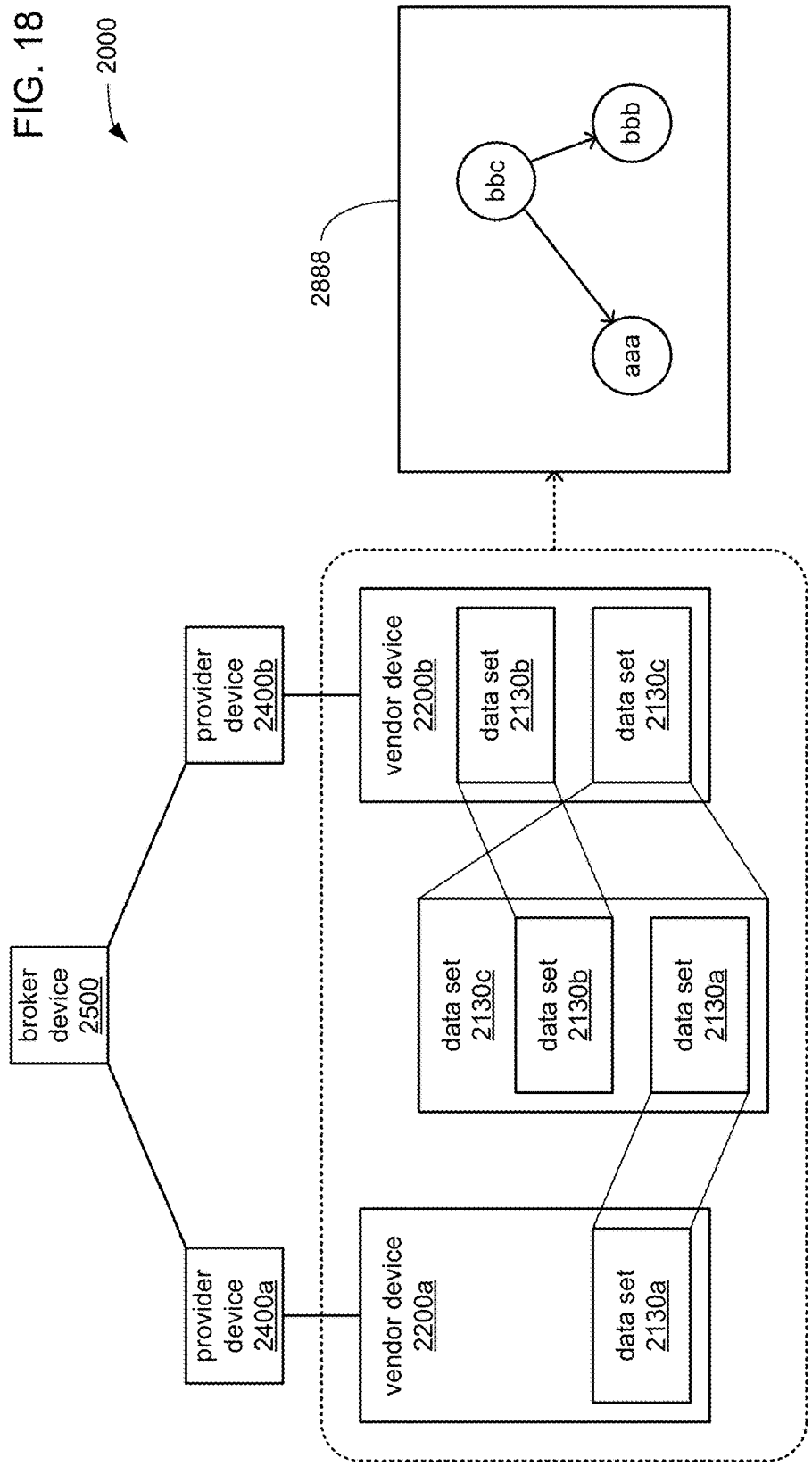
FIG. 18 illustrates an example embodiment of an inclusion relationship among data sets and a visualization thereof.

FIG. 18 illustrates an example embodiment of an inclusion relationship among three portions of data of three different data sets 2130, and a corresponding example embodiment of a visualization 2888 depicting this example inclusion relationship. More specifically, the depicted vendor device 2200*a* stores a data set 2130*a* that is fully included within another data set 2130*c* that is stored within another depicted vendor device 2200*b*. Further, the depicted vendor device 2200*b* also stores a data set 2130*b* that is also fully included within the data set 2130*c*.

It may be that the use of heuristic algorithms to analyze at least a portion of the metadata corresponding to the data set 2130*c* revealed that the data set 2130*c* appeared to include more than one data structure that exhibited various clues of being a self contained data structure that was inserted into the data set 2130*c*. This may have prompted an automated comparison of each of these seemingly self contained data structures to each of multiple other portions of data, including at least portions of each of the data sets 2130*a* and 2130*b*, which may have lead to the determination that two of these seemingly self contained data structures were identical to the data sets 2130*a* and 2130*b* such that the data set 2130*c* could be said to include each of the data sets 2130*a* and 2130*b*.

With this inclusion relationship having been identified, the depicted visualization 2888 is generated by the broker device to show this inclusion relationship. In the depicted visualization 2888, each of the three data sets 2130*a*, 2130*b* and 2130*c*, as stored within one or the other of the vendor devices 2200*a* or 2200*b*, is depicted with a separate node. More specifically, the data set 2130*a* is depicted with the designation "aaa" that denotes it being the data set 2130*a* that is stored within the vendor device 2200*a* that is registered with the depicted provider device 2400*a*. Correspondingly, the data set 2130*b* is depicted with the designation "bbb" that denotes it being the data set 2130*b* that is stored within the vendor device 2200*b* that is registered with the depicted provider device 2400*b*. Also correspondingly, the data set 2130*c* is depicted with the designation "bbc" that denotes it being the data set 2130*c* that is also stored within the vendor device 2200*b* that is registered with the depicted provider device 2400*b*.

As depicted, two separate solid lines that each include an arrow head at one end may be employed to separately visually indicate each inclusion of one data set within another in this inclusion relationship by each pointing from the data set 2130*c* and toward one of the data sets 2130*a* and 2130*b*. Again, it may be that different types of lines of different characteristics and/or having different graphical elements at one end, both ends or neither end, are used to visually indicate any of a variety of relationships between stored portions of data that may be depicted as nodes.

It should be noted that this is a deliberately highly simplified example of an identified relationship among three data sets, and a corresponding highly simplified example of a visualization 2888 of that relationship that is presented herein for purposes of illustration. Again, far more complex and interwoven relationships are envisioned as being more typical, and accordingly, far more complex depictions of relationships in visualizations are envisioned as being more typical. Thus, the relatively simplistic nature of the relationship and accompanying visualization thereof is presented herein for purposes of illustration and understanding, and should not be taken as limiting.

Figure 19:
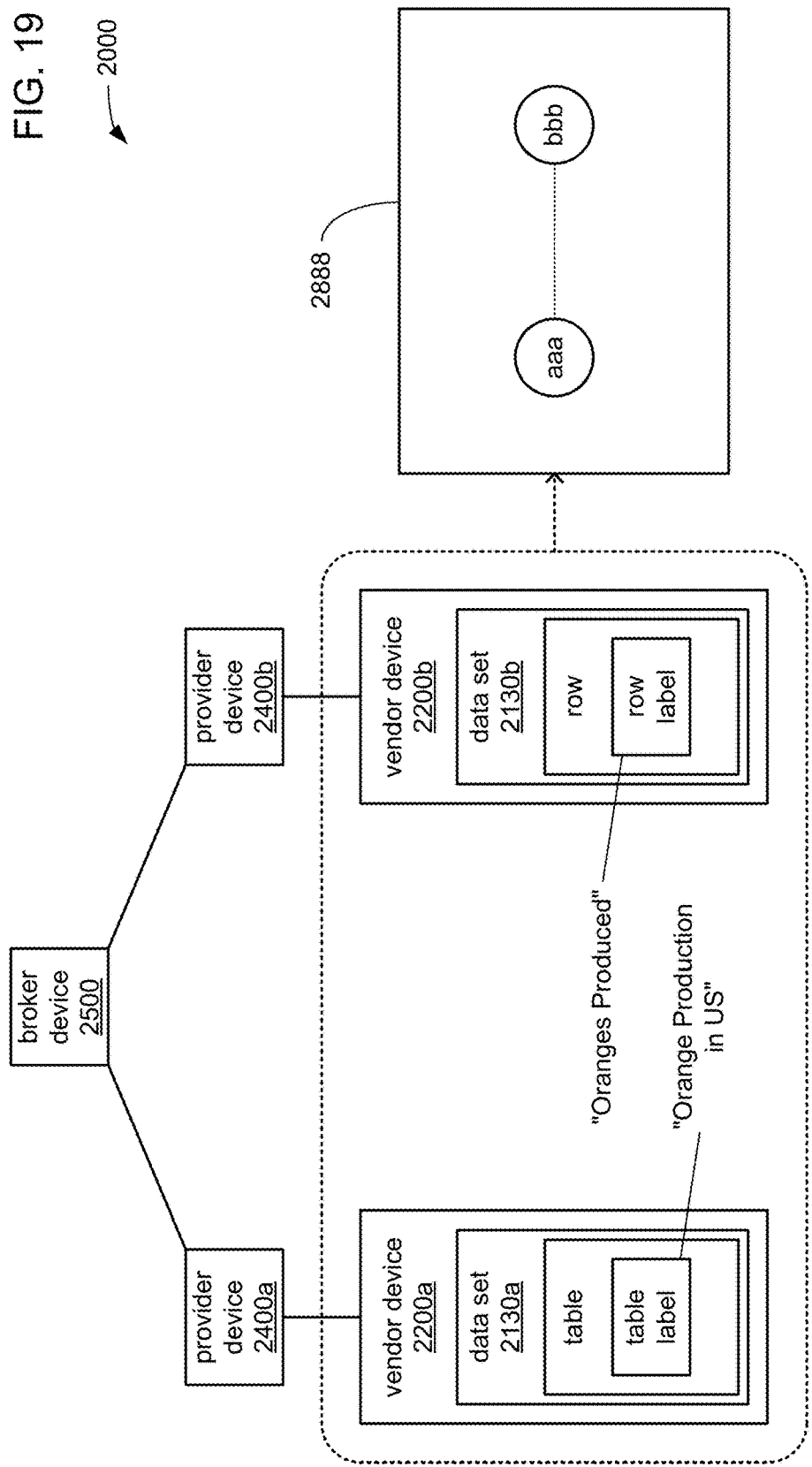
FIG. 19 illustrates an example embodiment of a subject relationship among portions of data and a visualization thereof.

FIG. 19 illustrates an example embodiment of a subject relationship between two different portions of data of two different data sets 2130*a* and 2130*b*, and a corresponding example embodiment of a visualization 2888 depicting this example similar subject relationship. More specifically, the depicted vendor device 2200*a* stores a data set 2130*a* of which a portion of the data thereof is a table that includes a label indicating a similar subject to the subject indicated by a label of a row of data values of another data set 2130*b* that is stored within another depicted vendor device 2200*b*.

It may be that both labels were found to indicate subjects of interest specified in a query that, when acted upon with searches performed within each of the depicted vendor devices 2200*a* and 2200*b*, resulted in the identification of the two portions of data associated with these two labels as portions of data deemed relevant to the subject of interest (e.g., a subject such as "orange production") and meeting the criteria specified in the query for the search (e.g., a search of labels listed in corresponding portions of metadata). With the corresponding portions of the metadata for each of these two documents having been provided to the depicted broker device 2500, analyses performed at the broker device 2500, including comparisons of the contents of these labels as listed in their respective portions of metadata, revealed indications that the depicted table of data set 2130*a* and the depicted row of data set 2130*b* are both relevant to the subject of interest, and may therefore be related by subject to each other.

In some embodiments, this may be deemed too weak of a relationship between portions of data to be depicted in a visualization 2888. However, in other embodiments, such a relationship may be deemed to be significant enough, and therefore, with this subject relationship having been identified, the depicted visualization 2888 is generated by the broker device to show this subject relationship. In the depicted visualization 2888, each of the two portions of data, as stored as part of a separate data set 2130 within a separate vendor device 2200, is depicted with a separate node. More specifically, the table of data set 2130*a* is depicted with the designation "aaa" that denotes it being a portion of the data set 2130*a* that is stored within the vendor device 2200*a* that is registered with the depicted provider device 2400*a*. Correspondingly, the row of data set 2130*b* is depicted with the designation "bbb" that denotes it being a portion of the data set 2130*b* that is stored within the vendor device 2200*b* that is registered with the depicted provider device 2400*b*.

As depicted, a relatively thin dotted line that includes no arrow head or other graphical element on either end may be employed to visually indicate this subject relationship. Again, it may be that different types of lines of different characteristics and/or having different graphical elements at one end, both ends or neither end, are used to visually indicate any of a variety of relationships between stored portions of data that may be depicted as nodes. Also, again, it should be noted that this is a deliberately highly simplified example of an identified relationship among two portions of data presented for purposes of illustration, and should not be taken as limiting.

Figure 20:
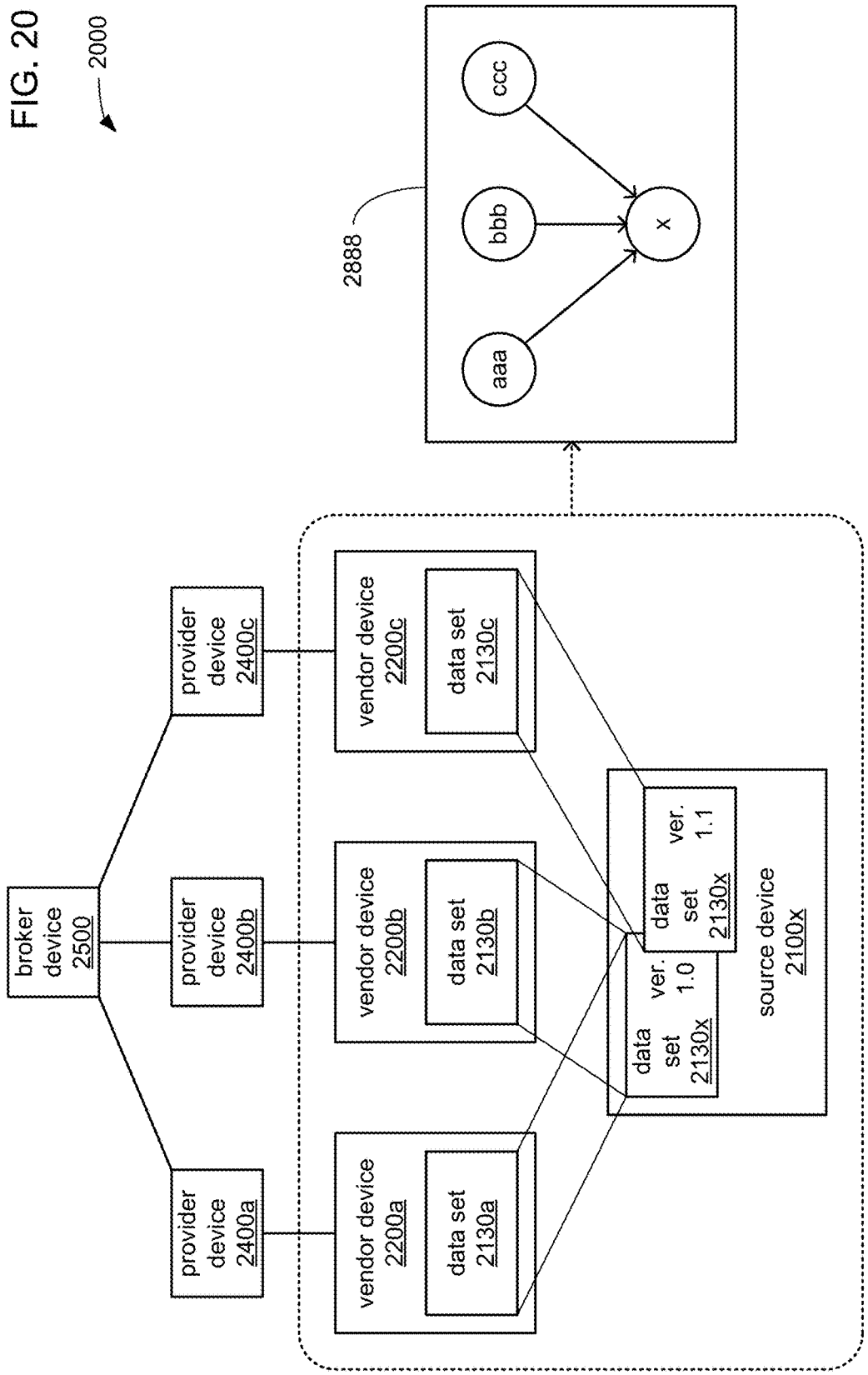
FIG. 20 illustrates an example embodiment of a dependency relationship among data sets and a visualization thereof.

FIG. 20 illustrates an example embodiment of a dependency relationship among three data sets and a visualization thereof. More specifically, each of the depicted vendor devices 2200*a*, 2200*b* and 2200*c* stores a data set 2130*a*, 2130*b* and 2130*c*, respectively, where each of the data sets 2130*a*, 2130*b* and 2130*c* is duplicated from one of multiple versions of a data set 2130*x* that is stored by a separate source device 2100*x*.

It may be that comparisons of identifying information within portions of metadata that correspond to each of these three data sets revealed that the data sets 2130*a* and 2130*b* are identical to each other. Further, it may be that the use of heuristic algorithms to analyze various metrics associated with each of these three data sets revealed that data set 2130*c* is a slightly different version of the other two data sets 2130*a* and 2130*b*. Still further, it may be that analyses of the identifying information within the corresponding portions of metadata revealed that all three of these data sets emanate from the same depicted source device 2100*x* such that, as a result, there is a dependency by all three of the vendor devices 2200*a*, 2220*b* and 2200*c* on the source device 2100*x* as the originator of all three of these data sets 2130*a*, 2130*b* and 2130*c*, respectively.

Such a dependency relationship may be of significance as a possible source of a bottleneck in the operation of the distributed online library system to which these vendor devices 2200*a*, 2200*b* and 2200*c* belong if they are each configured to redirect accesses made to these data sets 2130*a*, 2130*b* and 2130*c*, respectively, to the single depicted source device 2100*x*. In response to the discovery of such a potential bottleneck situation, a curator of such a system 2000 may choose to take steps to remove or otherwise address this dependency. Alternatively, the dependency relationship may be of a different nature in which each of the data sets 2130*a*, 2130*b* and 2130*c* are actually stored within these vendor devices 2200*a*, 2200*b* and 2200*c*, respectively, but are each copied from the source device 2100*x* such that there is still a dependency relationship of provenance to the source device 2100*x* that a curator of such a system 2000 may still deem important to be aware of in evaluating the quality of the data provided by the system 2000.

With this dependency relationship having been identified, the depicted visualization 2888 is generated by the broker device to show this dependency relationship. In the depicted visualization 2888, each of the three data sets 2130*a*, 2130*b* and 2130*c*, as associated with (but not necessarily stored within) one of the three vendor devices 2200*a*, 2200*b* and 2200*c*, respectively, is depicted with a separate node. More specifically, the data set 2130*a* is depicted with the designation "aaa" that denotes it being the data set 2130*a* that is stored within (or is at least associated with) the vendor device 2200*a* that is registered with the depicted provider device 2400*a*. Correspondingly, the data set 2130*b* is depicted with the designation "bbb" that denotes it being the data set 2130*b* that is stored within (or is at least associated with) the vendor device 2200*b* that is registered with the depicted provider device 2400*b*. Also correspondingly, the data set 2130*c* is depicted with the designation "ccc" that denotes it being the data set 2130*c* that is stored within (or is at least associated with) the vendor device 2200*c* that is registered with the depicted provider device 2400*c*. Still further, the source device 2100*x* is also depicted with a separate node, which is depicted with the designation "x".

As depicted, three separate solid lines that each include an arrow head at one end may be employed to separately visually indicate each dependency upon the source device 2100*x* by each pointing thereto. Again, it may be that different types of lines of different characteristics and/or having different graphical elements at one end, both ends or neither end, are used to visually indicate any of a variety of relationships between stored portions of data that may be depicted as nodes. Also, again, it should be noted that this is a deliberately highly simplified example of an identified relationship among two portions of data presented for purposes of illustration, and should not be taken as limiting.

Figure 21A:
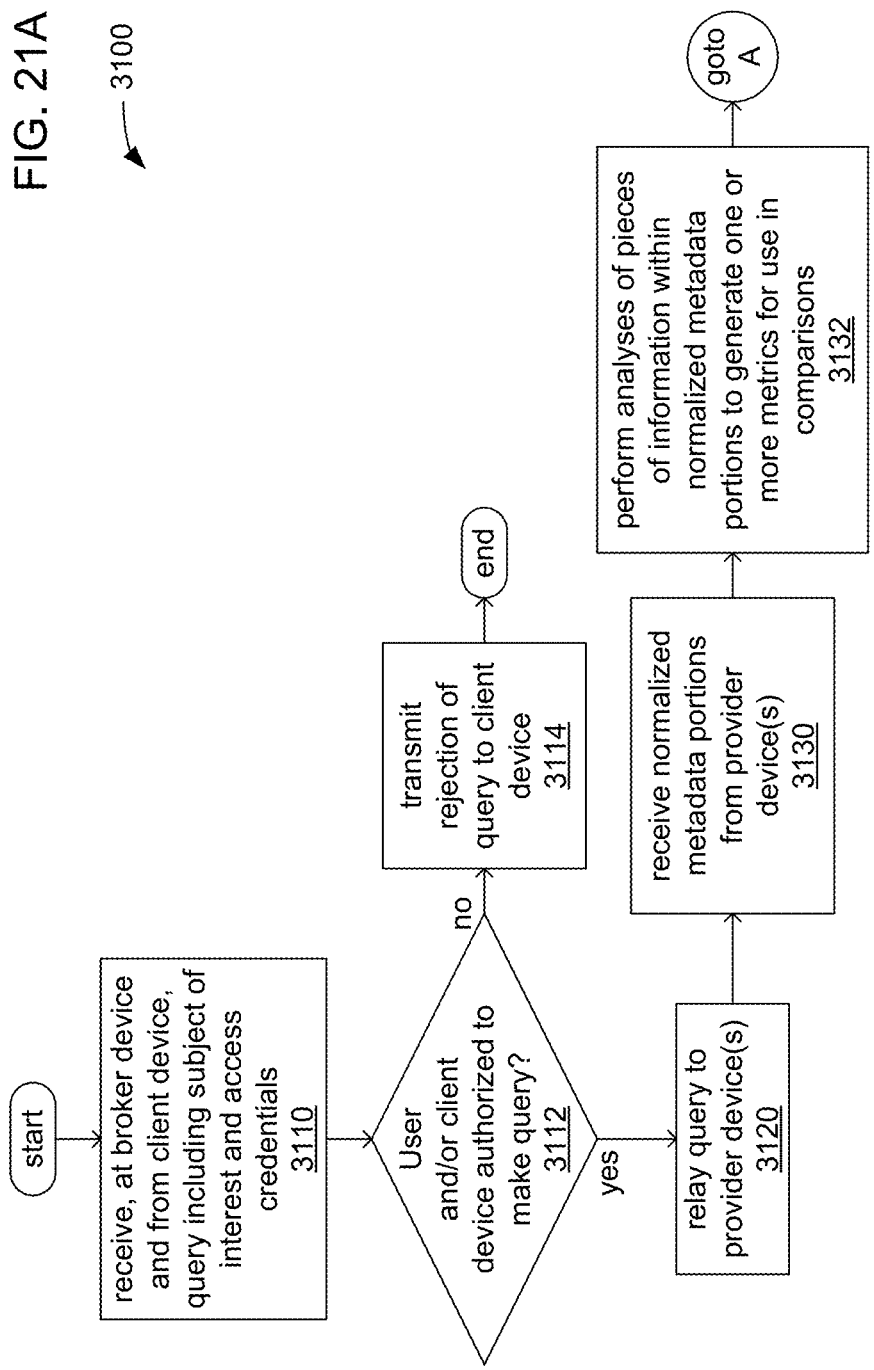
FIGS. 21A and 21B, together, illustrate an example embodiment of a logic flow of a broker device generating visualizations from received pieces of metadata in response to a query.
Figure 21B:
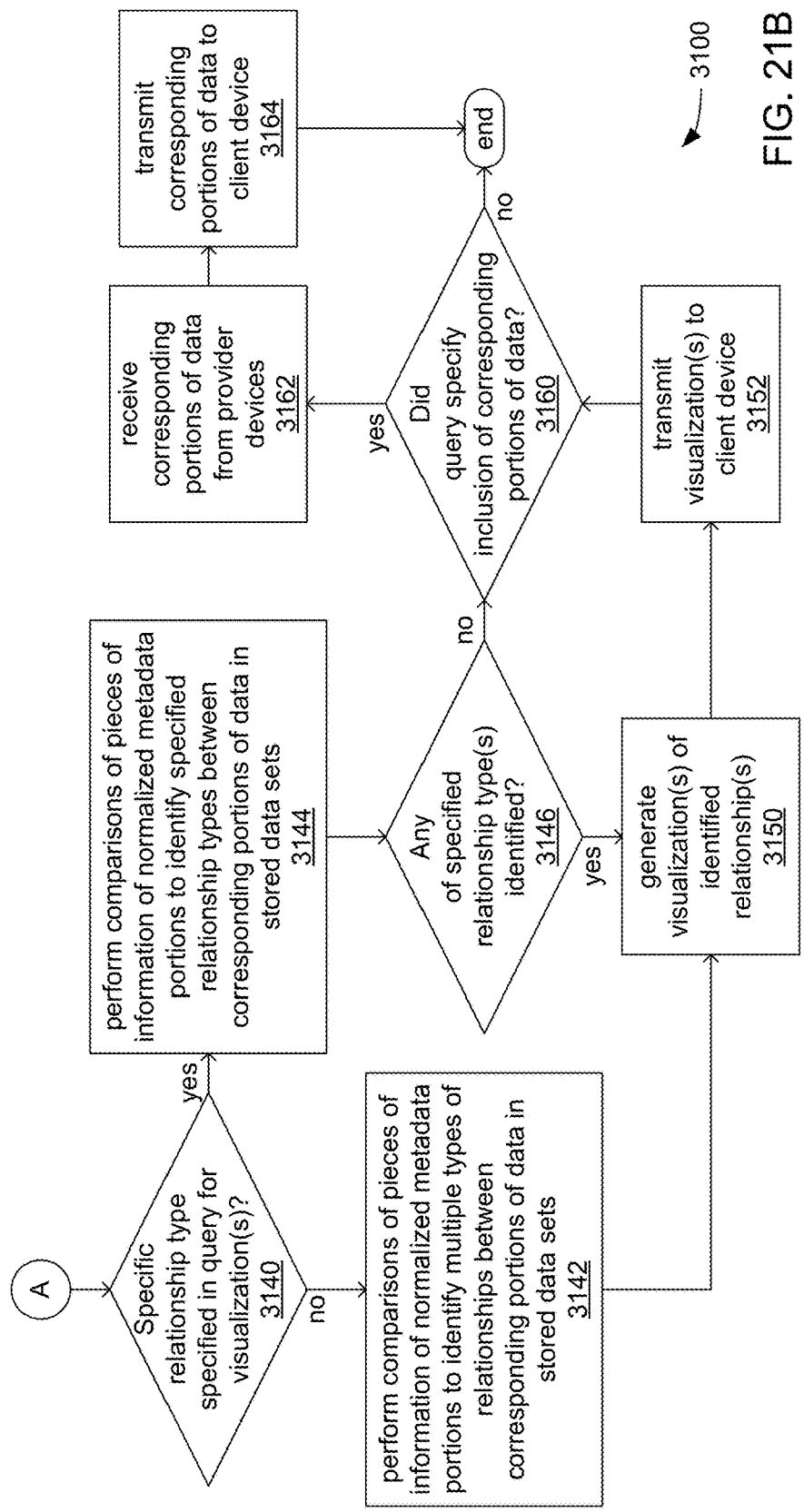

FIGS. 21A and 21B, together, illustrate an example embodiment of a logic flow 3100. The logic flow 3100 may be representative of some or all of the operations executed by one or more embodiments described herein. More specifically, the logic flow 3100 may illustrate operations performed by the processor component 2550 in executing the control routine 2540, and/or performed by other component (s) of the broker device 2500.

At 3110, a processor component of a broker device of a distributed online library system (e.g., the processor component 2550 of the broker device 2500 of the distributed online library system 2000) may receive, via a network and from a client device (e.g., via the network 2999, and from a client device 2800), a query for information concerning relationships among portions of data that includes a specification of a subject of interest, and/or access credentials that are associated with the client device and/or a user thereof. As has been discussed, the distributed online library system may be maintained by a particular scholastic, commercial/industrial, or governmental entity that restricts its use to only the personnel of that entity and/or to the devices associated with those personnel or with that entity. As has also been discussed, such a query received from a client device may also include the specification of various limitations on any search that is to be performed in answer to the query, such as a specification that the subject of interest is to be searched for only within titles, headings, labels used in indexing data (e.g., row or column labels), a specification that only certain specified types of relationships among portions of data are to be searched for, etc.

At 3112, the processor may check whether the client device and/or the user thereof is authorized to make the query. If not at 3112, then at 3114, the processor may transmit an indication of the rejection of the query back to the client device. As previously discussed, the UI by which the client device enabled the user to enter the query may then respond to the receipt, by the client device, of such an indication of rejection of the query by providing an indication to the user that the query is not authorized. However, if the query is authorized at 3112, then at 3120, the processor may relay the query to the one or more provider devices of the distributed online library system (e.g., the one or more provider devices 2400) via the network, and may then await the receipt of responses therefrom.

At 3130, as a response to having relayed the query to the one or more provider devices, the processor may receive multiple normalized metadata portions from the one or more provider devices (e.g., one or more normalized metadata portions 2436). At 3132, the processor may perform one or more analyses of the various pieces of information specified within each of the normalized metadata portions to derive one or more metrics that are not already directly specified therein (e.g., number and/or sizes of dimensions of multi-dimensional arrays, sparseness of data structures, etc.).

At 3140, the processor may check whether the original query received from the client device specified that the visualization was to be limited to one or more specific relationship types. If not at 3140, then at 3142, the processor may perform various comparisons among pieces of information within the received normalized metadata portions to identity multiple types of relationships among the portions of data to which each of the normalized metadata portions correspond (e.g., either a portion of a data set 2130, such as a single data structure or document within a data set 2130, or a complete data set 2130). At 3150, the processor may then generate one or more visualizations (e.g., one or more of the visualizations 2888) of the identified relationships. In some embodiments, a separate visualization may be generated for each different type of relationship. At 3152, the processor may transmit the generated visualizations to the client device from which the original query was received to enable the display of the generated visualizations thereat. At 3160, the processor may check whether the query included a request to provide the client device with the portions of data that were identified as relevant to the subject of interest and that met the criteria specified in the query for the search, which are the portions of data that correspond to the normalized metadata portions.

However, if at 3140, the original query received from the client device did specify one or more particular relationships that any visualizations were to be limited to, then at 3144, the processor may perform various comparisons among pieces of information within the received normalized metadata portions to identity relationships of only the one or more specified types that may be present among the portions of data to which each of the normalized metadata portions correspond. At 3146, the processor may check whether any relationships of the one or more specified types were identified. If so at 3146, then the processor may proceed with the generation of visualization(s) at 3150. However, if not at 3146, then at 3160, the processor may proceed with checking whether the query included a request to provide the client device with the portions of data that were identified as relevant to the subject of interest and that met the criteria specified in the query for the search.

If, at 3160, the query does specify the provision of the corresponding portions of data to the client device, then at 3162, the processor may receive those corresponding portions of data from the same one or more provider devices that provided the normalized metadata portions. It should be noted that those corresponding portions of data may have already been received from those one or more provider devices together with the normalized metadata portions. At 3164, the processor may relay those corresponding portions of data to the client device from which the original query was received, along with any visualizations that may also have been generated and transmitted to that client device.

Figure 22B:
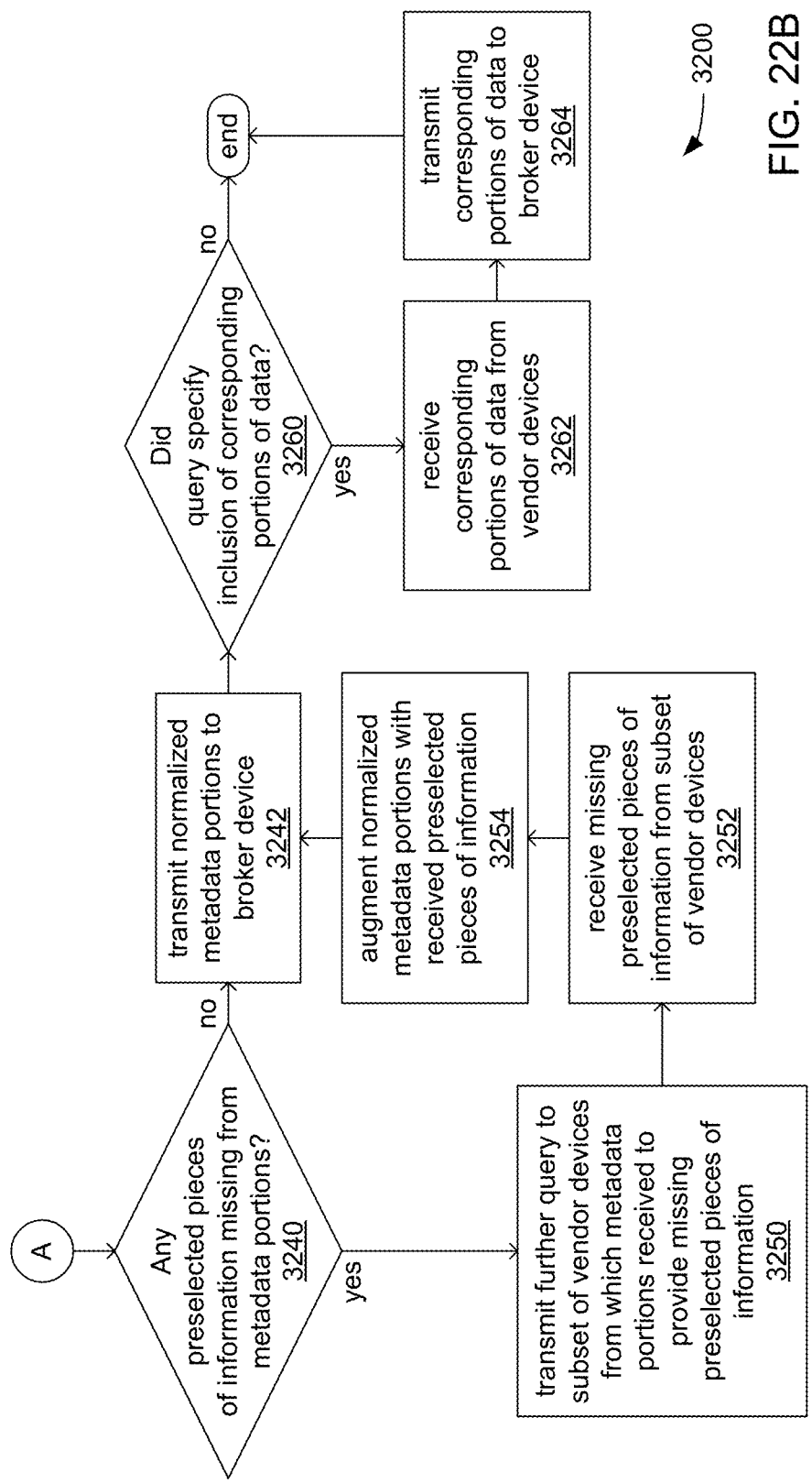

FIGS. 22A and 22B, together, illustrate an example embodiment of a logic flow 3200. The logic flow 3200 may be representative of some or all of the operations executed by one or more embodiments described herein. More specifically, the logic flow 3200 may illustrate operations performed by the processor component 2450 in executing the control routine 2440, and/or performed by other component(s) of one of the provider devices 2400.

At 3210, a processor component of a provider device of a distributed online library system (e.g., the processor component 2450 of one of the provider devices 2400 of the distributed online library system 2000) may receive, via a network and relayed by a broker device of the distributed online library system from a client device (e.g., via the network 2999, and relayed by the broker device 2500 from a client device 2800) a query for information concerning relationships among portions of data that includes a specification of a subject of interest, and/or access credentials that are associated with the client device and/or a user thereof. As has been discussed, the distributed online library system may be maintained by a particular scholastic, commercial/industrial, or governmental entity that restricts its use to only the personnel of that entity and/or to the devices associated with those personnel or with that entity. As has also been discussed, such a query may also include the specification of various limitations on any search that is to be performed in answer to the query, such as a specification that the subject of interest is to be searched for only within titles, headings, labels used in indexing data (e.g., row or column labels), a specification that only certain specified types of relationships among portions of data are to be searched for, etc.

At 3212, the processor may check whether the client device and/or the user thereof is authorized to make the query. If not at 3212, then at 3214, the processor may transmit an indication of the rejection of the query back to the client device through the broker device. As previously discussed, the UI by which the client device enabled the user to enter the query may then respond to the receipt, by the client device, of such an indication of rejection of the query by providing an indication to the user that the query is not authorized. However, if the query is authorized at 3212, then at 3216, the processor may additionally check whether the query is authorized based on other restrictions, such as an upper limit on the number of queries that are permitted to be handled at one time, at least by the vendor devices (e.g., a subset of the vendor devices 2200) that may be registered with the provider device. Again, if not at 3216, then the processor may proceed with the transmission of the indication of rejection of the query at 3214.

However, if the query is authorized at 3216, then at 3220, the processor may translate the query from the communications protocol under which the processor received the query from the broker device and into the communications protocol under which the processor is to relay the query to the vendor devices registered with the provider device, thereby generating a translated form of the query (e.g., the translated query data 2332). As previously discussed, it may be that there are differences in the communications protocols by which the provider device exchanges queries and metadata portions with the broker device, and by which the provider device exchanges queries and metadata portions with the vendor devices that are registered with it. Among such differences may formatting, language, syntactic, and/or other differences in the manner in which pieces of information are expressed within the query and/or within portions of metadata. At 3222, the processor may relay the resulting translated query to the vendor devices that are registered with the provider device, and may then await the receipt of responses therefrom.

At 3230, as a response to having relayed the translated query to the vendor devices registered with the provider device, the processor may receive multiple metadata portions from one or more of those vendor devices (e.g., one or more metadata portions 2336). At 3232, the processor may translate each of the received metadata portions between the different communications protocols, thereby generating corresponding normalized metadata portions (e.g., the normalized metadata portions 2436) that are to be relayed onward to the broker device.

At 3240, as part of the translation of metadata portions, the processor may check whether any of the received metadata portions are missing one or more particular pieces of information, where there may be a list of pieces of information that are to be included in each of the normalized metadata portions that are to be relayed onward to the broker device. If no such pieces of information are missing from any of the received metadata portions at 3240, then at 3242, the processor may transmit the normalized metadata portions to the broker device for use in identifying relationships among the portions of data that correspond to the received metadata portions, and therefore also correspond to the normalized metadata portions.

However, if at 3240, there are one or more received metadata portions that are missing one or more pieces of information that are meant to be included in the corresponding one or more normalized metadata portions, then at 3250, the processor may generate and transmit one or more further queries to the one or more of the vendor devices from which at least the metadata portions that are missing such one or more pieces of information were received. At 3252, the processor may receive the missing pieces of information from the one or more vendor devices, and at 3254, the processor may augment the normalized metadata portions that correspond to the one or more metadata portions from which information was missing with the missing information to make those normalized metadata portions complete. At 3242, the processor may then proceed with transmitting the normalized metadata portions to the broker device.

At 3260, the processor may check whether the original query from the client device included a request to provide the client device with the portions of data that were identified as relevant to the subject of interest and that met the criteria specified in the query for the search. If, at 3260, the query does specify the provision of the corresponding portions of data to the client device, then at 3262, the processor may receive those corresponding portions of data from the same one or more vendor devices that provided the metadata portions. It should be noted that those corresponding portions of data may have already been received from those one or more vendor devices together with the metadata portions. At 3264, the processor may relay those corresponding portions of data to the broker device to be further relayed to the client device from which the original query was received, along with any visualizations that may be generated and transmitted to that client device by the broker device.

In various embodiments, each of the processors 2250, 2450, 2550 and 2850 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 2550 of each of the one or more broker devices 2500 may be selected to efficiently perform the analysis of multiple instances of queries at least partially in parallel. By way of example, the processor 2550 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1550 may incorporate multi-threaded capabilities and/or multiple processor cores to enable parallel performances of the tasks of more than job flow.

In various embodiments, each of the control routines 2240, 2440, 2540 and 2840, including the components of which each is composed, may be selected to be operative on whatever type of processor or processors that are selected to implement applicable ones of the processors 2250, 2450, 2550 and/or 2850 within each one of the devices 2200, 2400, 2500 and/or 2800, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2250, 2450, 2550 and/or 2850. Where one or more device drivers are included, those device drivers may provide support for any of a variety of other components, whether hardware or software components, of the devices 2200, 2400, 2500 and/or 2800.

In various embodiments, each of the storages 2260, 2460, 2560 and 2860 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2260 in embodiments in which the one or more of the vendor devices 2200 store data sets 2130 may be implemented with a redundant array of independent discs (RAID) of a RAID level selected to provide fault tolerant storage.

In various embodiments, each of the input device(s) 2810 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, each of the display(s) 2880 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the displays 2180 and/or 2880 may each be a touchscreen display such that the input device(s) 2810, respectively, may be incorporated therein as touch-sensitive components thereof.

In various embodiments, each of the network interfaces 2290, 2490, 2590 and 2890 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, one or more of the network interfaces 2290, 2490, 2590 and/or 2890 may be implemented with multiple copper-based or fiber-optic based network interface ports to provide redundant and/or parallel pathways in exchanging one or more of the portions of data of the data sets 2130, one or more of the metadata portions 2336, and/or one or more of the normalized metadata portions 2436.

In various embodiments, the division of processing and/or storage resources among the federated devices 1500, and/or the API architectures employed to support communications between the federated devices and other devices may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
    receive, at a broker device and via a network, multiple normalized metadata portions based on a set of metadata portions originating from a set of vendor devices of a distributed online library system, wherein:
        the set of vendor devices stores a set of data sets of the distributed online library system;
        each normalized metadata portion of the multiple normalized metadata portions comprises multiple pieces of information descriptive of contents of a corresponding portion of data of a set of portions of data retrieved from the set of data sets;
        each portion of data in the set of portions of data is identified by a vendor device of the set of vendor devices as relevant to a subject of interest that is specified in a query originating from a client device of the distributed online library system; and
        the query comprises a request for a visualization of relationships among the portions of data in the set of portions of data;
    for each pair of normalized metadata portions of the multiple metadata portions, compare the multiple pieces of information therebetween to identify at least one pair of identical portions of data within the set of portions of data;
    in response to the identification of a pair of identical portions of data within the set of portions of data, analyze the pieces of information of the corresponding pair of normalized metadata portions to determine if there is a dependency relationship between each portion of data of the pair of identical portions of data and another identical portion of data stored within another device that is not among the set of vendor devices; and
    in response to a determination that there is a dependency relationship between each portion of data of the pair of identical portions of data and another identical portion of data stored within another device that is not among the set of vendor devices, perform operations comprising:
        generate a visualization comprising:
            a first graphical element that represents a first portion of data of the pair of identical portions of data;
            a second graphical element that represents a second portion of data of the pair of identical portions of data;
            a third graphical element that represents the other identical portion of data stored within the other device; and
            a pair of graphical elements that each represent the dependency relationship between the other identical portion of data and each of the first portion of data and the second portion of data; and
        transmit the visualization to the client device to enable a visual presentation of the visualization.

2. The apparatus of claim 1, wherein:
    the multiple pieces of information of each normalized metadata portion comprises a data portion identifier of the corresponding portion of data that comprises at least one of:
        a file name of the corresponding portion of data stored as a file within a vendor device of the set of vendor devices;
        a title of the corresponding portion of data;
        an author of the corresponding portion of data;
        a publisher of the corresponding portion of data;
        an Internet Protocol (IP) address of the vendor device of the set of vendor devices within which the corresponding portion of data is stored; or
        a Universal Resource Locator (URL) of the vendor device of the set of vendor devices within which the corresponding portion of data is stored; and
    to identify at least one pair of identical portions of data within the set of portions of data, the processor is caused to compare the data portion identifiers of each pair of normalized metadata portions of the multiple normalized metadata portions.

3. The apparatus of claim 1, wherein:
    at least a subset of the set of portions of data comprises a multi-dimensional array data structure;
    the multiple pieces of information of each normalized metadata portion that corresponds to a portion of data of the subset of portions of data comprises multiple metrics that are each descriptive of contents of the corresponding portion of data;
    each metric of the multiple metrics comprises at least one of:
        a quantity of dimensions;
        a size of each dimension;
        a data type of stored data values;

a bit width of stored data values;
a specified data value employed as a null value; or
a measure of sparseness of data values other than the null value; and
to identify at least one pair of identical portions of data within the set of portions of data, the processor is caused to:
identify a subset of the multiple normalized metadata portions that corresponds to the subset of data portions; and
compare the multiple metrics of each pair of normalized metadata portions of the subset of normalized metadata portions.

4. The apparatus of claim 1, wherein, in response to a determination that a pair of portions of data of the set of portions of data are not identical, the processor is caused to perform operations comprising:
compare indications of size of each portion of data of the pair of portions of data in the corresponding pair of normalized metadata portions to determine which portion of data is smaller;
analyze the multiple pieces of information of the normalized metadata portion that corresponds to the smaller portion of data of the pair of portions of data to identify a type of data structure present within the smaller portion of data;
analyze the multiple pieces of information of the normalized metadata portion that corresponds to the larger portion of data of the pair of portions of data to determine if a data structure of the same type is present within the larger portion of data of the pair of portions of data;
in response to a determination that a data structure of the same type is present within the larger portion, compare pieces of information of the multiple pieces of information of each normalized metadata portion that specify multiple metrics of the data structures of the smaller portion of data and of the larger portion of data to determine whether the data structures of the smaller portion of data and the larger portion of data have identical metrics;
in response to a determination that the data structures of the smaller portion of data and the larger portion of data have identical metrics, compare at least a subset of data values of the data structure of the smaller portion of data to corresponding data values of the data structure of the larger portion of data to determine if the data structures of the smaller portion of data and the larger portion of data are identical and that there is an inclusion relationship in which the smaller portion of data is included in the larger portion of data; and
in response to a determination that there is an inclusion relationship between the smaller portion of data and the larger portion of data, perform operations comprising:
generate a visualization comprising:
a first graphical element that represents the smaller portion of data;
a second graphical element that represents the larger portion of data; and
a third graphical element that represents the inclusion relationship in which the smaller portion of data is included in the larger portion of data; and
transmit the visualization to the client device to enable a visual presentation of the visualization.

5. The apparatus of claim 1, wherein:
each portion of data in at least a subset of the set of portions of data comprises a document;
the multiple pieces of information of each normalized metadata portion that corresponds to a portion of data of the subset of portions of data comprises at least one document identifier of a document, and at least one citation to another document that is present within the document;
each document identifier of the at least one document identifier comprises at least one of:
a title;
an author;
an identifier of a publisher; or
a date of publication;
to identify a citation relationship between at least one pair of portions of data within the subset of portions of data in which a document of one portion of data includes a citation to a document of another portion of data, the processor is caused to:
identify a subset of the multiple normalized metadata portions that corresponds to the subset of data portions; and
compare document identifiers to citations between each pair of normalized metadata portions of the subset of the multiple normalized metadata portions; and
in response to an identification of a citation relationship between a pair of portions of data within the subset of portions of data, the processor is caused to perform operations comprising:
generate a visualization comprising:
a first graphical element that represents a first portion of data of the pair of portions of data in which a document includes the citation;
a second graphical element that represents a second portion of data of the pair of portions of data that includes the document that is cited by the citation; and
a third graphical element that represents the citation relationship; and
transmit the visualization to the client device to enable a visual presentation of the visualization.

6. The apparatus of claim 1, wherein the processor is caused to perform operations comprising:
receive the query from the client device via the network;
translate the query from a first communications protocol in which information in the query is expressed in a first manner, and to a second communications protocol in which the information in the query is expressed in a second manner in a translated query; and
relay the translated query to the set of vendor devices via the network to enable the set of vendor devices to perform a search of metadata corresponding to multiple data sets to identify the set of portions of data as relevant to the subject of interest specified in the query and in the translated query.

7. The apparatus of claim 6, wherein, prior to translating the query, the processor is caused to perform operations comprising:
analyze access credentials included with the query to determine whether the client device or a user of the client device is authorized to enter the query into the distributed online library system; and
in response to a determination that the entry of the query is not authorized, transmit an indication of lack of authorization to the client device and refrain from translating the query and relaying the translated query.

8. The apparatus of claim 1, wherein the processor is caused to perform operations comprising:

receive the set of metadata portions from the set of vendor devices via the network; and translate each metadata portion of the set of metadata portions from a first communications protocol in which the multiple pieces of information about the corresponding portion of data is expressed in a first manner, and to a second communications protocol in which the multiple pieces of information about the corresponding portion of data is expressed in a second manner in a corresponding normalized metadata portion of the multiple normalized metadata portions.

9. The apparatus of claim 8, wherein, as part of the translation of each metadata portion to the corresponding normalized metadata portion, the processor is caused to perform operations comprising:

analyze the multiple pieces of information of each metadata portion to determine whether there is a piece of information of a predetermined set of pieces of information to be included in the corresponding normalized metadata portion that is not present among the multiple pieces of information of the metadata portion; and in response to a determination that there is a piece of information of the predetermined set of pieces of information that is not present among the multiple pieces of information of a metadata portion, perform operations comprising:

generate a further query to obtain the piece of information that is not present among the multiple pieces of information of the metadata portion from the corresponding portion of data;

transmit the further query to the vendor device of the set of vendor devices from which the metadata portion was received;

receive further data from the vendor device that comprises the piece of information that is not present among the multiple pieces of information of the metadata portion; and augment the corresponding normalized metadata portion with the piece of information.

10. The apparatus of claim 1, wherein the processor is caused to perform operations comprising:

analyze the query to determine whether the query comprises a request for the provision of the set of portions of data that correspond to the multiple normalized metadata portions to be provide along with a visualization of relationships among the set of portions of data; and in response to a determination that the query does comprise a request for the provision of the set of portions of data, perform operations comprising:

receive the set of portions of data from the set of vendor devices; and relay the set of portions of data to the client device along with the transmission of the visualization to the client device.

11. A computer-program product tangibly embodied in a non-transitory machine-readable storage medium, the computer-program product including instructions operable to cause a processor to perform operations comprising:

receive, at a broker device and via a network, multiple normalized metadata portions based on a set of metadata portions originating from a set of vendor devices of a distributed online library system, wherein:

the set of vendor devices stores a set of data sets of the distributed online library system;

each normalized metadata portion of the multiple normalized metadata portions comprises multiple pieces of information descriptive of contents of a corresponding portion of data of a set of portions of data retrieved from the set of data sets;

each portion of data in the set of portions of data is identified by a vendor device of the set of vendor devices as relevant to a subject of interest that is specified in a query originating from a client device of the distributed online library system; and the query comprises a request for a visualization of relationships among the portions of data in the set of portions of data;

for each pair of normalized metadata portions of the multiple metadata portions, compare the multiple pieces of information therebetween to identify at least one pair of identical portions of data within the set of portions of data;

in response to the identification of a pair of identical portions of data within the set of portions of data, analyze the pieces of information of the corresponding pair of normalized metadata portions to determine if there is a dependency relationship between each portion of data of the pair of identical portions of data and another identical portion of data stored within another device that is not among the set of vendor devices; and in response to a determination that there is a dependency relationship between each portion of data of the pair of identical portions of data and another identical portion of data stored within another device that is not among the set of vendor devices, perform operations comprising:

generate a visualization comprising:

a first graphical element that represents a first portion of data of the pair of identical portions of data;

a second graphical element that represents a second portion of data of the pair of identical portions of data;

a third graphical element that represents the other identical portion of data stored within the other device; and a pair of graphical elements that each represent the dependency relationship between the other identical portion of data and each of the first portion of data and the second portion of data; and transmit the visualization to the client device to enable a visual presentation of the visualization.

12. The computer-program product of claim 11, wherein:

the multiple pieces of information of each normalized metadata portion comprises a data portion identifier of the corresponding portion of data that comprises at least one of:

a file name of the corresponding portion of data stored as a file within a vendor device of the set of vendor devices;

a title of the corresponding portion of data;

an author of the corresponding portion of data;

a publisher of the corresponding portion of data;

an Internet Protocol (IP) address of the vendor device of the set of vendor devices within which the corresponding portion of data is stored; or a Universal Resource Locator (URL) of the vendor device of the set of vendor devices within which the corresponding portion of data is stored; and to identify at least one pair of identical portions of data within the set of portions of data, the processor is caused to compare the data portion identifiers of each pair of normalized metadata portions of the multiple normalized metadata portions.

13. The computer-program product of claim 11, wherein:
at least a subset of the set of portions of data comprises a multi-dimensional array data structure;
the multiple pieces of information of each normalized metadata portion that corresponds to a portion of data of the subset of portions of data comprises multiple metrics that are each descriptive of contents of the corresponding portion of data;
each metric of the multiple metrics comprises at least one of:
a quantity of dimensions;
a size of each dimension;
a data type of stored data values;
a bit width of stored data values;
a specified data value employed as a null value; or
a measure of sparseness of data values other than the null value; and
to identify at least one pair of identical portions of data within the set of portions of data, the processor is caused to:
identify a subset of the multiple normalized metadata portions that corresponds to the subset of data portions; and
compare the multiple metrics of each pair of normalized metadata portions of the subset of normalized metadata portions.

14. The computer-program product of claim 11, wherein, in response to a determination that a pair of portions of data of the set of portions of data are not identical, the processor is caused to perform operations comprising:
compare indications of size of each portion of data of the pair of portions of data in the corresponding pair of normalized metadata portions to determine which portion of data is smaller;
analyze the multiple pieces of information of the normalized metadata portion that corresponds to the smaller portion of data of the pair of portions of data to identify a type of data structure present within the smaller portion of data;
analyze the multiple pieces of information of the normalized metadata portion that corresponds to the larger portion of data of the pair of portions of data to determine if a data structure of the same type is present within the larger portion of data of the pair of portions of data;
in response to a determination that a data structure of the same type is present within the larger portion, compare pieces of information of the multiple pieces of information of each normalized metadata portion that specify multiple metrics of the data structures of the smaller portion of data and of the larger portion of data to determine whether the data structures of the smaller portion of data and the larger portion of data have identical metrics;
in response to a determination that the data structures of the smaller portion of data and the larger portion of data have identical metrics, compare at least a subset of data values of the data structure of the smaller portion of data to corresponding data values of the data structure of the larger portion of data to determine if the data structures of the smaller portion of data and the larger portion of data are identical and that there is an inclusion relationship in which the smaller portion of data is included in the larger portion of data; and
in response to a determination that there is an inclusion relationship between the smaller portion of data and the larger portion of data, perform operations comprising:
generate a visualization comprising:
a first graphical element that represents the smaller portion of data;
a second graphical element that represents the larger portion of data; and
a third graphical element that represents the inclusion relationship in which the smaller portion of data is included in the larger portion of data; and
transmit the visualization to the client device to enable a visual presentation of the visualization.

15. The computer-program product of claim 11, wherein:
each portion of data in at least a subset of the set of portions of data comprises a document;
the multiple pieces of information of each normalized metadata portion that corresponds to a portion of data of the subset of portions of data comprises at least one document identifier of a document, and at least one citation to another document that is present within the document;
each document identifier of the at least one document identifier comprises at least one of:
a title;
an author;
an identifier of a publisher; or
a date of publication;
to identify a citation relationship between at least one pair of portions of data within the subset of portions of data in which a document of one portion of data includes a citation to a document of another portion of data, the processor is caused to:
identify a subset of the multiple normalized metadata portions that corresponds to the subset of data portions; and
compare document identifiers to citations between each pair of normalized metadata portions of the subset of the multiple normalized metadata portions; and
in response to an identification of a citation relationship between a pair of portions of data within the subset of portions of data, the processor is caused to perform operations comprising:
generate a visualization comprising:
a first graphical element that represents a first portion of data of the pair of portions of data in which a document includes the citation;
a second graphical element that represents a second portion of data of the pair of portions of data that includes the document that is cited by the citation; and
a third graphical element that represents the citation relationship; and
transmit the visualization to the client device to enable a visual presentation of the visualization.

16. The computer-program product of claim 11, wherein the processor is caused to perform operations comprising:
receive the query from the client device via the network;
translate the query from a first communications protocol in which information in the query is expressed in a first manner, and to a second communications protocol in which the information in the query is expressed in a second manner in a translated query; and
relay the translated query to the set of vendor devices via the network to enable the set of vendor devices to perform a search of metadata corresponding to multiple data sets to identify the set of portions of data as relevant to the subject of interest specified in the query and in the translated query.

17. The computer-program product of claim 16, wherein, prior to translating the query, the processor is caused to perform operations comprising:
- analyze access credentials included with the query to determine whether the client device or a user of the client device is authorized to enter the query into the distributed online library system; and
- in response to a determination that the entry of the query is not authorized, transmit an indication of lack of authorization to the client device and refrain from translating the query and relaying the translated query.

18. The computer-program product of claim 11, wherein the processor is caused to perform operations comprising:
- receive the set of metadata portions from the set of vendor devices via the network; and
- translate each metadata portion of the set of metadata portions from a first communications protocol in which the multiple pieces of information about the corresponding portion of data is expressed in a first manner, and to a second communications protocol in which the multiple pieces of information about the corresponding portion of data is expressed in a second manner in a corresponding normalized metadata portion of the multiple normalized metadata portions.

19. The computer-program product of claim 18, wherein, as part of the translation of each metadata portion to the corresponding normalized metadata portion, the processor is caused to perform operations comprising:
- analyze the multiple pieces of information of each metadata portion to determine whether there is a piece of information of a predetermined set of pieces of information to be included in the corresponding normalized metadata portion that is not present among the multiple pieces of information of the metadata portion; and
- in response to a determination that there is a piece of information of the predetermined set of pieces of information that is not present among the multiple pieces of information of a metadata portion, perform operations comprising:
  - generate a further query to obtain the piece of information that is not present among the multiple pieces of information of the metadata portion from the corresponding portion of data;
  - transmit the further query to the vendor device of the set of vendor devices from which the metadata portion was received;
  - receive further data from the vendor device that comprises the piece of information that is not present among the multiple pieces of information of the metadata portion; and
  - augment the corresponding normalized metadata portion with the piece of information.

20. The computer-program product of claim 11, wherein the processor is caused to perform operations comprising:
- analyze the query to determine whether the query comprises a request for the provision of the set of portions of data that correspond to the multiple normalized metadata portions to be provide along with a visualization of relationships among the set of portions of data; and
- in response to a determination that the query does comprise a request for the provision of the set of portions of data, perform operations comprising:
  - receive the set of portions of data from the set of vendor devices; and
  - relay the set of portions of data to the client device along with the transmission of the visualization to the client device.

21. A computer-implemented method comprising:
- receiving, by a processor at a broker device, and via a network, multiple normalized metadata portions based on a set of metadata portions originating from a set of vendor devices of a distributed online library system, wherein:
  - the set of vendor devices stores a set of data sets of the distributed online library system;
  - each normalized metadata portion of the multiple normalized metadata portions comprises multiple pieces of information descriptive of contents of a corresponding portion of data of a set of portions of data retrieved from the set of data sets;
  - each portion of data in the set of portions of data is identified by a vendor device of the set of vendor devices as relevant to a subject of interest that is specified in a query originating from a client device of the distributed online library system; and
  - the query comprises a request for a visualization of relationships among the portions of data in the set of portions of data;
- for each pair of normalized metadata portions of the multiple metadata portions, comparing, by the processor, the multiple pieces of information therebetween to identify at least one pair of identical portions of data within the set of portions of data;
- in response to the identification of a pair of identical portions of data within the set of portions of data, analyzing, by the processor, the pieces of information of the corresponding pair of normalized metadata portions to determine if there is a dependency relationship between each portion of data of the pair of identical portions of data and another identical portion of data stored within another device that is not among the set of vendor devices; and
- in response to a determination that there is a dependency relationship between each portion of data of the pair of identical portions of data and another identical portion of data stored within another device that is not among the set of vendor devices, performing, by the processor, operations comprising:
  - generating a visualization comprising:
    - a first graphical element that represents a first portion of data of the pair of identical portions of data;
    - a second graphical element that represents a second portion of data of the pair of identical portions of data;
    - a third graphical element that represents the other identical portion of data stored within the other device; and
    - a pair of graphical elements that each represent the dependency relationship between the other identical portion of data and each of the first portion of data and the second portion of data; and
  - transmitting, by the processor and via the network, the visualization to the client device to enable a visual presentation of the visualization.

22. The computer-implemented method of claim 21, wherein:
- the multiple pieces of information of each normalized metadata portion comprises a data portion identifier of the corresponding portion of data that comprises at least one of:

a file name of the corresponding portion of data stored as a file within a vendor device of the set of vendor devices;
a title of the corresponding portion of data;
an author of the corresponding portion of data;
a publisher of the corresponding portion of data;
an Internet Protocol (IP) address of the vendor device of the set of vendor devices within which the corresponding portion of data is stored; or
a Universal Resource Locator (URL) of the vendor device of the set of vendor devices within which the corresponding portion of data is stored; and
to identify at least one pair of identical portions of data within the set of portions of data, the method comprises comparing, by the processor, the data portion identifiers of each pair of normalized metadata portions of the multiple normalized metadata portions.

23. The computer-implemented method of claim 21, wherein:
at least a subset of the set of portions of data comprises a multi-dimensional array data structure;
the multiple pieces of information of each normalized metadata portion that corresponds to a portion of data of the subset of portions of data comprises multiple metrics that are each descriptive of contents of the corresponding portion of data;
each metric of the multiple metrics comprises at least one of:
a quantity of dimensions;
a size of each dimension;
a data type of stored data values;
a bit width of stored data values;
a specified data value employed as a null value; or
a measure of sparseness of data values other than the null value; and
to identify at least one pair of identical portions of data within the set of portions of data, the method comprises:
identifying, by the processor, a subset of the multiple normalized metadata portions that corresponds to the subset of data portions; and
comparing, by the processor, the multiple metrics of each pair of normalized metadata portions of the subset of normalized metadata portions.

24. The computer-implemented method of claim 21, comprising, in response to a determination that a pair of portions of data of the set of portions of data are not identical, performing operations comprising:
comparing, by the processor, indications of size of each portion of data of the pair of portions of data in the corresponding pair of normalized metadata portions to determine which portion of data is smaller;
analyzing, by the processor, the multiple pieces of information of the normalized metadata portion that corresponds to the smaller portion of data of the pair of portions of data to identify a type of data structure present within the smaller portion of data;
analyzing, by the processor, the multiple pieces of information of the normalized metadata portion that corresponds to the larger portion of data of the pair of portions of data to determine if a data structure of the same type is present within the larger portion of data of the pair of portions of data;
in response to a determination that a data structure of the same type is present within the larger portion, comparing, by the processor, pieces of information of the multiple pieces of information of each normalized metadata portion that specify multiple metrics of the data structures of the smaller portion of data and of the larger portion of data to determine whether the data structures of the smaller portion of data and the larger portion of data have identical metrics;
in response to a determination that the data structures of the smaller portion of data and the larger portion of data have identical metrics, comparing, by the processor, at least a subset of data values of the data structure of the smaller portion of data to corresponding data values of the data structure of the larger portion of data to determine if the data structures of the smaller portion of data and the larger portion of data are identical and that there is an inclusion relationship in which the smaller portion of data is included in the larger portion of data; and
in response to a determination that there is an inclusion relationship between the smaller portion of data and the larger portion of data, performing operations comprising:
generating, by the processor, a visualization comprising:
a first graphical element that represents the smaller portion of data;
a second graphical element that represents the larger portion of data; and
a third graphical element that represents the inclusion relationship in which the smaller portion of data is included in the larger portion of data; and
transmitting, by the processor and via the network, the visualization to the client device to enable a visual presentation of the visualization.

25. The computer-implemented method of claim 21, wherein:
each portion of data in at least a subset of the set of portions of data comprises a document;
the multiple pieces of information of each normalized metadata portion that corresponds to a portion of data of the subset of portions of data comprises at least one document identifier of a document, and at least one citation to another document that is present within the document;
each document identifier of the at least one document identifier comprises at least one of:
a title;
an author;
an identifier of a publisher; or
a date of publication;
to identify a citation relationship between at least one pair of portions of data within the subset of portions of data in which a document of one portion of data includes a citation to a document of another portion of data, the method comprises performing operations comprising:
identifying a subset of the multiple normalized metadata portions that corresponds to the subset of data portions; and
comparing document identifiers to citations between each pair of normalized metadata portions of the subset of the multiple normalized metadata portions; and
in response to an identification of a citation relationship between a pair of portions of data within the subset of portions of data, the method comprises performing operations comprising:
generating, by the processor, a visualization comprising:

a first graphical element that represents a first portion of data of the pair of portions of data in which a document includes the citation;

a second graphical element that represents a second portion of data of the pair of portions of data that includes the document that is cited by the citation; and a third graphical element that represents the citation relationship; and transmitting, by the processor and via the network, the visualization to the client device to enable a visual presentation of the visualization.

26. The computer-implemented method of claim 21, comprising:

receiving, by the processor, the query from the client device via the network;

translating, by the processor, the query from a first communications protocol in which information in the query is expressed in a first manner, and to a second communications protocol in which the information in the query is expressed in a second manner in a translated query; and relaying, by the processor, the translated query to the set of vendor devices via the network to enable the set of vendor devices to perform a search of metadata corresponding to multiple data sets to identify the set of portions of data as relevant to the subject of interest specified in the query and in the translated query.

27. The computer-implemented method of claim 26, comprising, prior to translating the query, performing operations comprising:

analyzing, by the processor, access credentials included with the query to determine whether the client device or a user of the client device is authorized to enter the query into the distributed online library system; and in response to a determination that the entry of the query is not authorized, transmitting, by the processor, an indication of lack of authorization to the client device and refrain from translating the query and relaying the translated query.

28. The computer-implemented method of claim 21, comprising:

receiving, by the processor, the set of metadata portions from the set of vendor devices via the network; and translating, by the processor, each metadata portion of the set of metadata portions from a first communications protocol in which the multiple pieces of information about the corresponding portion of data is expressed in a first manner, and to a second communications protocol in which the multiple pieces of information about the corresponding portion of data is expressed in a second manner in a corresponding normalized metadata portion of the multiple normalized metadata portions.

29. The computer-implemented method of claim 28, wherein, as part of the translation of each metadata portion to the corresponding normalized metadata portion, the method comprises performing operations comprising:

analyzing, by the processor, the multiple pieces of information of each metadata portion to determine whether there is a piece of information of a predetermined set of pieces of information to be included in the corresponding normalized metadata portion that is not present among the multiple pieces of information of the metadata portion; and in response to a determination that there is a piece of information of the predetermined set of pieces of information that is not present among the multiple pieces of information of a metadata portion, performing operations comprising:

generating, by the processor, a further query to obtain the piece of information that is not present among the multiple pieces of information of the metadata portion from the corresponding portion of data;

transmitting, by the processor, the further query to the vendor device of the set of vendor devices from which the metadata portion was received;

receiving, by the processor, further data from the vendor device that comprises the piece of information that is not present among the multiple pieces of information of the metadata portion; and augmenting, by the processor, the corresponding normalized metadata portion with the piece of information.

30. The computer-implemented method of claim 21, comprising:

analyzing, by the processor, the query to determine whether the query comprises a request for the provision of the set of portions of data that correspond to the multiple normalized metadata portions to be provide along with a visualization of relationships among the set of portions of data; and in response to a determination that the query does comprise a request for the provision of the set of portions of data, performing operations comprising:

receiving, by the processor, the set of portions of data from the set of vendor devices; and relaying, by the processor, the set of portions of data to the client device along with the transmission of the visualization to the client device.

* * * * *